May 18, 1948.  R. A. CHRISTIAN  2,441,870
FRONT FEED MECHANISM FOR CALCULATING MACHINES
Filed Jan. 27, 1933    24 Sheets-Sheet 1

Inventor
Raymond A. Christian
By
His Attorney

May 18, 1948.  R. A. CHRISTIAN  2,441,870
FRONT FEED MECHANISM FOR CALCULATING MACHINES
Filed Jan. 27, 1933  24 Sheets-Sheet 2

Inventor
Raymond A. Christian
By

His Attorney

May 18, 1948.   R. A. CHRISTIAN   2,441,870
FRONT FEED MECHANISM FOR CALCULATING MACHINES
Filed Jan. 27, 1933   24 Sheets-Sheet 3

Inventor
Raymond A. Christian
By
Earl Beust
His Attorney

May 18, 1948. R. A. CHRISTIAN 2,441,870
FRONT FEED MECHANISM FOR CALCULATING MACHINES
Filed Jan. 27, 1933 24 Sheets-Sheet 4

Inventor
Raymond A. Christian
By
His Attorney

May 18, 1948. R. A. CHRISTIAN 2,441,870
FRONT FEED MECHANISM FOR CALCULATING MACHINES
Filed Jan. 27, 1933 24 Sheets-Sheet 5
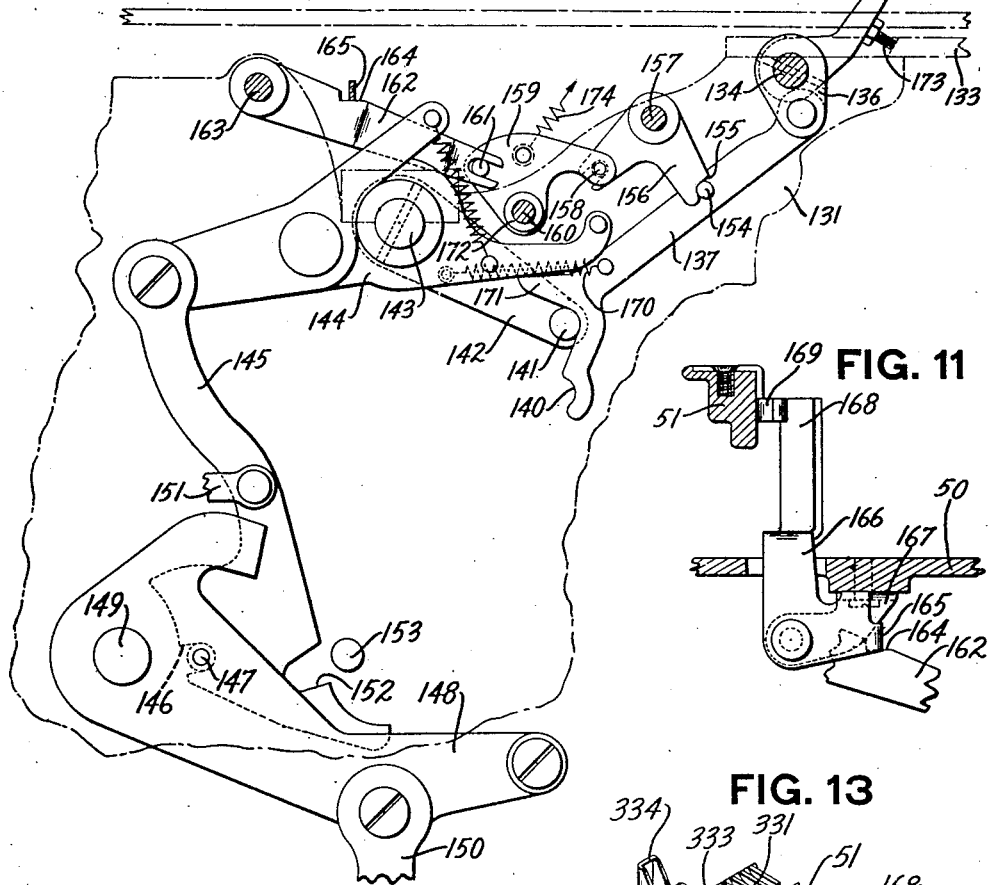
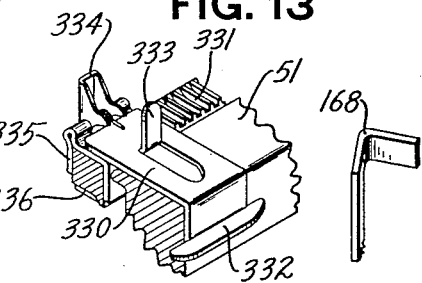
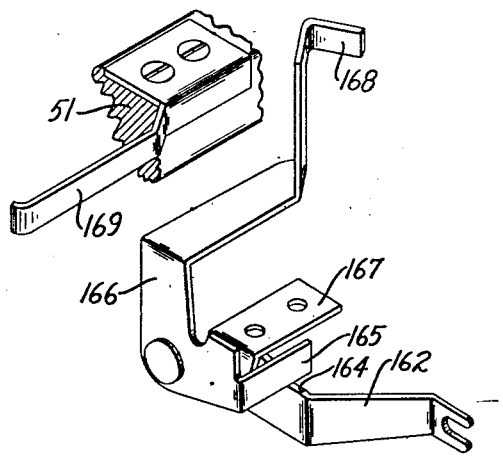
Inventor
Raymond A. Christian
By
His Attorney May 18, 1948. R. A. CHRISTIAN 2,441,870
FRONT FEED MECHANISM FOR CALCULATING MACHINES
Filed Jan. 27, 1933 24 Sheets-Sheet 6
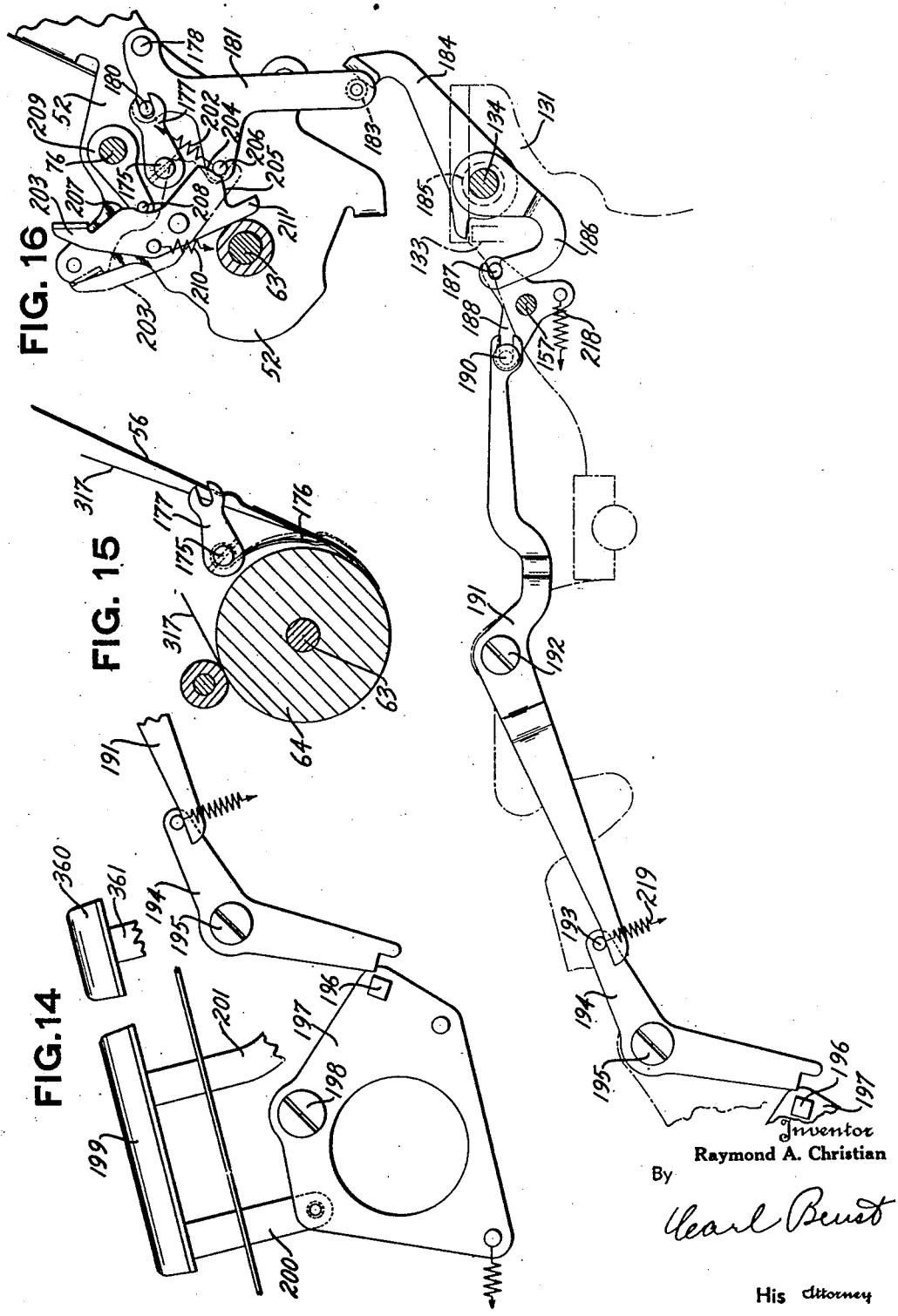
Inventor
Raymond A. Christian
By
Pearl Benst
His Attorney May 18, 1948.  R. A. CHRISTIAN  2,441,870
FRONT FEED MECHANISM FOR CALCULATING MACHINES
Filed Jan. 27, 1933  24 Sheets-Sheet 7
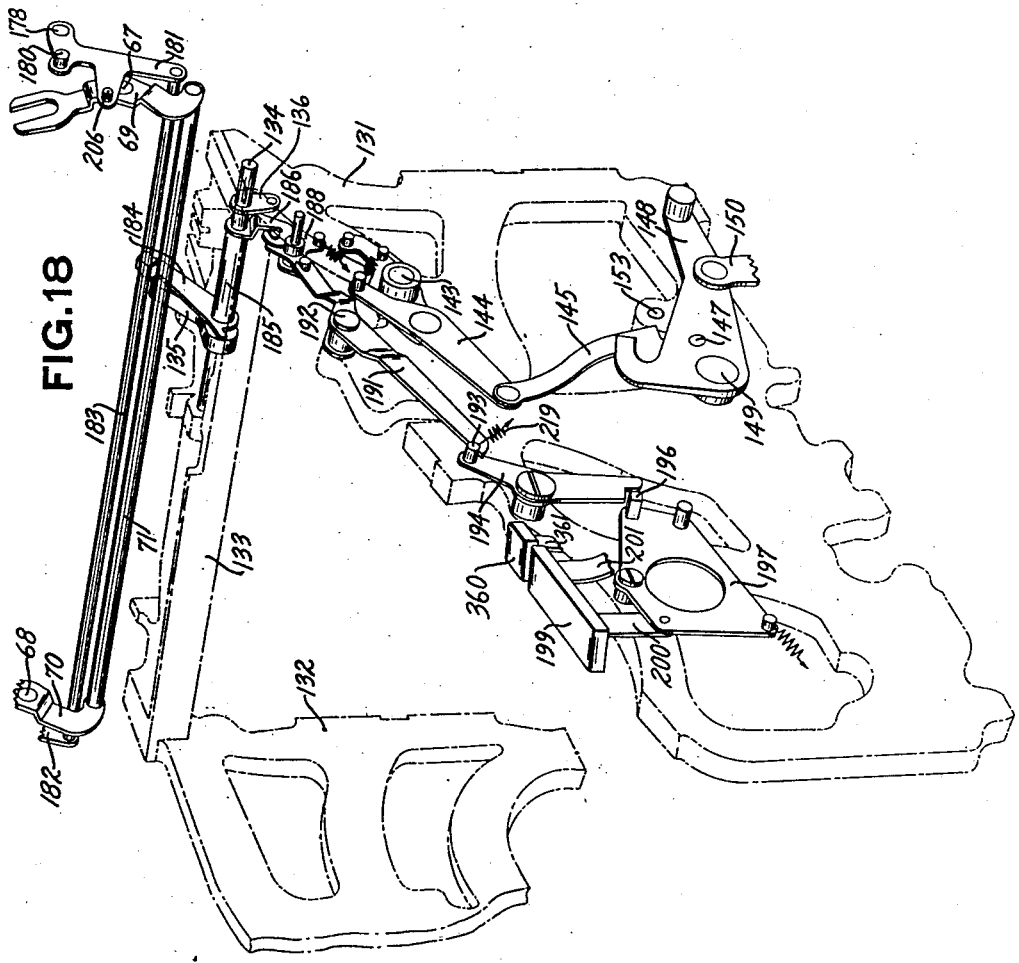
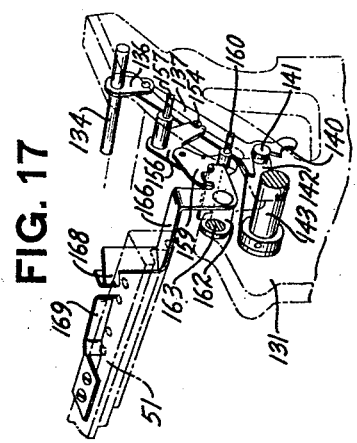
Inventor
Raymond A. Christian
By
His Attorney

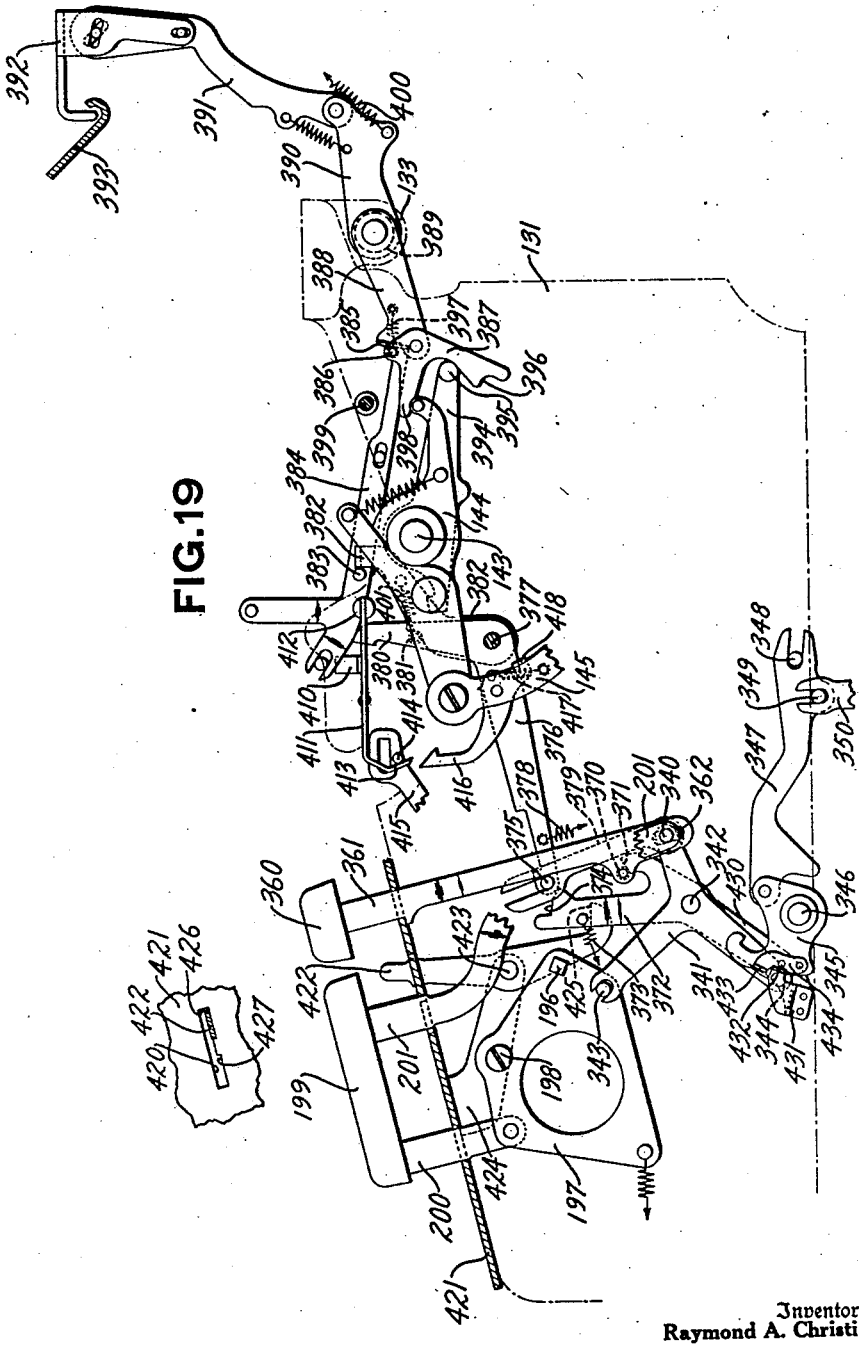

May 18, 1948. R. A. CHRISTIAN 2,441,870
FRONT FEED MECHANISM FOR CALCULATING MACHINES
Filed Jan. 27, 1933 24 Sheets-Sheet 9

Inventor
Raymond A. Christian
By
Earl Beust
His Attorney

May 18, 1948.  R. A. CHRISTIAN  2,441,870

FRONT FEED MECHANISM FOR CALCULATING MACHINES

Filed Jan. 27, 1933  24 Sheets-Sheet 10

Inventor
Raymond A. Christian
By
His Attorney

May 18, 1948.    R. A. CHRISTIAN    2,441,870
FRONT FEED MECHANISM FOR CALCULATING MACHINES
Filed Jan. 27, 1933    24 Sheets-Sheet 11
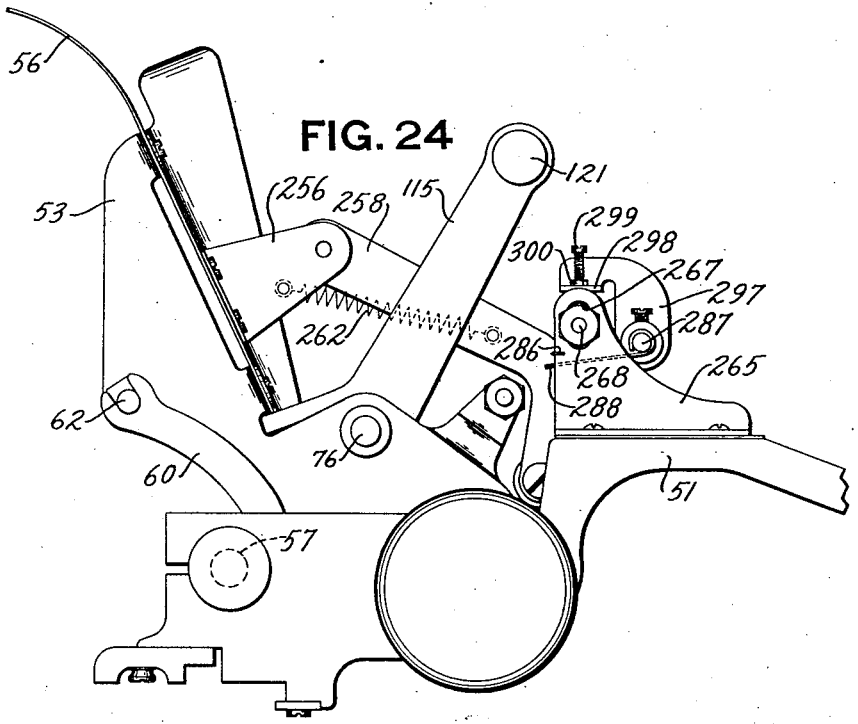
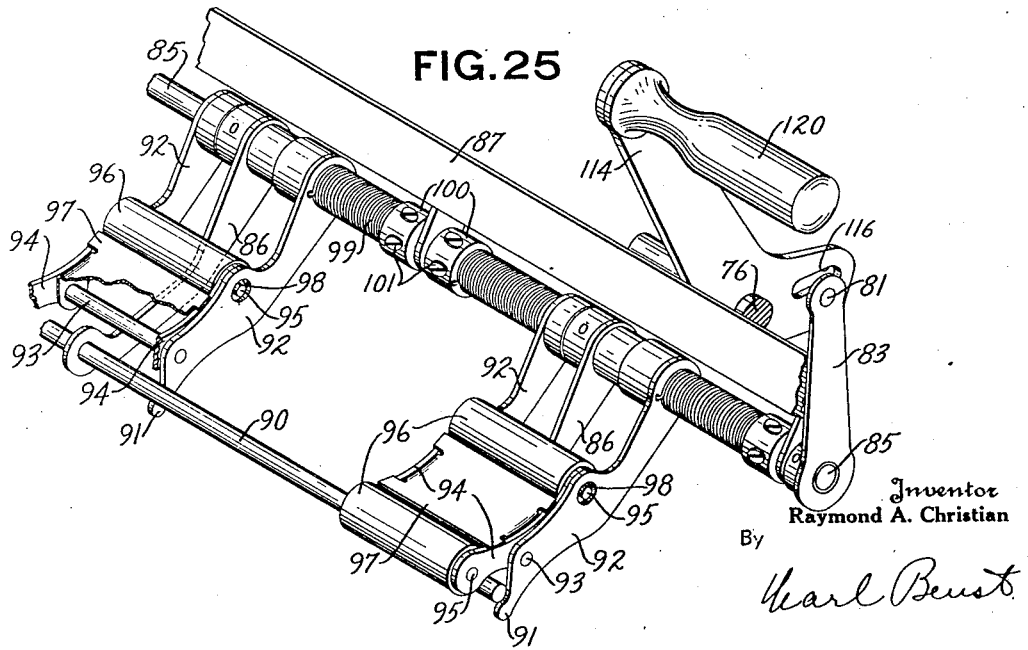
Inventor
Raymond A. Christian
By
His Attorney Inventor
Raymond A. Christian
By
Karl Bunst
His Attorney May 18, 1948. R. A. CHRISTIAN 2,441,870
FRONT FEED MECHANISM FOR CALCULATING MACHINES
Filed Jan. 27, 1933 24 Sheets-Sheet 13
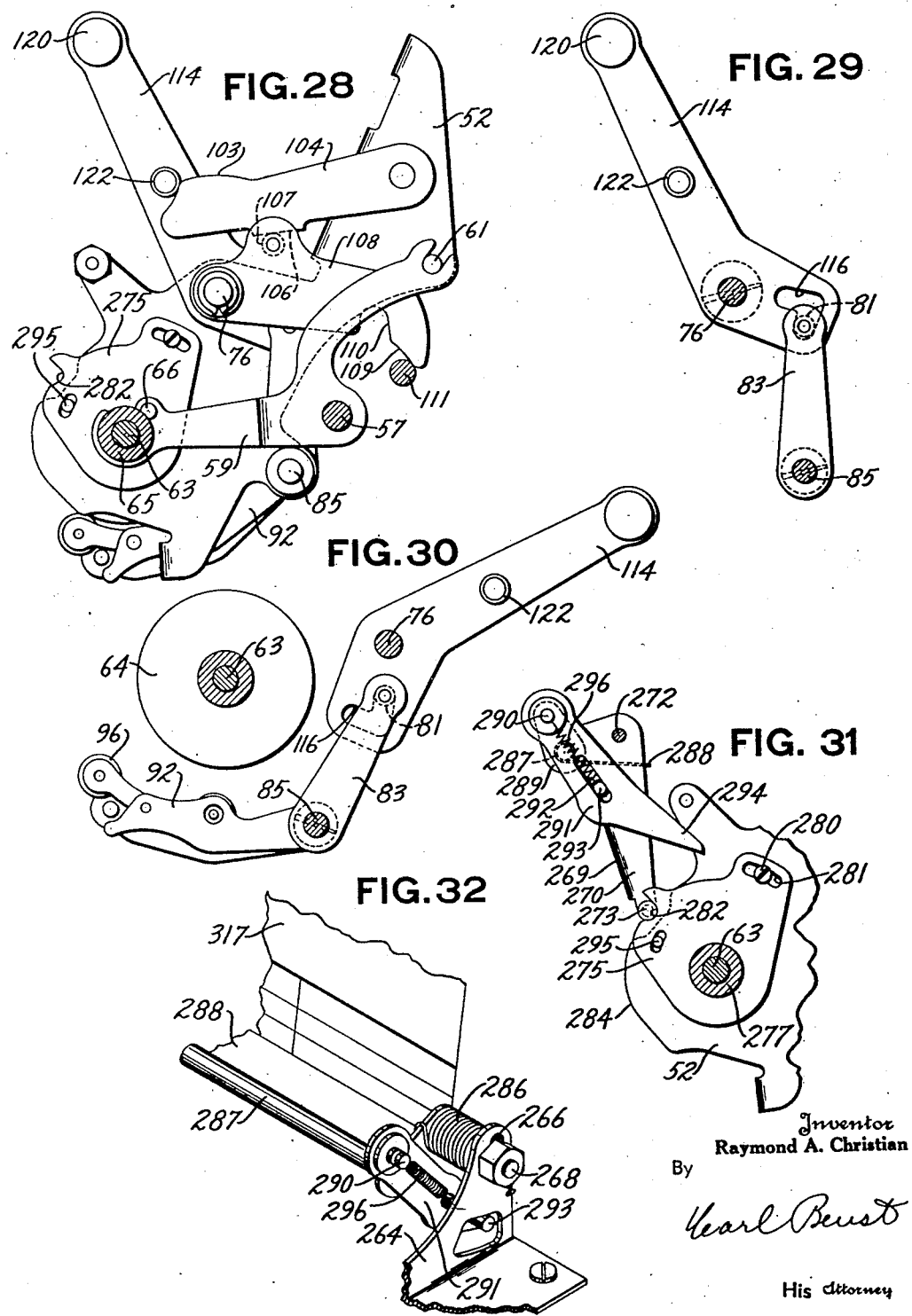
Inventor
Raymond A. Christian
By
Carl Beust
His Attorney May 18, 1948. R. A. CHRISTIAN 2,441,870
FRONT FEED MECHANISM FOR CALCULATING MACHINES
Filed Jan. 27, 1933 24 Sheets-Sheet 14
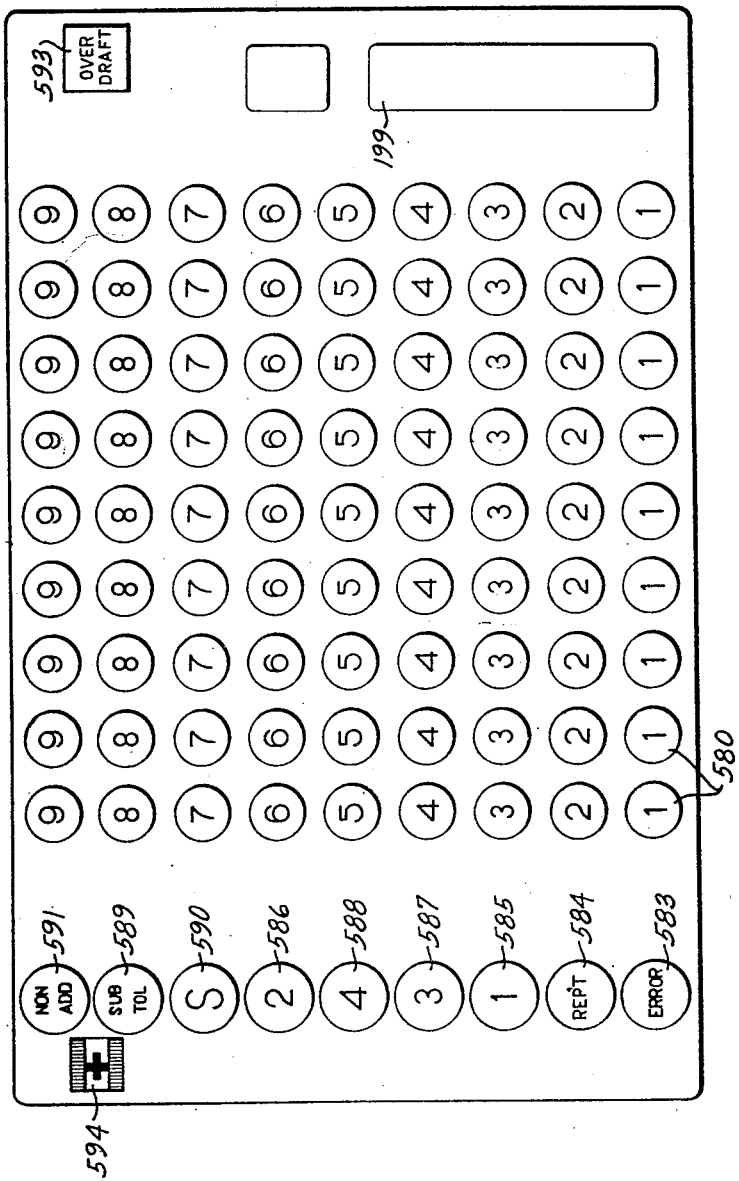
Raymond A. Christian
Inventor
By Carl Beust
His Attorney

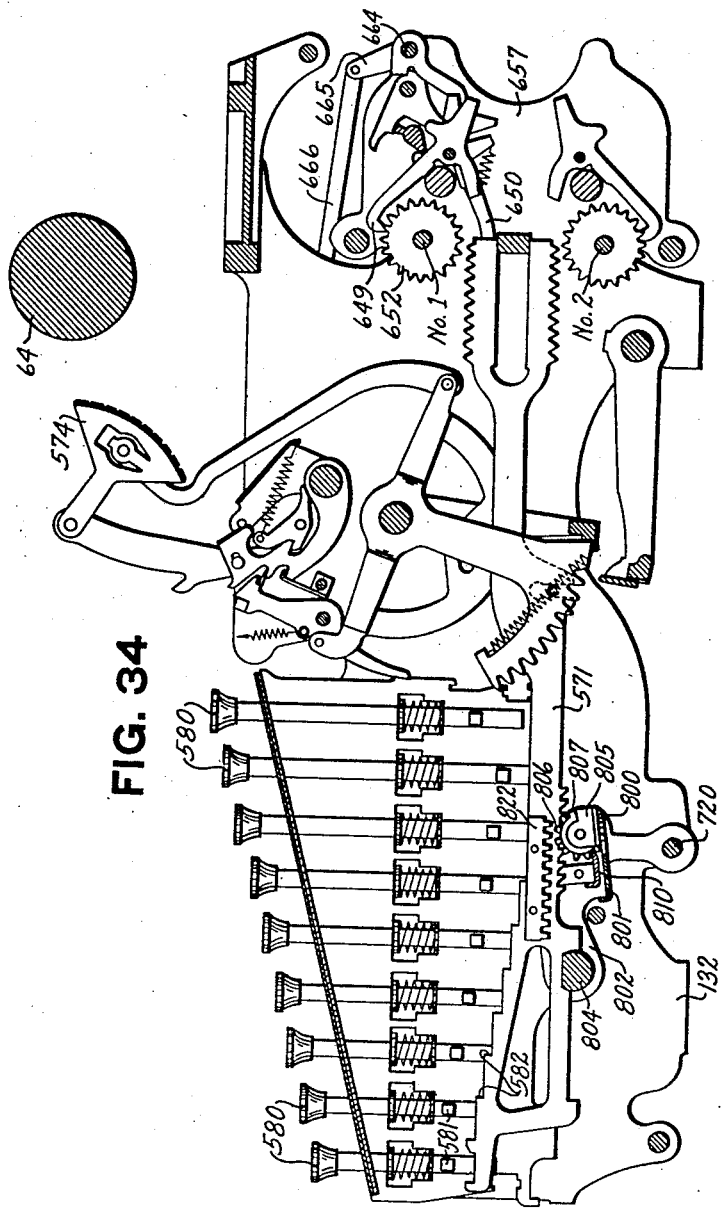

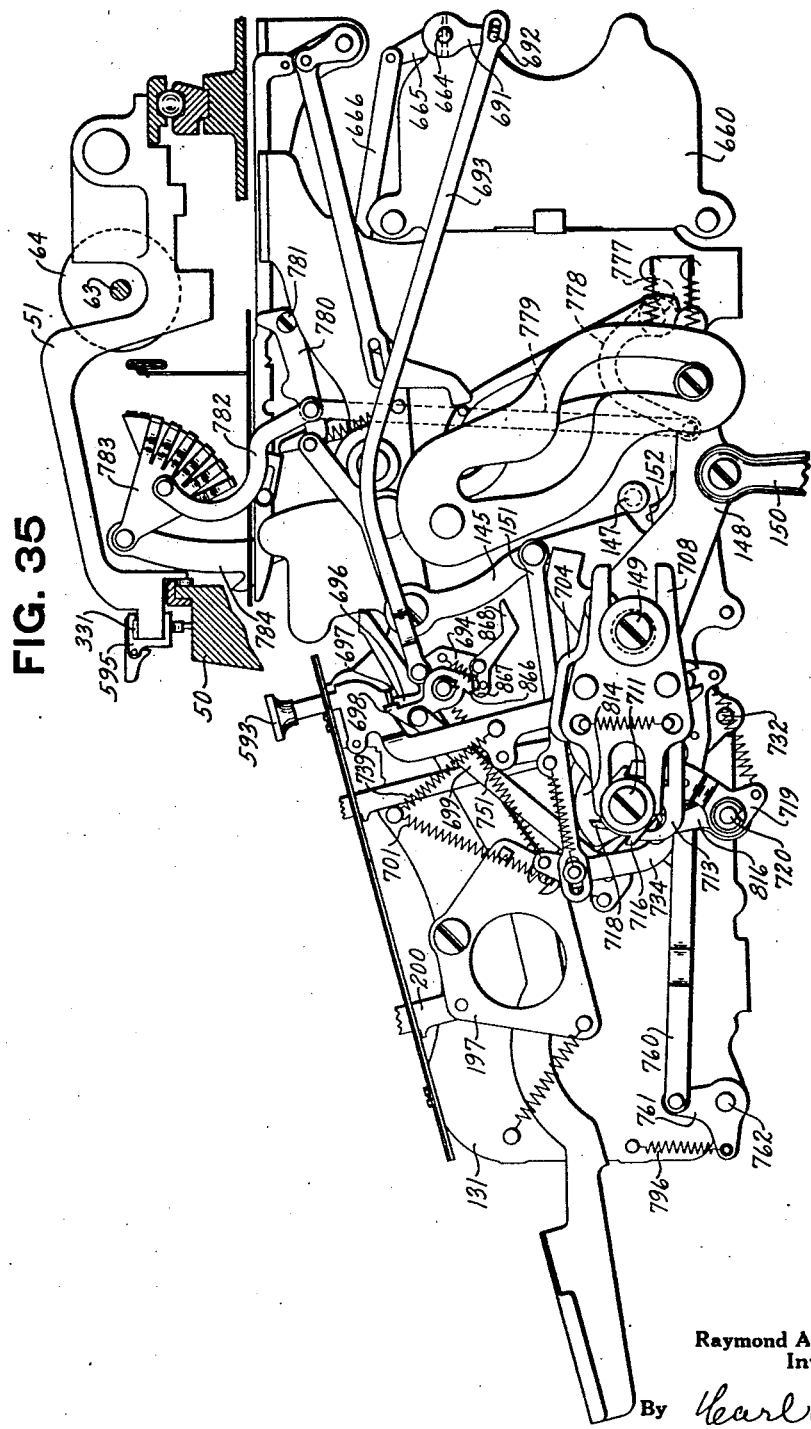

May 18, 1948. R. A. CHRISTIAN 2,441,870
FRONT FEED MECHANISM FOR CALCULATING MACHINES
Filed Jan. 27, 1933 24 Sheets-Sheet 17
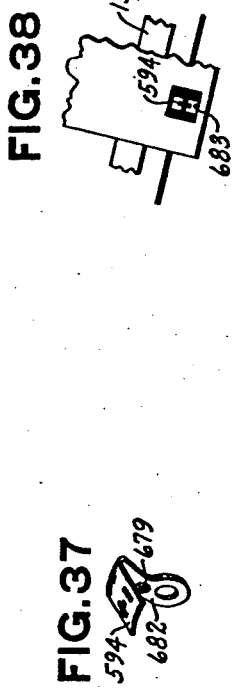
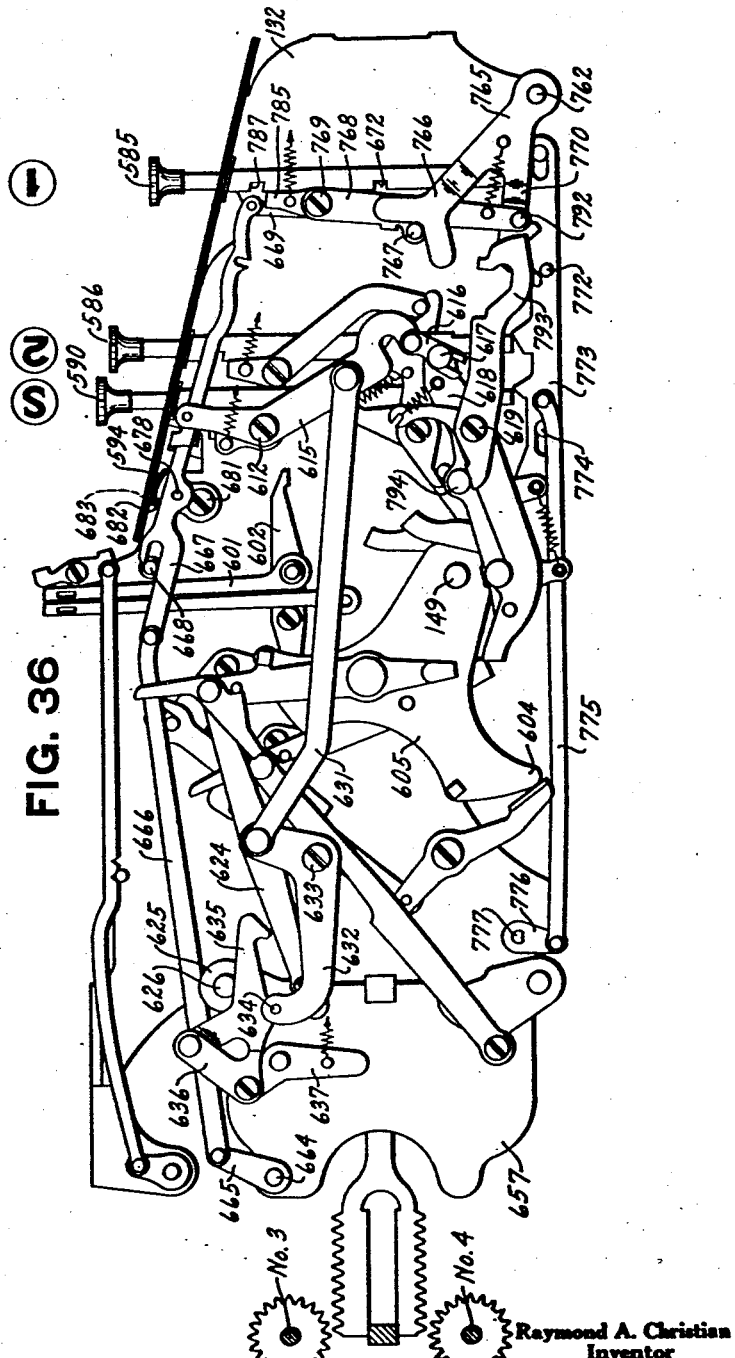
Raymond A. Christian
Inventor
By Earl Benst
His Attorney May 18, 1948.　　　R. A. CHRISTIAN　　　2,441,870
FRONT FEED MECHANISM FOR CALCULATING MACHINES
Filed Jan. 27, 1933　　　24 Sheets-Sheet 18

Raymond A. Christian
Inventor

By　Carl Berst
His Attorney

May 18, 1948.    R. A. CHRISTIAN    2,441,870
FRONT FEED MECHANISM FOR CALCULATING MACHINES
Filed Jan. 27, 1933    24 Sheets-Sheet 19

Raymond A. Christian
Inventor
By Carl Beust
His Attorney

May 18, 1948.  R. A. CHRISTIAN  2,441,870
FRONT FEED MECHANISM FOR CALCULATING MACHINES
Filed Jan. 27, 1933  24 Sheets-Sheet 20

Raymond A. Christian
Inventor
By *Earl Benst*
His Attorney

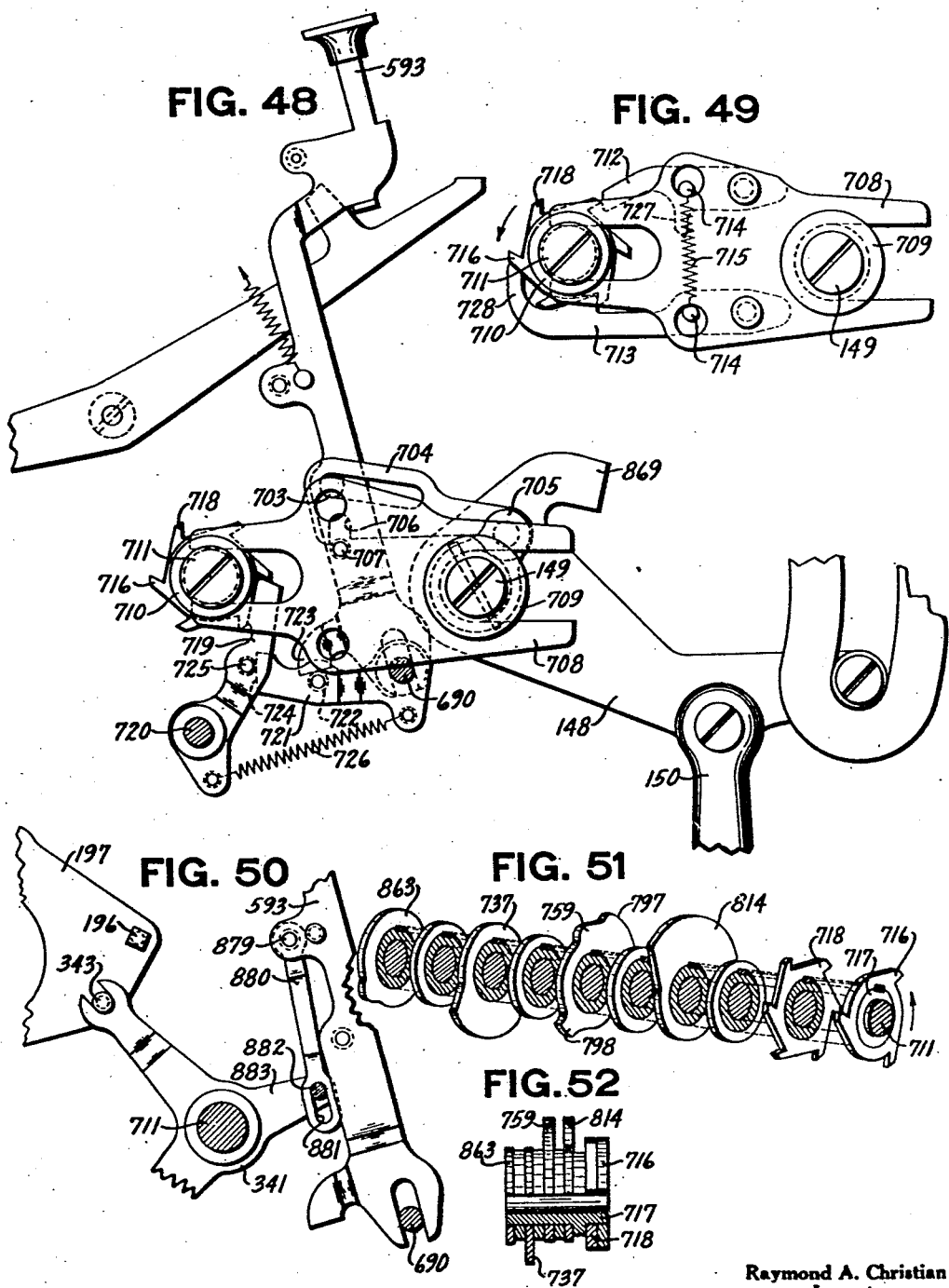

May 18, 1948. R. A. CHRISTIAN 2,441,870
FRONT FEED MECHANISM FOR CALCULATING MACHINES
Filed Jan. 27, 1933 24 Sheets-Sheet 23
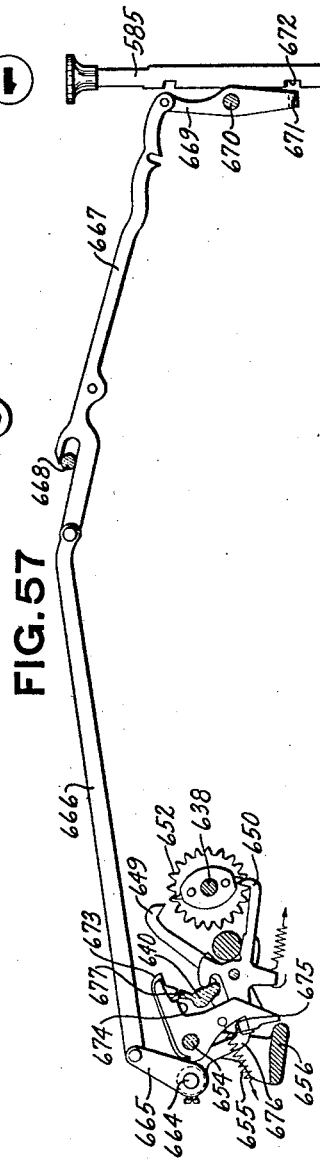
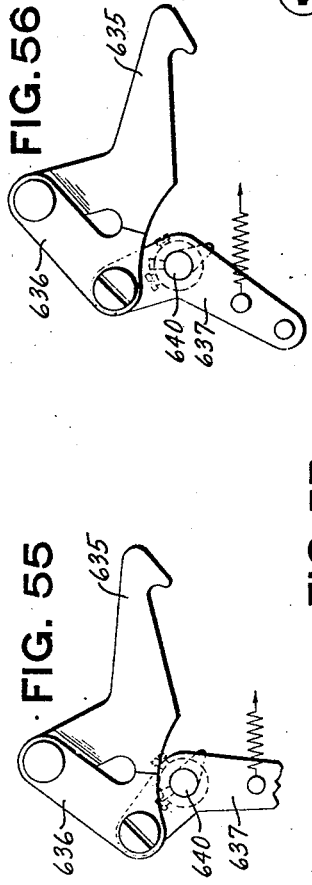
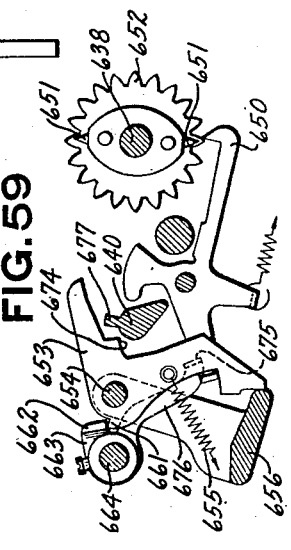
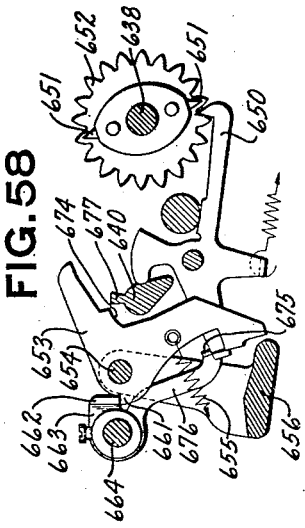
Raymond A. Christian
Inventor
By *Earl Beust*
His Attorney

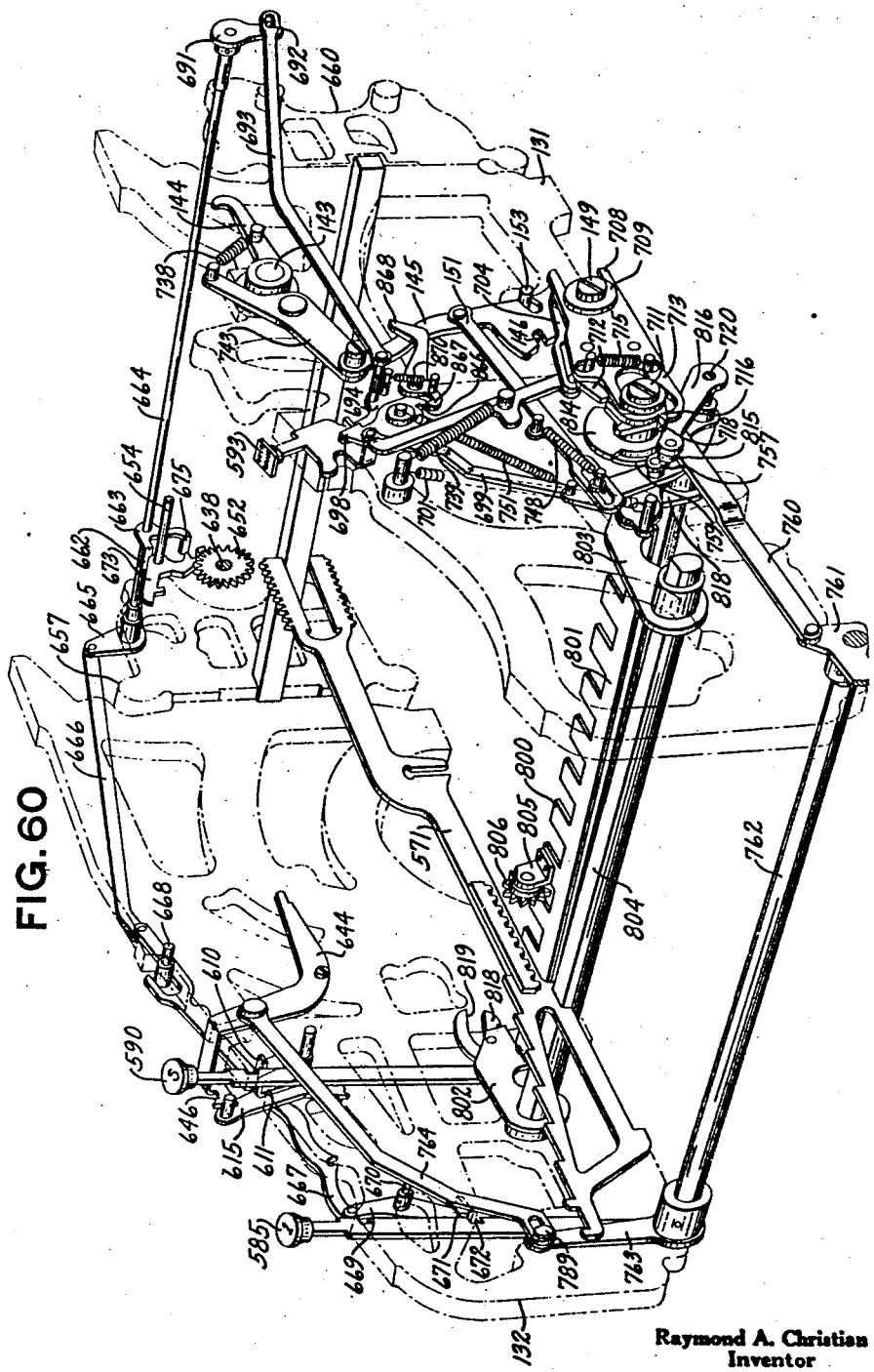

Patented May 18, 1948

2,441,870

UNITED STATES PATENT OFFICE 2,441,870

FRONT FEED MECHANISM FOR CALCULATING MACHINES

Raymond A. Christian, Dayton, Ohio, assignor to The National Cash Register Company, Dayton, Ohio, a corporation of Maryland Application January 27, 1933, Serial No. 653,838

77 Claims. (Cl. 235—58)

This invention relates to the recording mechanism of accounting machines and the like, but more particularly to the paper handling mechanism of such machines, which may include a laterally shiftable traveling carriage, a platen carried thereby, devices cooperating with said platen to form a front-feed throat, and suitable means for controlling the columnar positioning of the carriage.

One object of this invention is to provide novel and improved means for opening automatically the front-feed throat of an accounting machine to permit the ready insertion of material therein or its removal therefrom.

Another object of the present invention is to provide novel and improved means for rocking the platen of an accounting machine automatically away from printing position to open the front-feed throat and permit the ready removal of material therefrom or its insertion therein.

Another object of this invention is to provide means, driven by the motor of the accounting machine, for opening automatically the front-feed throat thereof, while the paper carriage is stationary in a columnar position.

A further object of this invention is to provide a mechanism, driven by the motor drive for the accounting machine, for rocking automatically the platen away from printing position, while the paper carriage is stationary in a columnar position.

Another object of the present invention is to provide means, actuated by the motor that imparts cycles of operation to the accounting machine, for opening a front-feed throat automatically in the course of a machine operating cycle.

A further object of this invention is to provide a mechanism, actuated by the motor of the accounting machine, for rocking automatically the platen away from printing position during a machine cycle imparted to the machine by said motor.

Another object of the present invention is the provision of means carried by the paper carriage for controlling the automatic opening of a front-feed throat while the carriage is stationary in a predetermined columnar position.

A further object of the invention is the provision of a device carried by the carriage for controlling the rocking of the platen away from printing position while the carriage is stationary and in any one of a plurality of positions depending upon the position occupied by said device.

A further object of this invention is to provide means, under the joint control of the paper carriage and a total key, for opening the front-feed throat automatically while the carriage is stationary in a columnar position.

Another object of this invention is to provide means for opening a front-feed throat automatically, that is actuated by direct driving connections with an electric motor.

A further object of the present invention is to provide, in an accounting machine having means for causing the machine to operate through several successive cycles, in the last of which a true negative total is printed, mechanism for opening a front-feed throat automatically in the course of a machine cycle and means for rendering said mechanism ineffective during all but the last of said several cycles.

Another object is to furnish means for rotating the platen while it is being rocked away from printing position, in order to feed the material wound there-around.

Still another object is to supply means controlled by the platen rocking means for locking the platen when out of printing position.

A further object is to provide means controlled by the locking movement of the rocking means for releasing the platen pressure rolls after the platen has completed its movement away from printing position and for reengaging the pressure rolls before said platen starts its movement back into printing position.

A still further object is to supply means for detaining the platen in printing position so that it will not be disturbed by the feeding and printing mechanism.

Another object is to furnish means for locking the machine releasing mechanism when the platen is away from printing position.

Still another object is to provide means for locking the machine releasing means when the end of the paper being fed around the platen nears the printing line, said locking means embracing an on-and-off member for rendering it effective or ineffective at will.

A further object is to provide means for returning and retaining the on-and-off member for the above machine release locking means in off position when the platen is moved away from printing position.

With these and incidental objects in view, the invention consists of certain novel features of construction and combinations of parts, the essential elements of which are set forth in appended claims and a preferred form of embodiment of which is hereinafter described with reference to the drawings which accompany and form part of this specification.

Of said drawings:

Fig. 10 is a right side elevation picturing the mechanism for automatically rocking the platen out of printing position.

Fig. 11 is a detail view in side elevation showing the mechanism for rendering effective the platen rocking mechanism.

Fig. 12 is a perspective view illustrating in detail the mechanism for rendering effective the platen rocking mechanism.

Fig. 13 is a perspective view illustrating an additional, movable means for rendering effective the platen rocking mechanism.

Fig. 14 is a detail view of the machine releasing mechanism and its latch.

Fig. 15 is a sectional view of the platen illustrating in detail the feeler arm mechanism, which in connection with other mechanism locks the machine releasing means when the bottom edge of the work sheet being fed by the platen nears the printing line.

Fig. 16 is an elevation as observed from the right, showing the mechanism for locking the machine releasing means when the traveling carriage is rocked out of printing position or when the end of paper being fed by the platen nears the printing line.

Fig. 17 is a perspective view picturing the mechanism for effectively coupling the main operating means to the platen rocking means when the traveling carriage is tabulated to predetermined position.

Fig. 18 is a perspective view showing in phantom the two main frames of the machine and one of their connecting cross frames. This figure also illustrates the machine releasing mechanism and its interlocks, and the mechanism for automatically rocking the platen out of printing position.

Fig. 19 is a view showing portions of the vertical feed mechanism, the machine releasing means, the tabulating mechanism, and the means for controlling the tabulating mechanism to render it ineffective when desirable.

Fig. 24 is a left side elevation picturing the modified form of platen rocking mechanism.

Fig. 25 is a perspective view illustrating the platen pressure roll mechanism.

Fig. 28 is a right side elevation omitting the traveling carriage frame and shows the platen rocking and locking mechanism.

Fig. 29 is a detail view of the platen operating lever and the pressure roll release arm.

Fig. 30 is a sectional view taken just inside the right hand platen carrying frame end plate, showing in detail the platen operating lever and the pressure roll release mechanism.

Fig. 31 is a detail view showing the manner in which the platen is retained in normal position and the manner in which the line finding mechanism of the modified form is moved to ineffective position when the platen is rocked out of printing position.

Fig. 32 is a fragmentary perspective view depicting the use of the modified form of line finding mechanism.

Fig. 33 is a plan view showing the layout of the keyboard.

Fig. 34 is a section through the machine taken to the right of an amount bank looking toward the left, showing the location of the auxiliary differential.

Fig. 35 is an elevation of the right-hand side of the machine with case removed.

Fig. 36 is an elevation of the left side of the machine with case removed.

Fig. 37 is a perspective view of the overdraft indicator.

Fig. 38 shows the location of the overdraft indicator as observed from above the keyboard.

Fig. 42 is a view in perspective of the auxiliary differential.

Fig. 43 pictures in detail part of the engaging mechanism for the auxiliary differential.

Fig. 44 is a detail of the auxiliary differential engaging cam.

Fig. 45 illustrates the method of stopping the auxiliary differential wheels at zero.

Figure 46:
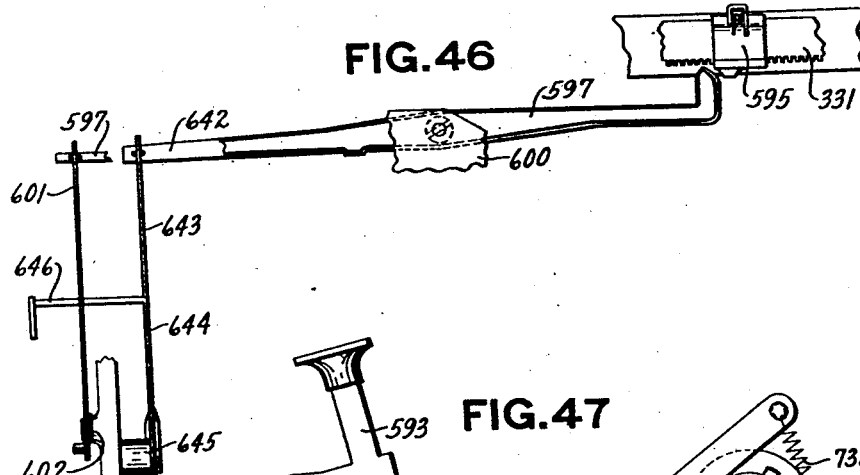

Fig. 46 is a detail view showing a fragment of the carriage stop bar with a stop in place thereon, and an add and subtract hanging bar lever.

Figure 47:
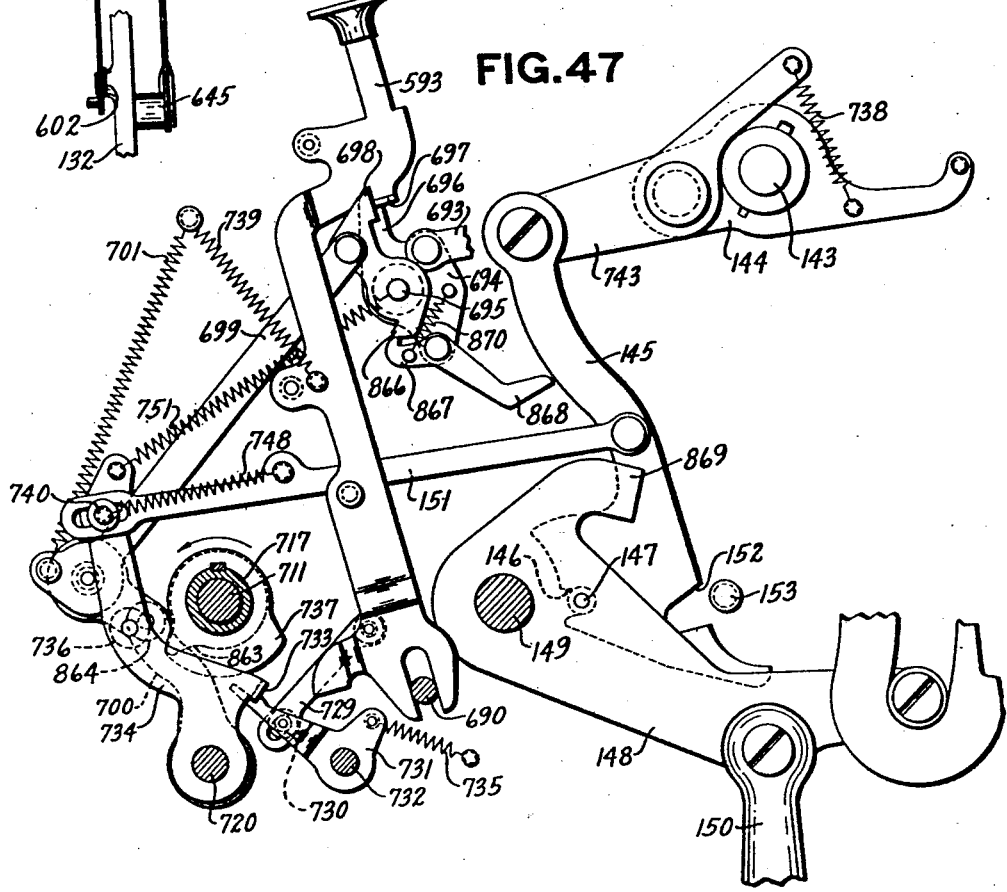

Fig. 47 illustrates in detail part of the overdraft mechanism.

Fig. 48 pictures in detail the method of driving the overdraft cam line.

Fig. 49 is a detail of the overdraft cam line driving pitman.

Fig. 50 is a view in detail showing the overdraft machine release mechanism.

Fig. 51 is a disunited perspective picturing the overdraft cam line.

Fig. 52 is a sectional view of the overdraft cam line.

Figure 53:
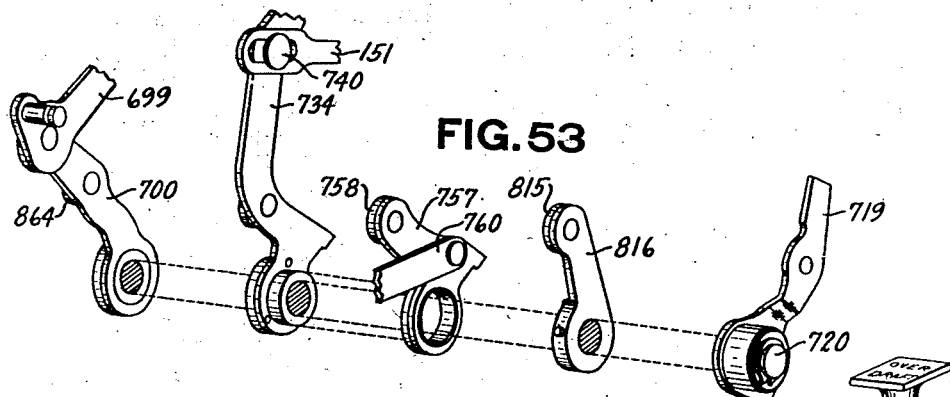

Fig. 53 is a section disunited perspective view of the overdraft operating mechanism.

Figure 54:
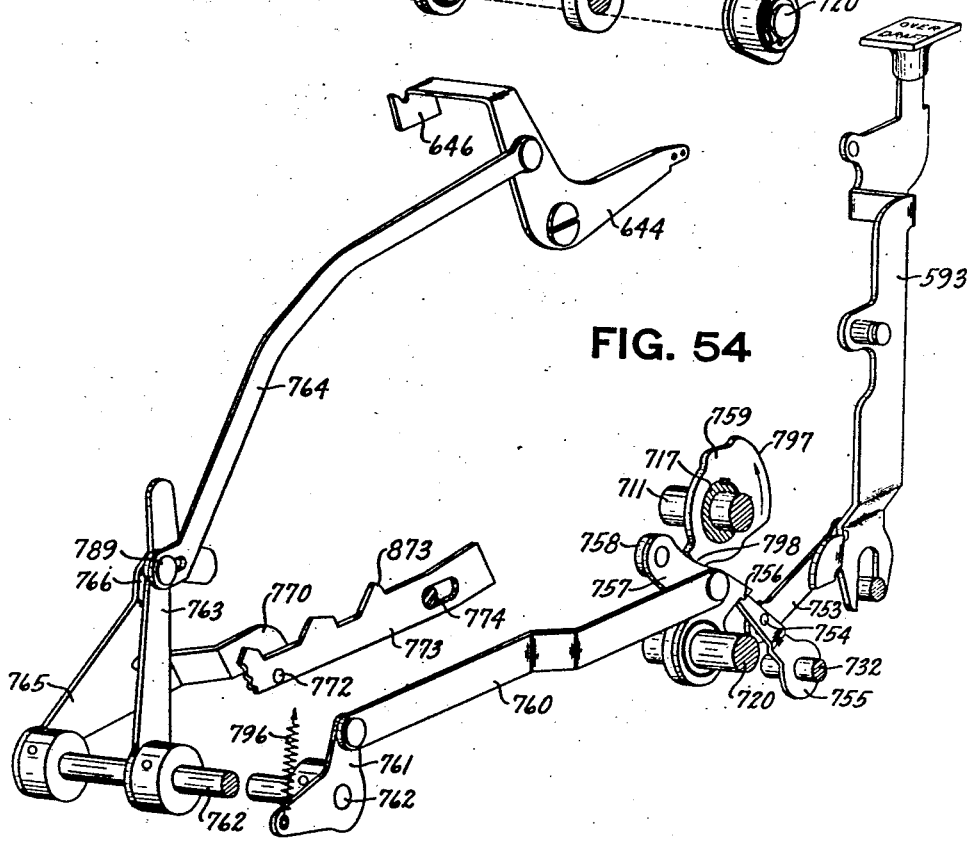

Fig. 54 is a perspective view of the subtract totalizer overdraft control mechanism.

Fig. 55 is a detail view of the subtract totalizer shifting line in its add position.

Fig. 56 is a detail view of the subtract totalizer shifting line in subtract position.

Fig. 57 is a detail in reduced scale of the overdraft locking mechanism by the total key of the subtract totalizer.

Fig. 58 is a full-size detail of the locking mechanism shown in Fig. 57 prior to being tripped.

Fig. 59 is an illustration of the mechanism shown in Fig. 58 after being tripped by an overdraft occurring in the add-subtract totalizer.

Fig. 60 is a perspective view showing the automatic overdraft controlling mechanisms and their relations to the machine side frames, the latter being shown in phantom.

In the figures showing the frame work in phantom by dot and dash lines, where the dot and dash lines do not show behind the parts it indicates that such parts are in front of the frames, but where the dot and dash lines are shown crossing the full line parts it indicates that such parts are behind the frames.

GENERAL DESCRIPTION

The instant invention is shown applied to the well known Ellis accounting machine, which has a plurality of numeral keys, depression of which positions slidable racks for the several totalizers and printing mechanism.

The keyboard is arranged substantially the same as other adding machine keyboards, and has a plurality of control keys which select the different totalizers for particular operations and a plurality of amount keys for properly positioning the totalizer actuating racks in add, non-add, and subtract operations.

An overdraft indicator is visibly mounted beneath the keyboard and shows at all times whether the add-subtract totalizer is in a positive or negative condition.

An auxiliary storage differential has been incorporated in the present machine and is arranged to cooperate with the actuator racks during an overdraft operation. The complement of the overdraft is first transferred from the add-subtract totalizer to the auxiliary storage differential. This complement is then subtracted from the cleared add-subtract totalizer, which results in the positive setting up of the amount of the overdraft.

An overdraft key is conveniently located on the upper right-hand corner of the keyboard and is arranged to exercise complete control over the machine during overdraft operations. Depression of this key causes the machine to automatically operate through the three cycles necessary in overdraft operations in order to transpose a negative overdraft into a positive amount and to print such positive amount and to open the front-feed throat after the amount of an overdraft has been printed. Depression of the overdraft key also causes the printing mechanism to be disabled for the first and second cycles of an overdraft operation and effectively engages the auxiliary differential with the actuator racks.

In totalizing operations the totalizer wheels of the selected totalizer position the slidable racks commensurate with the amount standing in said totalizer, the slidable racks in turn positioning the printing segments accordingly.

Considering the fact that the Ellis machine is well known, that is, its basic principles of operation, it is felt unnecessary to go into a detailed description thereof at this time. Therefore, in this application only the mechanism pertinent to the instant invention will be described in detail. However, for a detailed description of the entire machine, reference may be had to the following United States patents: Nos. 1,197,276 and 1,197,278, issued September 5, 1916, to Halcolm Ellis; No. 1,203,863, issued November 7, 1916, to Halcolm Ellis; No. 1,819,084, issued August 18, 1931, to Emil John Ens; and No. 2,038,717, issued April 28, 1936, to the present applicant.

In large business concerns where credits and debits are constantly being made on individual accounts and in banking institutions where deposits are being constantly added to and checks subtracted from the balances of individual depositors, it is customary to use an accounting or bookkeeping machine such as the Ellis in the calculation of these individual accounts. In such concerns it is the practice, as a general rule, to check or balance each individual account daily.

Let us take, for example, the case of a bank. The system usually employed provides a ledger sheet for each depositor upon which the daily balancing of his account takes place. A record of the day's work is generally kept on a record or journal sheet, which together with its superimposed carbon is first wound around the platen roll. As the record sheet remains in the machine during the entire run, it is inserted at the rear thereof and fed around the platen by means of pressure rolls until its top edge passes beyond the printing line in the customary manner. As there are generally a large number of accounts to balance, and consequently a large number of ledger sheets to be handled, it is necessary that means be provided whereby these ledger sheets may be quickly inserted around the platen roll, located in relation to the printing line and, after the balancing operation is completed, quickly removed from the machine with the least amount of effort possible on the part of the operator.

To accomplish this result the machine of the instant invention in its preferred form has been provided with a shiftable platen which is automatically rocked or tilted upwardly away from the printing line to a more accessible or front feeding position while the traveling carriage is stationary in a predetermined columnar position. Simultaneously with the rocking of the platen away from printing position the front feed guide chute is rocked into guiding position and after the platen has completed its movement away from printing position the pressure rolls are automatically disengaged from the platen roll and the material wound therearound. The ledger sheet may now be removed by pulling it from around the platen, and another ledger sheet may then be inserted in the front feed guide chute, pushed around the platen roll until the proper line is located by means of the line finding device, after which the platen is returned to printing position by a hand return lever conveniently located on the traveling carriage frame.

Insertion and removal of ledger sheets does not disturb the record sheet and its super-imposed carbon, as they are held in contact with the platen by auxiliary pressure rolls which are not released when the platen is rocked away from printing position.

An interlock has been provided between the platen and the machine releasing mechanism, which prevents operation of the machine when the platen is out of printing position. When the end of the record or journal sheet nears the printing line, a feeler mechanism automatically locks the machine against operation. The insertion of a new record sheet renders ineffective the locking mechanism, allowing the machine to be operated.

The machine, to which the present invention is shown as applied, is illustrated in the hereinbefore mentioned United States Letters Patent and particularly in Letters Patent issued to applicant, No. 2,038,717, and has a tabulating mechanism for controlling the positioning of the carriage to the several columns on the work sheets. The regular vertical feeding mechanism is used to feed the work sheets for line spacing.

At certain times during the course of a bank's business, such as when transferring balances on the first of the month it is more convenient to use the larger motor or release bar than to reach for the smaller vertical feed bar. Therefore, a special manipulative lever is provided to effect a control over said larger release bar, whereby depression thereof effects a vertical feed or line spacing movement of the platen in lieu of the regular lateral tabulating shift of the carriage.

The present invention also provides for a movable device or stop which may be placed on the carriage where desirable to control the mechanism to automatically rock the platen away from printing position at each operation, or in other words each time a new sheet is put in the machine to receive the last or transferred balance from the old sheet.

It is during such operations, that is, the transferring of balances to the new monthly statement sheets, that it is more convenient to release the machine with the regular release bar, which is larger and located nearer the front of the machine than the "vertical feed" bar, and therefore, the above mentioned special manipulative lever is provided to render ineffective the tabulating of the carriage, usually caused by said regular release bar, and to cause an operation of the line spacing mechanism when such special manipulative lever is moved into a certain one of its positions of adjustment.

From the above statements it can be clearly seen that the automatic "opening of the throat" or rocking of the platen away from printing position takes place during the regular cycle of operation of the machine and while the carriage is stationary. It does not require any lateral motion of the carriage to effect such rocking of the carriage.

A modified form of mechanism is shown in which the platen is rocked out of and into printing position by hand. Much of this mechanism is a duplicate of that shown in the preferred form, therefore, such portions of the mechanisms which are identical will be treated simultaneously in the detailed description.

DETAILED DESCRIPTION

KEYBOARD

Amount keys

The keyboard of the present machine is similar to that of former Ellis machines, and has a plurality of amount keys, 580 (Figs. 33 and 34) arranged in rows, each of which constitutes a denominational group or bank, such as units of cents, tens of cents, etc. These keys are "flexible" in that after one key has been depressed in a certain row, the depression of another key in that row releases the one previously depressed, and so on. Each amount key 580 has secured therein a stud 581 adapted to cooperate with one of a plurality of steps 582, cut in the forward end of a rack 571, to position said racks in accordance with the amount keys depressed as explained above.

Control keys

Referring to Fig. 33, at the left of the keyboard is a row of keys adapted to control the selection and functions of the different totalizers.

An error key 583 is arranged to release any depressed amount or control key prior to release of the machine for operation, which automatically locks said error key against depression.

The repeat key 584 functions in the usual manner to prevent the automatic release of depressed amount keys in add, non-add, and subtract operations.

A series of keys 585, 586, 587, and 588 (Fig. 33) are total keys for the different totalizers and when used alone control the machine to clear the totalizer they represent. When one of the total keys is used in conjunction with a sub-total key 589, the totalizer is not left in a cleared position after reading as in total operations, but is restored to its original condition.

A subtract key 590 conditions the add-subtract totalizer for subtract operations.

A non-add key 591 operates in the usual manner to disable all the totalizers when it is desired to print an amount or number without having such amount or number stored in one of the totalizers.

On the right-hand side of the keyboard is a starting bar 199 which simultaneously releases the machine for operation and causes the paper wound on the platen to be either line-spaced or fed laterally from one column to the next, as the operator desires. The starting bar and mechanism connected thereto will be hereinafter explained in detail.

An overdraft key 593 (Figs. 33 and 60) located on the right of the keyboard is used to condition and release the machine for an overdraft operation. The manner in which this key functions will also be explained later in this specification.

Overdraft indicator

Mounted below the keyboard and visible through an opening therein is an overdraft indicator 594 (Figs. 33 and 36) which shows at all times the condition of the add-subtract totalizer. This indicator displays a plus sign when the add-subtract totalizer is not overdrawn and a minus sign when said totalizer is in an overdrawn condition. A detailed description of the mechanism which operates the overdraft indicator will be given later in this specification.

*Totalizer*

The machine in which the present invention is adapted to be incorporated may have two or four totalizers arranged vertically in a pair or pairs at the rear of the machine. For convenience these different totalizers will be numbered as has heretofore been the custom. The upper front totalizer will be called No. 1, the lower front No. 2 (Fig. 34), the upper rear No. 3, and lower rear No. 4 (Fig. 36).

In the instant machine the upper front or No. 1 totalizer is arranged for both add and subtract operations while the other three totalizers are adapted only for adding operations. As the manner in which the adding totalizers function is old in Ellis type of machine, it is thought unnecessary to go into further detail regarding them at this time. However, a brief explanation will now be given of the No. 1 add-subtract totalizer and the mechanism connected therewith.

Figure 40:
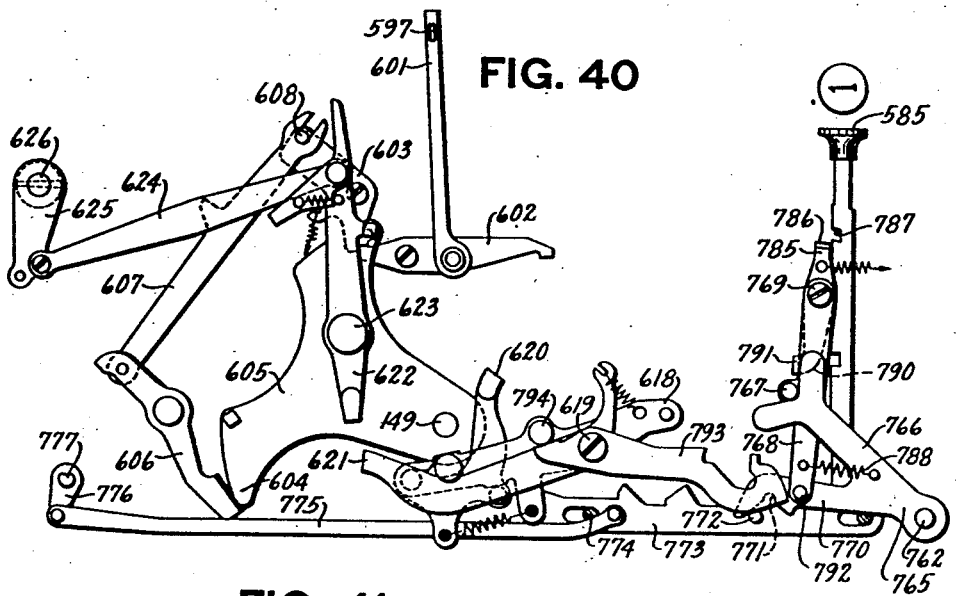
Fig. 40 is a detail of the automatic controlling mechanism for the overdraft totalizer.

In the present machine selection of the No. 1 totalizer for add operations may be made only by means of a series of stops 595 (Figs. 35 and 46) only one of which is here shown, spaced as desired on a tabulating stop bar 331 secured to a traveling carriage 51 slidably mounted on a machine case 50. In use, the traveling carriage is tabulated to a position where one of the stops 595 contacts the upturned end of an add hanging bar lever 597 (Fig. 46) pivotally mounted on a tabulating frame 600 to rock said lever clockwise. An add hanging bar 601 (Figs. 40 and 46) connects the hanging bar lever 597 to a controlling latch 602 pivoted to the left machine frame 132 to rock said latch counterclockwise to release an add controlling crank 603 (Fig. 40) to condition the No. 1 totalizer for an add operation. The controlling crank 603 is restored to normal position near the end of each machine operation by a nose 604 on an operating plate 605 secured to the shaft 149 contacting and rocking clockwise a lever 606. A pitman 607 is pivoted to the lever 606, its upper end being bifurcated to embrace a stud 608 fast in the controlling crank 603. Thus, the clockwise rocking of the lever 606 also rocks the controlling crank 603 clockwise until the latch 602 under spring tension re-engages said controlling crank 603 to retain it in home position.

Figure 39:
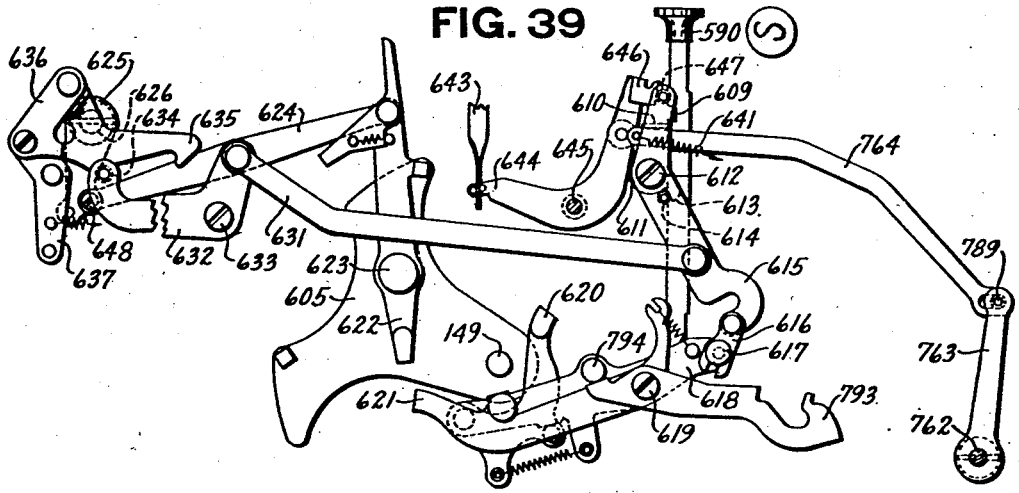
Fig. 39 is a view showing in detail the subtract control and operating mechanism.

The No. 1 totalizer may be conditioned for subtract operations either by depression of the subtract key 590 (Fig. 33) or by arranging stops on the tabulating stop bar 331 (Figs. 35 and 46). Referring to Figs. 36 and 39, the subtract key 590 has therein a notch 609 adapted to receive an ear 610 bent on a latch 611 pivoted on a stud 612 carried by the left machine frame 132. A projection 613 on the latch 611 cooperates with a stud 614 fast in a toggle lever 615 also pivoted on the stud 612. Pivoted on the lever 615 is an arm 616 having an open-ended slot through which extends a stud 617 fast in a lever 618 (Figs. 39 and 40) pivoted on a stud 619 fast in the frame 132.

Figure 41:
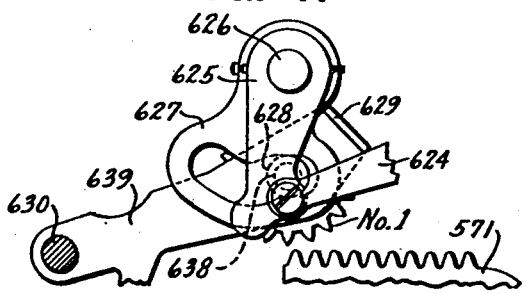
Fig. 41 is a detailed view of the totalizer engaging cam.

A pair of flexibly mounted pawls 620 and 621 carried by the lever 618 are arranged to cooperate with the lower end of a flying lever 622 pivoted on a stud 623 carried by the operating plate 605. A link 624 pivotally connects the lever 622 to a crank 625 secured to a shaft 626 journaled in a pair of totalizer frames 657 and 660 (Fig. 60). Secured on the shaft 626 is a pair of cams 627 (only one shown, Fig. 41) each adapted to cooperate with a roller 628, one being loosely assembled on each end of the No. 1 totalizer shaft 638. Two arms 639, one only here shown, connected by a bail 629 and pivoted on a pair of studs 630 secured in the totalizer frames 657 and 660, form a rockable frame for supporting the add-subtract totalizer shaft 638.

A link 631 (Figs. 36 and 39) pivotally connects the lever 615 to another lever 632 pivoted at 633 to the left machine frame 132. Fast in an arm of the lever 632 is a stud 634 arranged to cooperate with the lower edge of a shift bar operating latch 635. The latch 635 is flexibly connected to an arm 636 pivoted to a bell crank 637 secured to a shift bar shaft 640 journaled in the totalizer frames 657 and 660.

Depression of the subtract key 590 causes the latch 611 and lever 615 under tension of a spring 641 to rock clockwise, thus rocking the levers 615 and 618 clockwise to place the pawls 620 and 621 in the path of the flying lever 622. Contact of the flying lever 622 with the pawl 621, caused by the initial movement clockwise of the operating plate 605, through the link 624 (Fig. 41) and crank 625, turns the shaft 626 and cams 627 counter-clockwise to properly engage the No. 1 totalizer wheels with the actuator racks 571 for a subtract operation. The rocking of the lever 615 (Fig. 39) also displaces the stud 634, allowing the latch 635 to drop into position to be drawn forwardly by the stud 648 to set the transfer mechanism for a subtract operation in the usual manner. The return or counter-clockwise movement of the operating plate 605 causes the flying lever 622 to engage the pawl 620 to rock the shaft 626 and cams 627 clockwise to disengage the No. 1 totalizers from the actuator racks.

Likewise the proper setting of one of the stops 595 on the tabulating stop bar 331 (Figs. 35, 39, and 46), when the traveling carriage is tabulated to a particular position, will rock a subtract hanging bar lever 642 clockwise. A subtract hanging bar 643 pivotally connects the lever 642 to an arm of a subtract operating lever 644 pivoted at 645 to the left machine frame 132. An arm 646 of the lever 644 is bent twice at right angles to straddle the left machine frame and cooperates with a stud 647 (Fig. 39) secured in the lever 615. Thus the clockwise rocking motion of the lever 642 is transmitted to the lever 644 and then to the lever 615, rocking the latter clockwise independently of the latch 611. This causes the No. 1 totalizer to be properly engaged with and disengaged from the actuator rack 571 in the same manner as the depression of the subtract key 590 previously explained.

Rocking the lever 615 clockwise either by depressing the subtract key 590 (Fig. 39) or by means of the traveling carriage 51, through the link 631 rocks the lever 632 counter-clockwise thus allowing the hook on the arm 635 to move into the path of a stud 648 carried by the crank 625. Initial movement clockwise of the plate 605, as previously explained, through the flying lever 622 and link 624 will now rock the crank 625 counter-clockwise causing the stud 648 to engage to hook-shaped arm 635 and rotate the shaft 640 from the position shown in Fig. 55 to that shown in Fig. 56. This clockwise movement of the shaft 640 shifts a series of adding pawls 649 (Figs. 34 and 57) to ineffective positions, shifts a plurality of subtracting pawls 650 to effective positions, and also shifts the carrying sector spring bail (not shown) to a position where the carrying sectors will be engaged by the subtract portion of a cam slot in a series of carrying cams (not here shown).

DETAILED DESCRIPTION

Platen rocking mechanism

Figure 1:
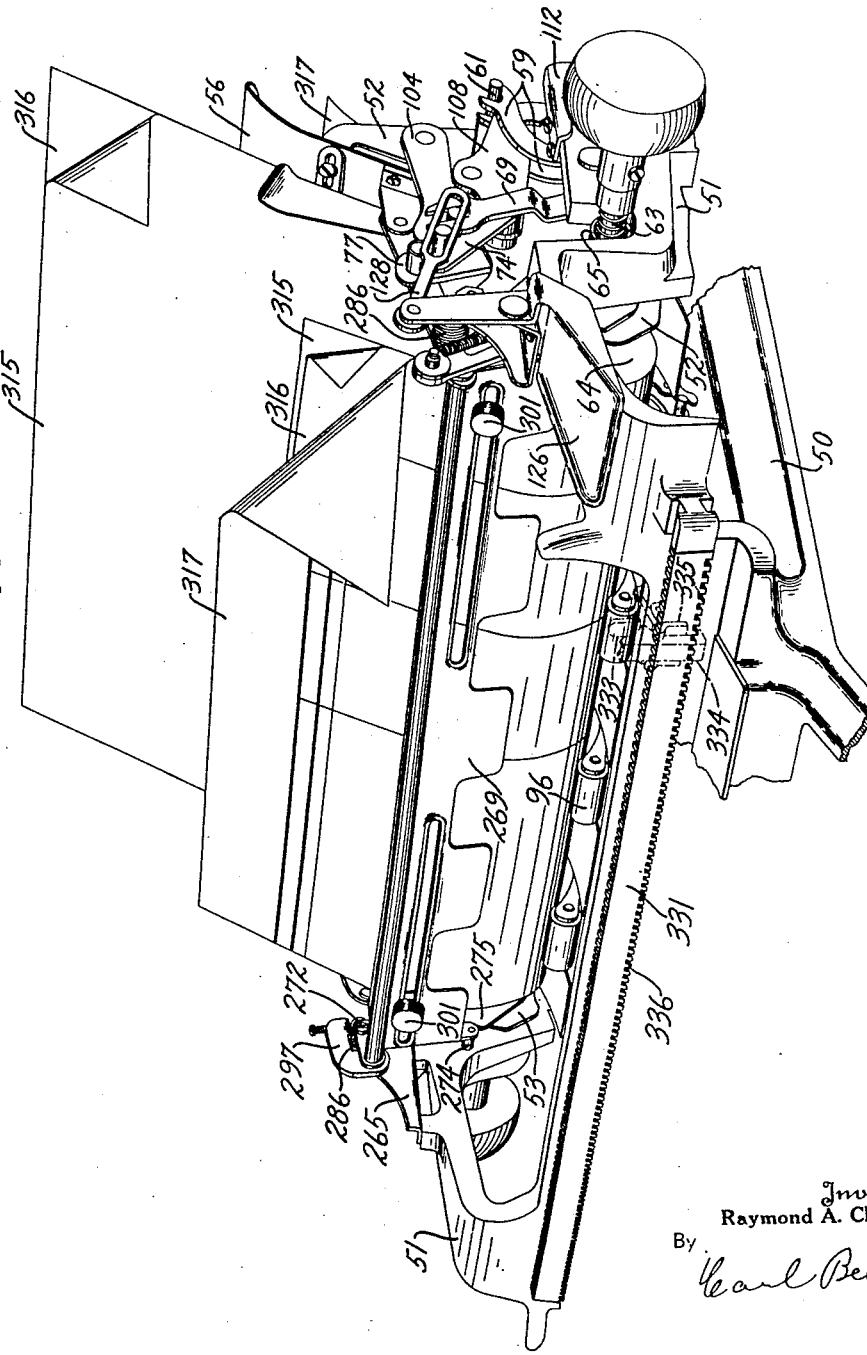
Fig. 1 is a perspective view of a typical traveling carriage relating to the present invention.
Figure 22:
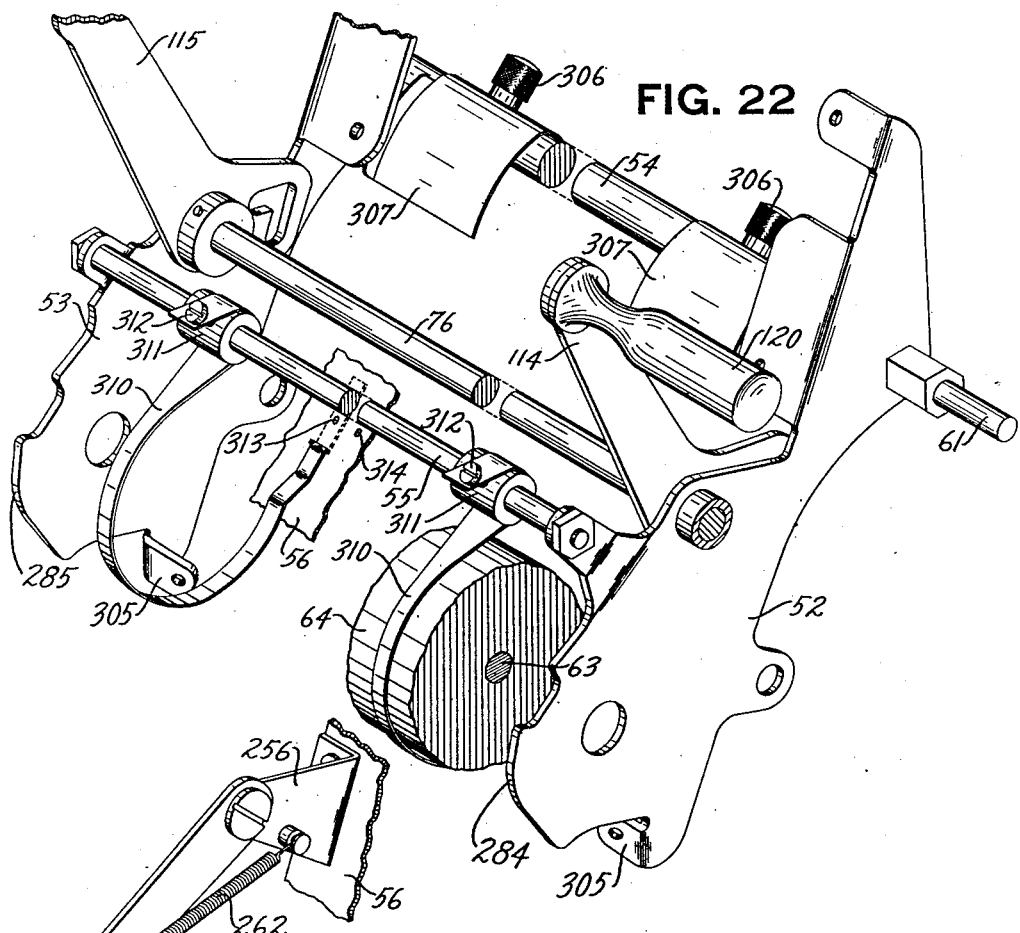
Fig. 22 is a fragmentary perspective view, illustrating the two end plates of the platen frame and their connecting cross bars.
Figure 23:
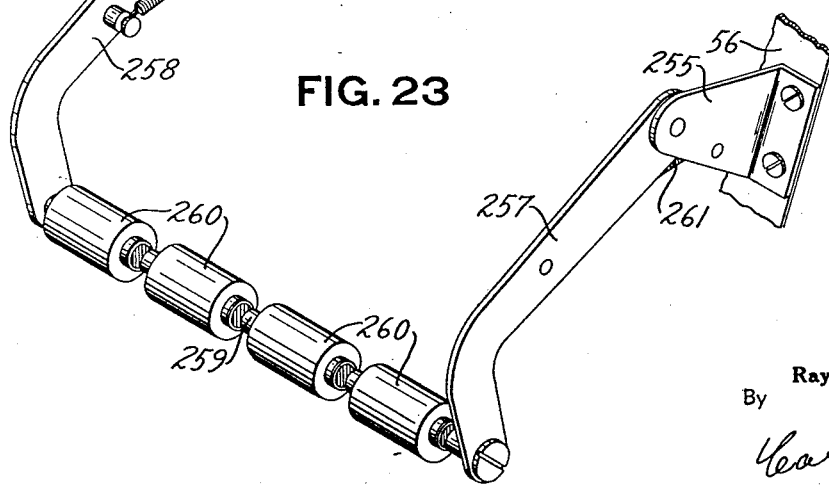
Fig. 23 is a perspective view picturing an auxiliary pressure roll mechanism used to retain the record sheet in position when the platen is rocked away from printing position.

Calling attention to Figs. 1 and 22 mounted to slide laterally upon ways on a machine case 50 is a traveling carriage 51, supporting a platen carrying frame composed of end plates 52 and 53 connected by tie rods 54 and 55 and a rear table 56 for the work sheet or paper. Secured in either end of the traveling carriage frame 51 is a rod 57 (Figs. 2 and 6) upon which are pivoted platen carrying frame arms 59 and 60. The upper ends of the arms 59 and 60 are bifurcated to embrace support studs 61 and 62 (Figs. 2, 3, 6, 20, 21, 22 and 24) for the rod 54, and the lower ends of the arms 59 and 60 are hook shaped to receive a platen shaft 63 carrying a platen 64. Loose on either end of the platen shaft 63 are spring pushed collars 65 adapted to cooperate with studs 66 in the arms 59 and 60 to retain the platen shaft 63 in the hooked ends of said arms. Thus it will be seen that the platen carrying frame is removably and pivotally mounted within the traveling carriage 51 by means of the arms 59 and 60 and the collars 65.

Figure 2:
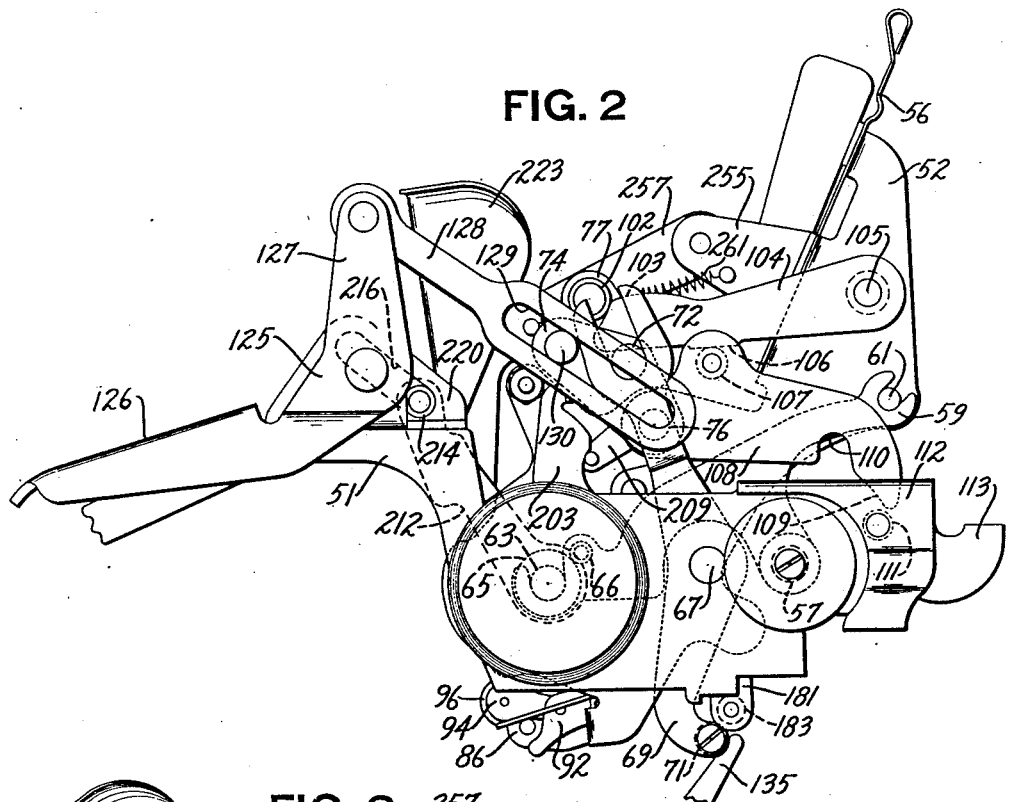
Fig. 2 is a side elevation as observed from the right showing the automatic platen rocking mechanism and the relative positions of the parts of such mechanism when the platen is in normal printing position.
Figure 6:
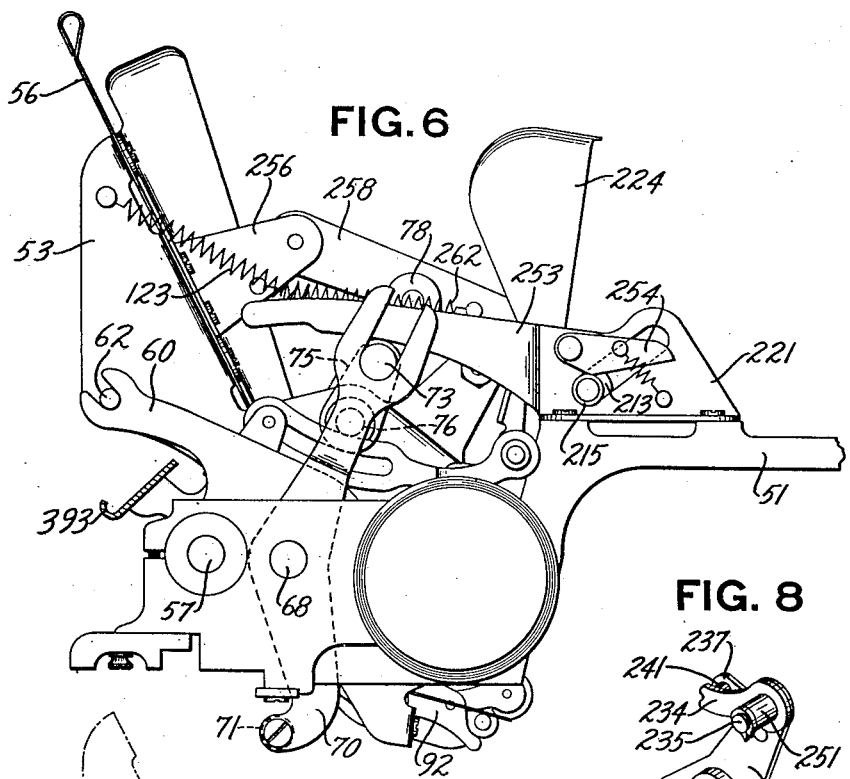
Fig. 6 is an elevation of the left side of the traveling carriage illustrating the auxiliary rotating mechanism for the platen.
Figure 8:
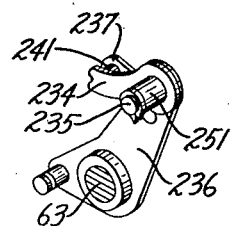
Fig. 8 is a perspective view of the platen ratchet arm.

Referring to Figs. 2, 6 and 18, secured in opposite ends of the traveling carriage 51 are studs 67 and 68 upon which are pivoted arms 69 and 70, respectively, the lower ends of which are connected by a rod 71. The upper ends of the arms 69 and 70 are bifurcated to receive studs 72 and 73 secured in arms 74 and 75, respectively, fast on a shaft 76 journaled in the end plates 52 and 53 of the platen frame. Also secured on the shaft 76 (Figs. 2 and 4) are arms 77 and 78, the lower end of each having a cam slot 79 (one only shown) arranged to cooperate with rollers 81 and 82 (see also Figs. 25, 26, 29 and 30) carried by arms 83 and 84 secured on a shaft 85 journaled in the end plates 52 and 53 of the platen frame and connected by a bail 87.

Secured on the shaft 85 is a plurality of arms 86 (Fig. 25) supporting a rod 88 which cooperates with extensions 91 on a series of tension arms 92 loosely mounted on the shaft 85. The arms 92 are arranged along the shaft 85 in pairs connected by studs 93 upon which are pivoted arms 94 connected by studs 95 having rotatably mounted thereon pressure rolls 96. Each set of pressure rolls has a shield 97 carried by the studs 93, which facilitates the insertion of paper around the platen 64 and assists in retaining the pressure roll assembled intact. Therefore, it will be seen that each pair of arms 92 carries a pressure roll assembly consisting of a shield 97 and two pressure rolls 96 supported by arms 94 upon the studs 93. As previously stated, the pressure roll assemblies pivot on the studs 93 allowing the rollers of each assembly to adjust themselves so that they properly engage the platen 64. This pivoting movement is limited by tenons on the studs 95 cooperating with enlarged holes 98 (Fig. 25) in the arms 92.

Encompassing the shaft 85 is a series of torsion springs 99, one end of each of which springs engages an arm 92, the other end of each spring engaging a hole in one of a pair of adjustable collars 100, retained in position on the shaft 85 by set screws 101. With the set screws 101 loosened the collars 100 are revolved until the proper degree of tension is obtained, after which tightening of the set screws 101 retains the collars 100 in their set positions.

Figure 3:
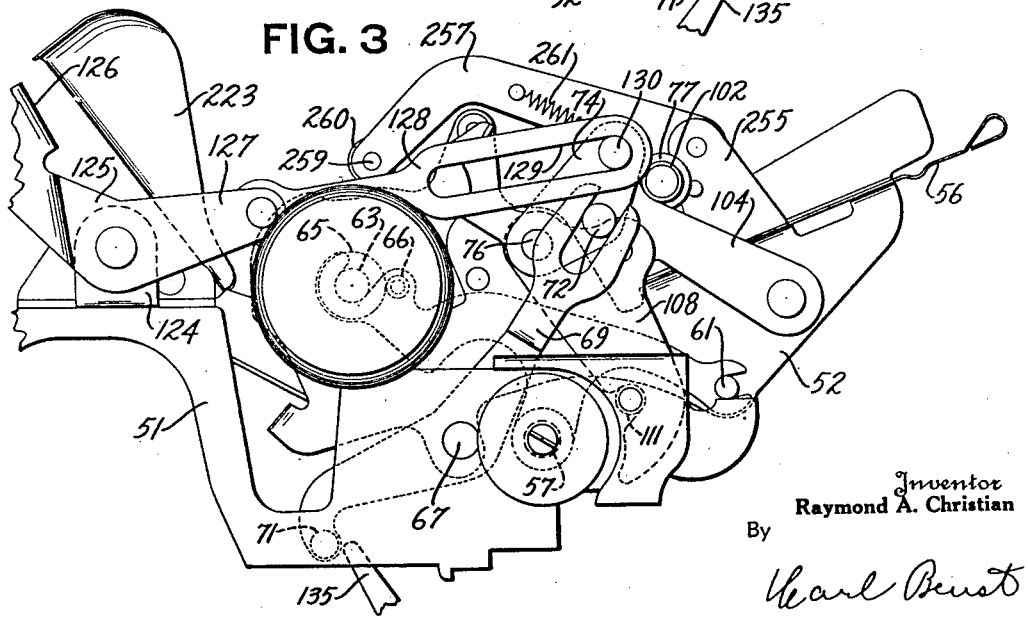
Fig. 3 is an elevation of the right side of the traveling carriage of the instant invention illustrating the relative positions of the different parts of the automatic rocking mechanism when the platen is rocked away from printing position.

Calling attention to Figs. 2 and 3, the arm 77 has a roller 102 adapted to cooperate with a camming surface 103, on a lever 104 carrying a stud which is journaled in a bushing (not shown) carried by the plate 52. The lever 104 has on its lower edge a projecting surface 106 arranged to cooperate with a stud 107 carried by a locking arm 108 loosely mounted on the shaft 76. The rear end of the arm 108 has a radial surface 109 concentric with the shaft 57 and terminating in a notch 110. The radial surface 109 and notch 110 are adapted to cooperate with a roller 111 rotatably mounted on a bracket 112, secured to the traveling carriage frame 51. The bracket 112 has an extension 113 adapted to cooperate with the support stud 61 for the tie rod 54 to stop the platen carrying frame at the terminus of its movement away from printing position, or in other words in its "open throat" position.

In the preferred form of mechanism the platen carrying frame is rocked away from printing position by the arms 69 and 70, which are rocked clockwise, as viewed in Fig. 2 and counter-clockwise as viewed in Fig. 6, by mechanism to be hereinafter described. As the arms 69 and 70 are rocked their bifurcated ends, cooperating with the studs 72 and 73 in the arms 74 and 75 tend to rock the shaft 76 and the arms 77 and 78 clockwise from the position shown in Fig. 2 to that shown in Fig. 3 but such movement is very slight, it being stopped by contact of the radial surface 109 of the locking arm 108 with the roller 111, which contact is caused by the pressure of the roller 102 carried by the arm 77 which rocks the lever 104 counter-clockwise whereby its contact with the stud 107 effects a clockwise movement of the arm 108. Thereafter the platen carrying frame is rocked clockwise (Fig. 2) on its pivot rod 57 until the notch 110 is in alinement with the roller 111 at which time the arms 77 and 78 are free to move relatively to the platen carrying frame. Consequently continued movement of the levers 69 and 70 causes the roller 102 through its cooperation with the cam surface 103 to rock the arm 104 counter-clockwise and the arm 108 clockwise to engage the notch 110 with the roller 111 to effectively lock the platen carrying frame in its "open throat" position or in other words the position away from the printing mechanism.

Figure 4:
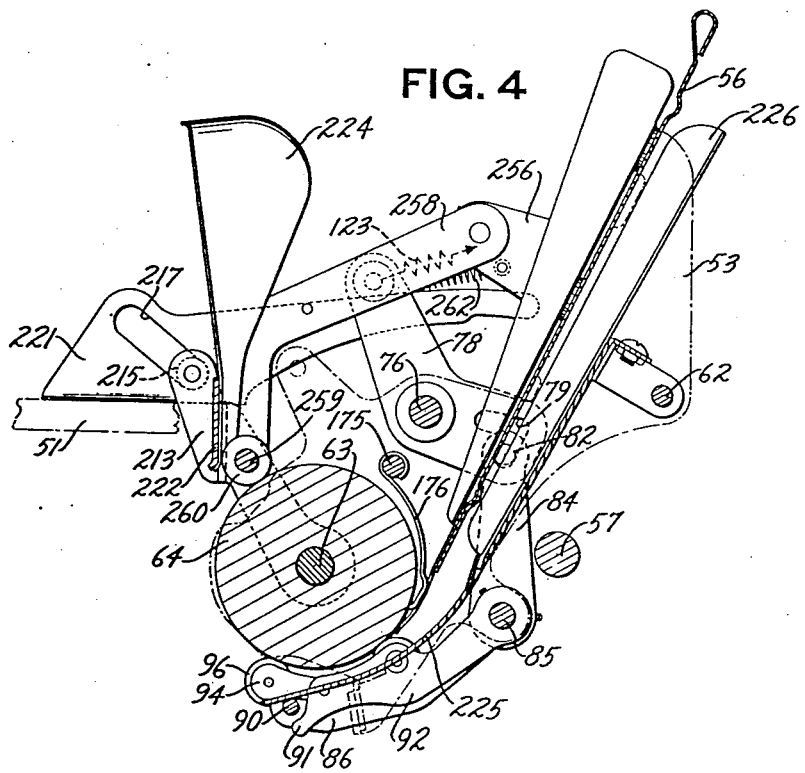
Fig. 4 is a sectional view as observed from the right, depicting the position of the rear work sheet table and the front feed chute when the platen is in printing position.
Figure 5:
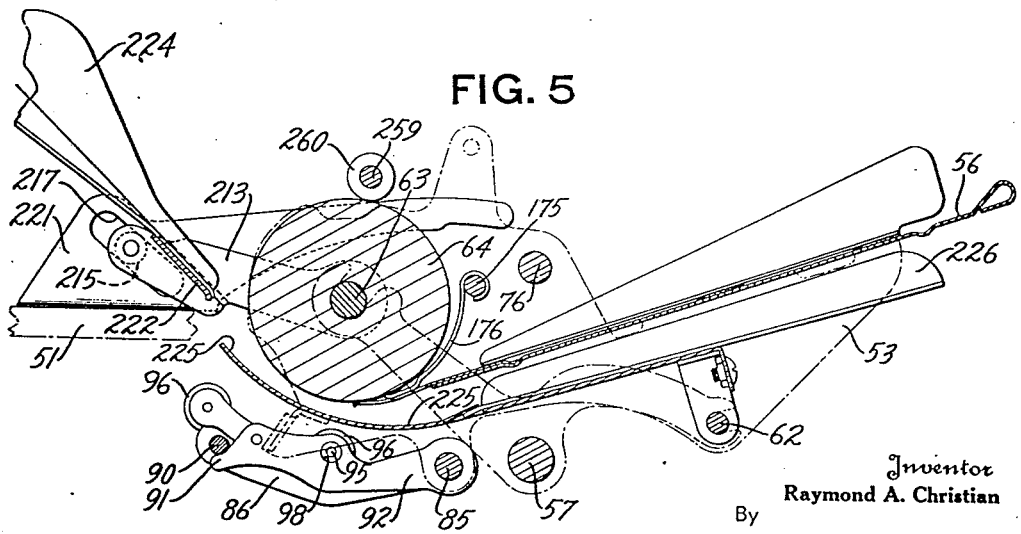
Fig. 5 is a sectional view, illustrating the position of the rear work sheet table and the front feed chute when the traveling carriage platen is rocked away from printing position.

Calling attention to Figs. 4 and 5, as the shaft 76 rocks independently of the platen carrying frame, to lock said platen carrying frame in its open or front feeding position, the slots 79 in the arms 77 and 78 cooperating with the rollers 81 and 82 (see also Figs. 25 to 27) rock the shaft 85 counter-clockwise, causing the rod 90 to rock the arms 92 counter-clockwise to disengage the pressure rolls 96 from the platen 64.

Calling attention to Figs. 20 to 30, which picture the modified form of platen rocking mechanism, in which the platen is moved out of and into printing position by hand, levers 114 and 115 are substituted for the arms 77 and 78 (Figs. 2 and 4). The levers 114 and 115 are secured to the shaft 76 and have cam slots 116 and 117 which cooperate with the rollers 81 and 82 carried by the arms 83 and 84 in exactly the same manner as the arms 77 and 78 cooperate with said rollers. The levers 114 and 115 are manipulated by finger pieces or handles 120 and 121. The lever 114 carries a roller 122 adapted to cooperate with the lever 104 in exactly the same manner as the roller 102 carried by the arm 77 cooperates with said lever 104. The lever 104, the latch arm 108 and the pressure roll assembly, including the arms 83 and 84, the shaft 85 and the groups of pressure rolls 96 mounted thereon are used in both the preferred and modified forms. Therefore, they have been given duplicate numbers and reference may be had to the figures of the drawings of both forms for an understanding of this mechanism.

In the modified form the platen is rocked away from printing position by grasping either or both of the handles 120 and 121 and forcing the levers 114 and 115 rearwardly, causing the platen carrying frame to rotate clockwise on its pivot rod 57 until the notch 110 in the arm 108 is opposite the roller 111. The levers 114 and 115 are then free to move relatively to the platen carrying frame and the roller 122 coacting with the camming surface 103 causes the notch 110 to engage the roller 111 to lock the platen carrying frame at the terminus of its movement away from printing position. The relative movement of the levers 114 and 115, which rocks the platen carrying frame out of printing position also by means of the slots 116 and 117 (Figs. 26, 27 and 30) rocks the pressure roll shaft 85 counter-clockwise to disengage the pressure rolls 96 from the platen 64. Initial movement of the levers 114 and 115 counter-clockwise (Fig. 25), to return the platen carrying frame to printing position causes the pressure rolls 96 to be moved into engagement with the platen 64. Additional counter-clockwise movement of the levers 114 and 115 (Figs. 20, 21 and 28) disengages the notch 110 from the roller 111, allowing the platen carrying frame to return to normal printing position.

Referring to Figs. 4 and 6, a spring 123, tensioned between the arm 78 and the plate 53 assists the arms 77 and 78 in their clockwise movement relative to the platen carrying frame and retains said arms in their moved positions to lock the platen carrying frame away from printing position. The spring 123 is used only in the preferred form as the weight of the levers 114 and 115, of the modified form, is sufficient to insure the locking of the platen carrying frame out of printing position.

In the preferred form of mechanism means have been provided for returning the platen carrying frame to printing position. Such mechanism is well illustrated in Figs. 1, 2 and 3 and will now be described. Secured to the traveling carriage frame 51 is a bracket 124 to which is pivoted a return lever 125 provided with a finger piece 126 and an upward extension 127. Pivoted to the extension 127 is a link 128 having a slot 129 adapted to cooperate with a stud 130 secured in the arm 74. When the platen is rocked away from printing position, the stud 130 engages the end of the slot 129 rocking the lever 125 clockwise. When the carriage is "open," striking the finger piece 126 (Fig. 3) a downward blow forces the lever 125 counter-clockwise and through the link 128, stud 130 and arm 74, rocks the shaft 76, arms 77 and 78 counter-clockwise, causing the pressure roll assembly to re-engage the platen 64 and the notch 110 to be disengaged from the roller 111 after which the platen is rocked the remaining distance to printing position by its own weight.

*Automatic platen rocking mechanism*

The present invention provides means for automatically rocking the platen from its normal printing position to its non-printing, front feed, loading or "open throat" position during the operating cycle of the machine while the carriage is stationary. Such means is operated from the machine driving means and may be controlled by one or a plurality of different devices attached to the carriage, one of said devices being fixed in a predetermined position, and another device being movably mounted so that its position can be easily and quickly changed should conditions or requirements of the business so demand. Such means and mechanisms will now be described.

Calling attention to Figs. 10 and 18, the mechanism of the instant machine is supported by main frames 131 and 132 mounted on a machine base (not shown) and braced at the rear by a cross-frame 133. Journaled between the frame 131 and the cross-frame 133 is a shaft 134 having secured thereon an arm 135 adapted to cooperate with the rod 71 extending between the levers 69 and 70. Fast on the shaft 134 is a crank 136 having pivoted thereto an operating arm 137, with an extension having a notch 140 arranged to cooperate with a stud 141 carried by an arm 142 secured on a printer operating shaft 143 journaled in the frames 131 and 132. The shaft 143 has secured thereon a flexibly constructed lever 144 connected to a link 145 having in its lower end a notch 146 adapted to cooperate with a stud 147 carried by a main operating or driving arm 148 secured on a shaft 149 journaled in the frames 131 and 132. The arm 148 is connected by a link 150 to the driven member of a clutch the driving member of which is geared to an electric motor secured to the machine base, none of which is here shown. As the driving mechanism of the Ellis machine is well known, it is thought unnecessary to go into detail concerning this mechanism either by way of illustration or description. However, reference may be had to the above mentioned Ellis Patents and to Patent No. 1,601,102, issued September 28, 1926, to F. W. Bernau for a detailed description of this mechanism.

Releasing the machine for operation couples the driven member of the clutch to the driving member for one complete revolution, which through the link 150 causes the driving arm 148 to be rocked counter-clockwise and then returned to its normal position. This oscillating movement of the arm 148 is transmitted to the shaft 143 and the arm 142 by the link 145 and lever 144. The arm 137 carries a stud 154 which cooperates with a notch 155 in a bell crank 156 pivoted on a stud 157 carried by the frame 131. One arm of the bell crank 156 is bifurcated to embrace a stud 158 in an arm 159 pivoted at 160 to the frame 131. The arm 159 carries a stud 161 which cooperates with the bifurcated end of an arm 162 arranged to fulcrum on a stud 163 carried by the frame 131. The arm 162 has a notch 164 adapted to cooperate with an extension 165 on a lever 166 (Figs. 11, 12 and 17) pivoted to a bracket 167 secured to the machine case 50. The lever 166 has a finger 168 which cooperates with a throat opening control rail 169 secured to the frame of the traveling carriage 51. Suitable holes are furnished for attaching the cam rail 169 in any desired columnar location on the traveling carriage.

Again calling attention to Fig. 10, with the mechanism in the position here shown, oscillation of the arm 142 first clockwise and then counter-clockwise during machine operation would have no effect upon the link 137 and its connecting mechanism, as the notch 140 would be withheld from engagement with the stud 141 by the bell crank 156 engaging the stud 154. Tabulating the traveling carriage to a particular position causes the control rail 169 to engage the projection 168 and rock the lever 166 clockwise (Figs. 11 and 12), which, through the extension 165, rocks the arm 162 (Fig. 10) clockwise, the arm 159 counter-clockwise and the bell crank 156 clockwise and disengages the notch 155 from the stud 154 carried by the arm 137. Assuming that the machine is released for operation with the traveling carriage in said particular position, when the stud 141 moves opposite the notch 140 as the arm 142 makes its initial movement clockwise, a spring 170 rocks the arm 137 clockwise causing the notch 140 to engage the stud 141. Return movement counter-clockwise of the arm 142 forces the arm 137 upward, rocking the shaft 134 and arm 135 counterclockwise until the movement of the arm 137 is arrested by a projection 171 thereon engaging the periphery of a hub 172 carried by the arm 159 which forces the notch 140 out of engagement with the stud 141. The spring 170 then returns the link 137, shaft 134 and arm 135 to normal positions, which are determined by a set screw 173 carried by the arm 135 engaging an angular recess in the cross-frame 133.

Referring to Fig. 18, counter-clockwise movement of the arm 135 through the rod 71 rocks the arms 69 and 70 clockwise and moves the platen 64 away from printing position in the manner set out hereinbefore.

It will be understood from the foregoing description that the tabulating of the traveling carriage to a particular or predetermined position does not of itself cause the platen to be rocked away from printing position. This merely sets up a condition which is completed by the subsequent operation of the machine. Therefore it is necessary that the traveling carriage remain in a position where the cam rail 169 (Fig. 12) will engage the finger 168 of the lever 166 during operation of the machine. The instant the rail 169 is moved out of engagement with the finger 168 a spring 174 (Fig. 10) returns the bell crank 156 to effective position where the notch 155 is in the path of the stud 154. The automatic rocking of the platen away from printing position does not interfere with the taking of an impression as the impression is made during the clockwise movement of the shaft 143.

At certain times it may be desired to have the automatic platen rocking or throat opening means function when the carriage is stopped in a columnar position different from that predetermined by the fixed throat opening control rail 169. Therefore, the machine is provided with a removable clamp 330 (Fig. 13, shown by dot and dash lines in Fig. 1) clamped to the usual tabulating bar or rail 331. This clamp 330 has a control step 332 adapted to cooperate with the finger 168 of the throat opening control lever 166 in exactly the same manner as the control rail 169 cooperates with the finger 168. The clamp 330 may be secured to the bar 331 in any columnar position of the carriage in which it is desirable to open the carriage to its front feeding or non-print position.

Such a control clamp 330 is often used in the banks when the operators are transferring balances on the first of the month. The clamp 330 may be removed from the rail 331 by grasping a lug 333 (Fig. 13) formed up out of the top of the clamp, and a pivoted spring pressed lever 334 which is carried by the clamp guide 335. By pressing the upper end of the lever 334 towards the lug 332 the lower end of the lever which normally engages notches 336 in the bottom of the rail 331 is released from said notches whereupon the clamp 330 may be removed from the rail 331, or shifted into another position thereon.

Overdraft mechanism

The instant machine is equipped with an automatic overdraft device fully illustrated and described in United States Letters Patent No. 2,079,355, issued May 4, 1937, on application Serial No. 605,160, filed by Charles L. Lee on April 14, 1932. Such automatic overdraft mechanism causes the machine to operate through three complete cycles in order to transpose and print a complementary overdraft as a positive amount. It is essential that the printing mechanism be disabled during the first two cycles of an overdraft operation and to accomplish this the link 145 (Fig. 10) is connected by another link 151 to the overdraft mechanism. At the beginning of an overdraft operation the link 145 is rocked counter-clockwise, disengaging the notch 146 from the stud 147 and causing a notch 152 in the link 145 to engage a stud 153 secured in the frame 131 before the main drive arm 148 receives any movement. Just prior to the third and last cycle of an overdraft operation, the link 145 is rocked clockwise by the overdraft mechanism and re-engages the notch 146 with the stud 147 thus causing the printing mechanism to function during the last cycle of an overdraft operation to print the positive amount of the overdraft. Therefore, it can be seen that, due to the disconnection of the link 145 from the arm 148 during the first two cycles of an overdraft operation, the shaft 134 and arms 69 and 70 cannot function to move the platen 64 to its open position.

A detailed description of the overdraft mechanism and controlling means associated therewith will now be given.

Overdraft shaft operating mechanism

Referring to Figs. 58 and 59, during subtract operations the No. 1 totalizer wheels, as previously explained, are rotated clockwise. When an overdraft occurs, one of the two diametrically opposed projections 651 on a highest order wheel 652 contacts the tooth on the subtracting pawl 650, rocking said pawl clockwise to release an overdraft shaft actuator 653 loosely mounted on a shaft 654. The actuator 653 moves clockwise under tension of a spring 655 until it contacts a restoring bar 656 pivoted between the totalizer frames 657 and 660 (Fig. 60). Prior to the above movement of the actuator 653 the bar 656 is moved into the position shown in Figs. 57 and 58. A projection 661 (Figs. 58 and 59) on the actuator 653 is arranged to contact an ear 662 formed on an arm 663 secured to an overdraft shaft 664 journaled in the totalizer frames 657 and 660.

Near the end of a machine operation the restoring bar 656 is released and under spring tension rocks to the position shown in Fig. 59 to allow any released transfer pawls to function. The overdraft actuator 653 also being under spring tension travels clockwise in unison with the restoring bar 656 whereupon the shoulder 661 moves the overdraft shaft 664 counter-clockwise. Fast on the overdraft shaft is an arm 665 (Figs. 36, 57, and 60) pivotally connected by a link 666 to a pitman 667 having therein a slot that embraces a stud 668 secured in the left machine frame 132. The right end of the pitman 667 is pivoted to a latch 669 pivotally mounted on a stud 670 also secured in the left machine frame. The latch 669 has formed thereon an ear 671 (Fig. 57) arranged to enter a notch 672 in the No. 1 total key 585 to lock said key against depression when the overdraft shaft is rotated counter-clockwise by the occurrence of an overdraft as explained above.

If subsequent to an overdraft an amount large enough to overbalance the overdraft is added into the No. 1 totalizer, the adding pawl 649 (Figs. 34 and 57) for the highest order wheel 652 is engaged and rocked by one of the projections 651 on said wheel. This rocking of the adding pawl 649 releases an overdraft restoring lever 673 (Fig. 57) which under tension of a spring (not shown) contacts an ear 675 (Fig. 58) bent on an arm 676 integral with the arm 663 to rock the latter clockwise, thus restoring the overdraft shaft to normal position and unlocking the total key 585. The overdraft shaft actuator 653 and the restoring lever 673 are restored to normal position each time the machine is operated by means of the restoring bar 656. The shift bar 640 has formed thereon a key 677, which during add operations lies beneath a shoulder 674 on the overdraft shaft actuator 653 and prevents any movement of the latter, and at the same time frees the overdraft restorer 673 since said key 677 is out of the path of the same. Moving of the shift bar 640 clockwise for subtract operations releases the overdraft shaft actuator and blocks the movement of the overdraft shaft restorer.

It is felt that further explanation of this mechanism is unnecessary, as it has been used in former Ellis machines, and is fully described in Letters Patent of the United States No. 1,508,267, issued September 9, 1924, to F. W. Bernau, and Patent No. 1,609,768, issued December 7, 1926, to N. W. Perkins.

Overdraft indicator mechanism

An explanation will now be given of the mechanism that operates the overdraft indicator.

Referring to Figs. 36, 37, and 38, in the pitman 667 is a stud 678 arranged to extend through a hole 679 in the overdraft indicator arm 682 pivoted on a screw stud 681 in the left machine frame 132. The arm 682 carries the extension 594 upon which is engraved or printed a positive or plus sign and a negative or minus sign. This overdraft indicator is mounted below the keyboard plate in such a manner that either the plus or negative sign is at all times visible through an opening 683 in the keyboard plate.

When the overdraft shaft 664 is rocked counter-clockwise, as viewed in Fig. 36, by the occurrence of an overdraft, the indicator is shifted to a position where the minus sign is visible through the opening in the keyboard plate. When the No. 1 totalizer is not in an overdrawn condition the plus sign is visible through the opening in the keyboard plate.

Overdraft mechanism

In the present machine the occurrence of an overdraft automatically unlocks the overdraft key 593, which is normally locked against depression. If the operator wishes to ascertain the amount of an overdraft, all that is necessary is the depression of this key. Depression of the overdraft key 593 releases the machine for an overdraft operation, consisting of three cycles, and likewise causes the printing mechanism to be disabled during the first two cycles of operation. It also causes the auxiliary differential to be engaged with and disengaged from the actuator racks at the proper time and conditions the No. 1 totalizer for a total-taking operation during the first cycle of operation, a subtract operation during the second cycle, and finally a second total-taking operation during the third cycle of operation.

The first cycle of an overdraft operation causes the total of the No. 1 totalizer, which total is the complement of the overdraft, to be temporarily added into the auxiliary differential. During the second cycle this complement is subtracted from the cleared No. 1 totalizer, leaving the positive amount of the overdraft in the No. 1 totalizer and clearing the auxiliary differential. The final or third cycle of an overdraft operation takes a total from the No. 1 totalizer, prints this total, which is the positive amount of the overdraft, in a distinctive color on a record sheet interposed between the platen roll and the printing type, and causes the front-feed throat to open after said total has been printed. The overdraft mechanism is treated in detail in the following description.

Locking mechanism for overdraft key

The overdraft key 593 (Figs. 35, 47, 48, and 60) is slidably mounted by having its upper end extending through a slot in the keyboard plate and its lower end slotted to embrace a stud 690 secured in the right machine frame 131.

Secured to the right-hand end of the overdraft shaft 664 (Figs. 35 and 60) is an arm 691 having therein a stud 692 which extends through a slot in a link 693. The left end of the link 693 (Figs. 47 and 60) is pivoted to a locking plate 694 pivotally mounted on a stud 695 fast in the right machine frame 131. The plate 694 has a step 696 adapted to cooperate with an ear 697 formed on the overdraft key 593, to normally lock said key against depression. As previously explained, the occurrence of an overdraft rocks the overdraft shaft 664 clockwise as viewed in Fig. 35. Such movement of the shaft 664, through the arm 691 and link 693, rocks the locking plate 694 counter-clockwise, which removes the step 696 from the ear and unlocks the overdraft key.

Pivoted on the stud 695 (Figs. 47 and 60) is a detent 698 having a hook adapted to cooperate with the ear 697 on the overdraft key. A link 699 pivotally connects the detent 698 to a release cam arm 700 pivoted on a stud 720 secured in the right frame 131. A spring 701 is tensioned to pull the arm 700 and detent 698 clockwise. When the overdraft key 593 is depressed, the projection on the detent 698 latches over the ear 697 thus retaining the overdraft key depressed during an overdraft operation. The manner in which the overdraft key is released and the overdraft shaft restored to normal position at the end of an overdraft operation will be later described.

Overdraft cam line driving mechanism

A series of cams for operating the overdraft mechanism has been incorporated in the present machine. These cams are rotatably mounted as a unit upon the right machine frame 131 and make one complete revolution for each overdraft operation. During normal machine operations the cams remain inoperative, the driving mechanism therefor being effectively coupled thereto only when the overdraft key is depressed. This overdraft cam driving mechanism will now be explained.

A stud 703 (Fig. 48) in the overdraft key 593 extends through a slot in a latch 704 pivoted to an arm 705 fast on the shaft 149. A notch 706 in the latch 704 is arranged to latch over a stud 707 fast in a reciprocable pitman 708 which is bifurcated on its right end to embrace an undercut portion of a slotted bushing 709 fast on the shaft 149. The left end of the pitman 708 is also bifurcated to embrace a slotted portion of a bushing 710 loosely mounted on a stud 711 carried by the frame 131. Pivotally mounted on the pitman 708 is a pair of pawls 712 and 713 (Fig. 49) each pawl having secured therein a stud 714 which extends through holes in the pitman. These holes are of correct size to properly limit the travel of the pawls 712 and 713, and form stops against which the studs 714 are held by a spring 715. The pawls 712 and 713 are adapted to cooperate with a three-toothed feed ratchet 716 (Figs. 48, 49, and 51) keyed to a hub 717 journaled on the stud 711. Also keyed to the hub 717 is a sixth-tooth retaining ratchet 718 adapted to cooperate with a retaining pawl 719 (Fig. 48) pivoted on the stud 720. A locking pawl 721 pivoted on the stud 690 has therein a stud 722 adapted to cooperate with a projection 723 on the overdraft key 593. An arcuate surface 724 on the pawl 721 is arranged to coact with a stud 725 carried by the retaining pawl 719. A spring 726 stretched between the pawls 719 and 721 holds the pawl 719 in contact with the teeth of the ratchet 718 and also normally holds the pawl 721 in a position where the arcuate surface 724 will be opposite the stud 725 thus locking the pawl 719 between two teeth of the ratchet 718 to prevent movement of the hub 717 at all times except during overdraft operations.

Depression of the overdraft key 593 (Fig. 48) rocks the pawl 721 counter-clockwise to release the retaining pawl 719 and causes the notch 706 in the latch 704 to engage the stud 707. The arm 148 oscillates through an approximate angle of 60 degrees each time the machine is operated. During an overdraft operation, inasmuch as the machine makes three operations, the arm 148 will make three oscillations. The first movement counter-clockwise of the arm 148 (Fig. 48) will, through the arm 705 and latch 704, slide the pitman 708 to the left, causing the pawl 712 (Fig. 49) to rotate the ratchet 716, hub 717, and cam assembly keyed thereto one-sixth of a revolution counter-clockwise, or one tooth space on the retaining ratchet 718. The return movement clockwise of the arm 148 returns the pitman 708 to its home position, causing the pawl 713 to engage another tooth of the feed ratchet 716 to rotate the hub 717 another one-sixth revolution. The feed pawls 712 and 713 have projections 727 and 728, respectively, which cooperate with the feed ratchet 716 to prevent overthrow during fast operations.

Therefore, during the three cycles of an overdraft operation the cam assembly on the hub 717 will make one complete revolution in a counter-clockwise direction.

*Printer disabling mechanism*

Referring to Fig. 47, pivoted on the overdraft key 593 is a link 729 slotted on its lower end to embrace a stud 730 fast in a detent 731 pivoted on a stud 732 fast in the right machine frame 131. The detent 731 is notched to receive an ear 733 bent on a printer cam arm 734 pivoted on the stud 720. A spring 735 is tensioned to hold the detent 731 in engagement with the cam arm 734. A roller 736 carried by the arm 734 is adapted to cooperate with a printer cam 737 for a purpose and in a manner to be later described. A stud 740 fast in the arm 734 extends through a slot in one end of a link 151 (see also Fig. 60) pivoted to a printer operating link 145 pivoted to an arm 743 which in turn is pivotally connected to another arm 144 fast on a shaft 143. A spring 738 is tensioned to form a flexible connection between the arms 743 and 144. The lower end of the operating link 145 has a notch 146 arranged to be normally held in engagement with a stud 147 fast in the arm 148 by a spring 748. In the link 145 opposite the notch 146 is another notch 152 adapted to be latched over a stud 153 fast in the right machine frame 131. A spring 751 is tensioned between the arms 734 and stud 695 to normally hold the ear 733 in contact with the detent 731.

Depression of the overdraft key 593 (Fig. 47) through the link 729 rocks the detent 731 counter-clockwise and releases the cam arm 734 which under tension of the spring 751 moves clockwise until the roller 736 contacts the periphery of the cam 737. This movement of the arm 734 through the link 151 rocks the operating link 145 counter-clockwise, disengaging the notch 146 from the stud 147 and engaging the notch 152 with the stud 153. This prevents the printer shaft 143 from receiving movement from the operating arm 148 and locks said shaft in its home position during all of the first two cycles of an overdraft operation.

At the end of the second cycle of an overdraft operation the cam 737 engages the roller 736 and rocks the arm 734 counter-clockwise, reengaging the notch 146 with the stud 147 so that the printer shaft 143 will receive proper movement during the first half of the third or last cycle of an overdraft operation in order to print the overdraft.

Now that the true amount of the overdraft has been printed during the first half of the third cycle of the overdraft operation, which occurs on the clockwise movement of the shaft 143, during the return or counter-clockwise movement of the shaft 143 of the third cycle of the overdraft operation, the arm 142 operates from the shaft to open the carriage throat in the manner previously described. Therefore the carriage throat is never opened during an overdraft until after the overdraft has been printed.

When the overdraft key is released near the end of an overdraft operation it is forced upward, by a spring 739, causing the detent 731 to reengage the ear 733 on the arm 734 to retain operative connection between the arm 148 and the printer shaft 143 after the high point of the cam 737 passes beyond the roller 736 to its home position as shown in Fig. 47.

*Add-subtract totalizer controlling mechanism*

When an overdraft occurs in the No. 1 add-subtract totalizer the complement of the overdraft remains upon the totalizer wheels. In an overdraft operation the object is to print the amount of this overdraft in positive form, and to do this, as previously explained, requires three cycles of the machine. During the first cycle of an overdraft operation the No. 1 totalizer is automatically cleared or totalized and the complement of the overdraft simultaneously added into an auxiliary storage differential. In the second cycle, this complement is subtracted from the cleared No. 1 totalizer leaving the positive amount of the overdraft standing in the No. 1 totalizer. In the third and last cycle of an overdraft operation, a total is taken from the No. 1 totalizer and this total simultaneously printed upon a statement or record sheet. The mechanism that controls the No. 1 add-subtract totalizer during an overdraft operation is well illustrated in Figs. 35, 40, 51, 53, and 54 and will now be explained in detail.

Referring to Fig. 54, pivotally connected to the overdraft key 593 is a link 753 slotted to embrace a stud 754 fast in a detent 755 pivoted on the stud 732. The end of the detent 755 is notched to receive an ear 756 formed on a cam arm 757 loosely mounted on the stud 720, and having mounted thereon a roller 758 adapted to cooperate with a control cam 759 keyed to the hub 717. A link 760 (Fig. 60) pivotally connects the arm 757 to a bell crank 761 secured to a shaft 762 journaled in the main machine frames 131 and 132. A subtract operating arm 763 (Figs. 39, 54, and 60) fast on the shaft 762 carries a stud 789 to which is connected a link 764 also connected to the lever 644. Secured on the left end of the shaft 762 is a total operating lever 765 (Figs. 36, 40, and 54) having an arm 766 with two projections shaped to form a V which is adapted to cooperate with a stud 767 fast in a total latch arm 768 pivoted on a stud 769 fast in the left machine frame 132. A spring 788 is tensioned to hold the stud 767 centrally located in the V formed by the arm 766. Another arm 770 of the lever 765 has therein a notch 771 which cooperates with a stud 772 fast in a symbol selecting slide 773 reciprocably mounted on studs 774 carried by the frame 132. A link 775 (Fig. 40) pivotally connects the slide 773 to an arm 776 fast on the left end of a shaft 777 extending through the width of the machine and journaled in the two main frames 131 and 132. Secured to the right end of the shaft 777 just inside the right frame 131 is an arm 778 (Fig. 35) connected by a link 779 to an aligning arm 780 pivoted at 781 to a printer side plate (not shown). A link 782 connects the arm 780 to a symbol printing segment 783 pivoted to a printing arm 784.

A flexibly mounted latch 785 (Figs. 36 and 40) pivoted on the stud 769 has an ear 786 arranged to cooperate with a notch 787 in the No. 1 total key 585. A leg 790 of the latch 785 cooperates with an ear 791 on the latch arm 768. In the lower end of the arm 768 is a stud 792 adapted to engage a total cam lever 793 loosely mounted on the stud 619 and adapted to contact a stud 794 carried by the lever 618.

Depression of the overdraft key 593 (Fig. 54) disengages the detent 755 from the cam arm 757 allowing said arm 757, the arm 761, shaft 762, arm 763, and lever 765 to rotate clockwise, as viewed in Fig. 54, under tension of a spring 796 until the roller 758 on the cam arm 757 strikes the lowest part of the periphery of the cam 759. The above-described movement of the lever 765 is counter-clockwise as viewed in Fig. 40, and causes the V-shaped arm 766, through the stud 767, to force the latch arm 768 clockwise independently of the latch 785.

As the arm 768 moves clockwise, the stud 792 rocks the cam lever 793 and its associated lever 618 clockwise. This places the pawls 620 and 621 in the path of the flying lever 622 so that the No. 1 totalizer will be engaged with the racks 571 and will be cleared during the remainder of the first cycle of an overdraft operation. The amount cleared from the No. 1 totalizer is transferred to an auxiliary differential to be later described. Such amount represents the complement of the true overdraft. After such clearing of the No. 1 totalizer it is disengaged from the racks 571 during said first cycle. The above movement of the arm 768 is independent of the latch 785 and in no way affects the total key 585. Also, when the shaft 762 and arm 763 rock during total operations, the stud 789 (Figs. 39 and 54) moves idly in the slot in the link 764, and therefore rocking of the shaft and arm does not disturb the lever 644.

The periphery of the cam 759 (Fig. 54) coacting with the roller 758 forces the arm 757 counter-clockwise to its home or neutral position near the end of the first cycle of an overdraft operation. At the beginning of the second cycle of an overdraft operation the highest surface 797 of the cam 759 forces the arm 757 counter-clockwise beyond its neutral position, causing the arm 763 through the link 764 to rock the lever 644 counter-clockwise as viewed in Figs. 54 and 60 and clockwise as viewed in Fig. 39. This rocks the toggle lever 615 (Fig. 39) clockwise to condition the No. 1 totalizer for a subtract operation in the second cycle of an overdraft operation. During this subtract operation the complement of the true overdraft on the hereinafter-described auxiliary differential is subtracted from the cleared No. 1 totalizer leaving the latter with the amount of the true overdraft therein.

Near the end of the second cycle the cam 759, in the manner previously described, allows the arm 757 and connected parts to be positioned by the spring 796 for another total-taking operation so that during the third cycle the true amount of the overdraft is cleared from the No. 1 totalizer. Near the end of the third cycle of operation a raised portion 798 of the cam 759 restores the arm 757 and connected parts to their home or neutral positions, and the simultaneous restoration of the overdraft key 593 in a manner to be later described, releases the detent 755, which then re-engages the ear 756 to retain the arm 757 and parts connected thereto in their home positions, while the cam 759 travels on to its home position, as shown in Fig. 54.

*Auxiliary differential*

In previous Ellis machines, in order to print the amount of an overdraft positively it was necessary for the operator to transfer the complement of the overdraft from the add-subtract totalizer to one of the straight adding totalizers which had previously been cleared. This necessitated the tying up of a totalizer that possibly could have been used to advantage for other purposes. To overcome this condition an auxiliary differential was devised for the present machine into which the complement of an overdraft is temporarily stored during part of an overdraft operation.

A detailed description will now be given of the auxiliary differential mechanism.

A frame 800 (Figs. 34, 42, and 60) is formed by an angle bar 801, having thereon a pair of arms 802 and 803 bent at right angles thereto. The frame 800 is pivoted on a rod 804 which extends through the machine and is rigidly supported in the main frames 131 and 132. Attached to the angle bar 801 is a plurality of brackets 805 having pivoted thereon a series of wheels 806, each having a wide tooth 807 (see also Fig. 45) adapted to cooperate with a projection 808 bent on said brackets 805. The extreme right-hand wheel 806 (Fig. 42) is pivoted on the arm 803 having a projection 809 which is in the path of the wide tooth 807. Normally the wide teeth of the wheels 806 rest against the projections 808 and 809 in which positions they are held by an alining bar 810 held in cooperative relation with said wheels by a pair of springs 811 (only one here shown in Fig. 43). The alining bar 810 is pivoted within the frame 800 by means of a pair of arms 812 and 813 formed thereon.

Keyed to the hub 717 (Figs. 44 and 51) is an engaging cam 814, the periphery of which is adapted to coact with a roller 815 (Fig. 44) carried by an arm 816 secured to the shaft 720. Also secured to the shaft 720 is a pair of arms 818 (Fig. 60), each having therein a cam slot 819 adapted to cooperate with studs 820 fast in the arms 802 and 803 of the frame 800. A pair of springs 821 (only one shown, Fig. 43) are tensioned to hold the roller 815 in constant contact with the cam 814. Fast in the arms 812 and 813 are studs 873 and 874 which extend through concentric slots in the arms 802 and 803 of the frame 800 and are adapted to be engaged by the cam arms 818.

As previously explained, in the first cycle of an overdraft operation a total (complement of the overdraft) is taken from the No. 1 totalizer at the beginning of which operation the totalizer wheels are meshed with the actuator racks 571. The initial movement rearward of the actuator racks revolves said wheels 652 until stopped by one of two long teeth 651 (Figs. 58 and 59) thereon coming in contact with its trip pawl 649 (Fig. 34). This positions the actuators 571 and printing segments 574 commensurate with the amount standing on the totalizer wheels, which in the case of an overdraft is the complement thereof. While the actuators are thus positioned, the cam 814 (Figs. 43 and 44) rocks the arm 816, shaft 720, and arms 818 counter-clockwise. The cam slots 819 coacting with the studs 820 rock the frame 800 counter-clockwise to mesh the wheels 806 with a series of rack bars 822 (Fig. 34) one of which is carried by each actuator rack 571. The arms 818 in their initial movement counter-clockwise engage the studs 873 and 874 to rock the aliner 810 out of mesh with the wheels 806 after said wheels have been meshed with the rack bars 822. During the last half of the first cycle of an overdraft operation the actuators are returned to their forward positions, rotating the wheels 806 counter-clockwise to positions corresponding to those of the actuators 571.

In the second cycle of an overdraft operation the complement of the overdraft which has been temporarily stored in the auxiliary differential is subtracted from the No. 1 totalizer, which was reset to zero in the preceding total-taking operation. This is accomplished in the following manner.

In subtract operations the totalizer wheels 652 (Fig. 34) are meshed with the actuator racks 571 prior to the initial movement of said racks, the same as in total-taking operations. The actuator racks in their initial movement rearward rotate the totalizer wheels and the wheels 806 of the auxiliary differential until the wide teeth 807 on said wheels contact the projections 808 and 809. Thus the actuators are returned to the positions they were placed in by the total-taking operation in the first cycle, causing the complement of the overdraft to be subtracted from the previously cleared No. 1 totalizer, which leaves the positive amount of the overdraft therein.

Before the actuators 571 start their movement forward in the last half of the second cycle of an overdraft operation, the wheels 806 of the auxiliary differential are disengaged from the racks 822 by the cam 814 and springs 821 returning the arms 818 to normal positions. This also releases the aliner 810, which is re-engaged with the wheels 806 by the springs 811. The auxiliary differential remains in this position throughout the remainder of an overdraft operation.

It will be seen from the foregoing description that when a total is taken of the No. 1 totalizer in the third cycle of an overdraft operation the amount of the overdraft will be printed in positive form, which is the desired result.

*Overdraft key releasing and locking mechanism*

The overdraft key is automatically released near the end of the third cycle of an overdraft operation by means of a release cam 863 (Figs. 47 and 51) keyed to the hub 717. The release cam 863, like the other cams on this line, makes one complete revolution for each overdraft operation. The cam 863 near the end of its movement engages a roller 864 carried by the arm 700 and rocks said arm counter-clockwise which through the link 699 (see also Fig. 60) rocks the detent 698 counter-clockwise, releasing the overdraft key, which is returned to normal position by its spring 739.

The overdraft key releasing mechanism also restores the overdraft shaft 664 to normal position, releases the total key 585 for the add-subtract totalizer, and causes the overdraft key 593 to be locked in its home position. A hook 866 on the detent 698 is arranged to engage a latch 867 pivoted on the locking plate 694. A spring 870 is tensioned to hold the latch 867 in contact with the bottom of the hook 866.

When the detent 698 is rocked counter-clockwise to release the depressed overdraft key 593, the hook 866 engages the latch 867 and under tension of the spring 701 rocks the locking plate 694 clockwise, causing the step 696 to move under the ear 697 and lock the overdraft key in home position. The clockwise rocking of the plate 694 through the link 693 and arm 691 (Fig. 35) rocks the overdraft shaft 664 counter-clockwise, as viewed in Fig. 35, and clockwise, as viewed in Fig. 57, which through the arm 665 (Fig. 57), link 666, and pitman 667 rocks the latch 669 clockwise, unlocking the No. 1 total key 585.

The latch 867 remains coupled to the hook 866 at the end of an overdraft operation, but upon the subsequent operation of the machine a foot 868 of the latch 867 is engaged by a projection 869 on the arm 148, as the latter is rocked counter-clockwise, and release from the hook 866. The latch 867 then assumes the position shown in Fig. 47.

Machine release mechanism

As previously stated the machine is driven by a constantly running motor substantially of the type disclosed in the above mentioned Bernau Patent No. 1,601,102.

To release the machine so that it may be driven by the motor it is necessary that the driven member of the motor clutch, to which the driving link 150 is connected, be connected to the driving member of the motor clutch shown in the Bernau Patent No. 1,601,102.

To effect such a connection of the parts of the motor clutch the machine is provided with a starting bar 199 (Figs. 14, 18 and 19) carried on stems 200 and 201. In machines of this type the starting bars are locked against movement whenever the movable carriage is not stationary in a true columnar position. The mechanism for accomplishing this locking condition forms no direct part of the present invention but is old and well known in the art, and is disclosed in full in applicant's co-pending application 626,152, filed July 29, 1932, issued April 28, 1936, as United States Letters Patent No. 2,038,717. The stem 200 is connected to a starting bar lever 197 pivoted on a stud 198 fast in the frame 131. The stem 201 is connected by a pin 340 (Fig. 19) to a three armed lever 341 pivoted on a stud 342 fast in the frame 131. Another arm of the lever 341 is bifurcated to embrace a pin 343 in the lever 197. The third arm of the lever 341 carries a stud 344 normally resting beneath a shoulder of a clutch release pawl 345 pivoted on a stud 346 carried by the frame 131. Connected to the pawl 345 is a clutch release link 347, the opposite end of the link 347 being guided by a stud 348 in the frame 131. This link 347 carries a pin 349 embraced by a clutch release arm 350 pivoted on the motor frame. The arm 350 is under spring tension so that its upper end, shown in Fig. 19, tends to move towards the front of the machine.

The above described machine release parts operate as follows. When the starting bar 199 is depressed the pins 340 and 343 rock the three armed lever 341 clockwise which removes the stud 344 from beneath the shoulder of the pawl 345 whereupon the clutch release arm 350 under the influence of its spring (not shown) moves towards the front of the machine thus permitting the driven member of the motor to be operated by the driving member of the motor clutch as set forth in the Bernau patent above mentioned. Upon connection of the motor clutch members the link 150 (Figs. 10 and 18) drives the operating arm 148 in the manner previously described.

The machine also has a second starting bar 360 (Figs. 14, 18 and 19) secured to a stem 361 having a slot 362 cooperating with the pin 340 in the lever 341. Depression of the bar 360 rocks the lever 341 to permit the motor clutch members to function the same as when the starting bar 199 is depressed.

The starting bar 199 when depressed normally causes a tabulation of the carriage and the starting bar 360 a vertical feed of the work sheets but no tabulation of the carriage. Under certain conditions the tabulating mechanism is controlled so as to be ineffective upon depression of the starting bar 199.

Such features, that is, the tabulation, the control thereof and the vertical feed will be discussed later in this specification.

Machine release during overdraft operation

In overdraft operations the depression of the overdraft key 593 releases the machine for operation. The mechanism for accomplishing this result will now be explained.

Pivoted at 879 (Fig. 50) to the overdraft key 593 is a link 880 having a slot 881 which embraces a stud 882 fast in an arm 883 of a lever 341 (Figs. 19 and 50) pivoted on the stud 711 which coincides with the stud 342 (Fig. 19) and which is used to support the lever 341 when the overdraft mechanism is used in the machine.

Depression of the overdraft key 593 through the link 880 and stud 882 rocks the lever 341 clockwise to permit the motor clutch members to function to release the machine the same as when the starting bar 199 is depressed, as above described.

In other than overdraft operations, when the machine is released by the starting bar 199, the stud 882 moves idly in the slot 881 without disturbing the overdraft key 593.

When the machine is released for operation by the overdraft key 593 and the carriage is positioned to receive printed totals, the power means is controlled by the control rail 169 on the carriage to render the throat opening means effective and said power means is also controlled by the overdraft key 593 so that the control of the power means by the rail 169 on the carriage is suspended during the first two cycles of an overdraft operation but is again effective during the latter part of the third cycle of such overdraft operation due to the uncoupling of the link 145 and the arm 148 during the first two cycles of the overdraft operation and the coupling of said link 145 and arm 148 during the third cycle of the overdraft operation. Such uncoupling of the link 145 and arm 148 also prevents any printing during said first two cycles but permits printing during the first half of said third cycle prior to the opening of the front-feed throat.

Machine release locking mechanism

Means have been supplied for locking the machine releasing means when the end of the record sheet approaches the printing line. Such means will now be described.

Referring to Figs. 15, 16 and 18 journaled in the platen frame plates 52 and 53 is a shaft 175 having secured thereon a plurality of feeler fingers 176 (only one of which is shown in Fig. 15) the lower ends of which are adapted to cooperate with openings in the record sheet table 56. Secured near each end of the shaft 175 is an arm 177 bifurcated to embrace studs 180 in arms 181 and 182 pivoted at 178 to the end plates 52 and 53 respectively.

The lower ends of the arms 181 and 182 are connected by a rod 183 adapted to cooperate with an arm 184 secured to one end of a sleeve 185 turnably mounted upon the shaft 134. Secured to the other end of the sleeve 185 is an arm 186 having a notch adapted to cooperate with a stud 187 carried by a three-armed lever 188 pivoted at 157 to the frame 131. Another arm of the lever 188 has a stud 190 embraced by the bifurcated end of a lever 191 pivoted at 192 to the frame 131. The forward end of the lever 191 cooperates with a stud 193 carried by a starting bar latch 194 pivoted on a stud 195 secured in the frame 131. The lower end of the latch 194 is notched to cooperate with a stud 196 (Fig. 14) carried by the starting bar lever 197. A spring 202 (Fig. 16) is tensioned to urge the arms 181 and 182 clockwise, and the arms 177, shaft 175 and fingers 176 counter-clockwise.

As long as the record sheet is between the fingers 176 and the openings in the table 56, the machine release locking mechanism will be retained in its ineffective position, as shown in Figs. 14 and 16. When the end of the record sheet passes the openings in the table 56 the fingers 176 (Fig. 15) enter the openings under tension of the spring 202, allowing the shaft 175 and arms 177 to rotate counter-clockwise and the arms 181 and 182 to rotate clockwise. It might be well to state, that a lever 203 (Fig. 16) to be later described must be in its dot and dash position in order that the automatic locking means may function. This clockwise movement of the arms 181 and 182 moves the rod 183 forwardly and allows the arm 184 (Figs. 16 and 18), the sleeve 185 and arm 186, to rotate counter-clockwise under influence of a spring 218 stretched between one arm of the lever 188 and the frame 131 until stopped by a projection on the arm 184 engaging the cross frame 133. The spring 218 also rocks the lever 191 counter-clockwise thus allowing the latch 194 to be rocked clockwise by a spring 219, which moves the notched lower end thereof into the path of the stud 196 in the starting bar lever 197 thereby locking the starting bars 199 and 360 against depression.

Frequently it is desirable to use the remaining portion of the record sheet, therefore means have been provided for manually restoring the machine release locking mechanism to ineffective position after the end of said record sheet has passed beyond the feeler fingers 176. Pivoted on the plate 52 (Figs. 2 and 16) is a finger lever 203 having an arcuate surface 204 terminating in a notch 205 adapted to cooperate with a stud 206 carried by the arm 181. The lever 203 has a projection 207 arranged to cooperate with a stud 208 carried by a crank 209 secured to the shaft 76.

After the record sheet has passed the openings in the table 56 resulting in the automatic locking of the machine releasing mechanism as explained above, if it is desired to continue operating the machine, the operator pushes the lever 203 clockwise to the full line position shown in Fig. 16 to cause the arcuate surface 204 to engage the stud 206, thus rocking the arms 181 and 182 counter-clockwise and disengaging the latch 194 from the stud 196.

Each time the platen 64 is moved away from printing position the shaft 76 receives a clockwise movement as hereinbefore explained, and the stud 208 engages the projection 207 and returns the lever 203 to its normal position as shown by dot-and-dash lines in Fig. 16, in which position the notch 205 is opposite the stud 206. The lever 203 is retained in its normal position by a spring 210 tensioned to hold a projection 211 in contact with the stud 206.

It will be seen that by the use of the lever 203 the operator may continue to operate the machine after the end of the record sheet passes beyond the feeler fingers 176 (Fig. 15) but that each time the platen 64 is rocked away from printing position the lever 203 is returned to its normal position, resulting in the locking of the releasing mechanism under control of the feeler fingers 176 when the platen is again returned to printing position. Therefore each time the platen is automatically rocked away from printing position for the removal and insertion of ledger or other "front feed" work sheets and then returned to printing position the attention of the operator will be directed to the fact that the end of the record sheet has passed beyond said fingers 176.

The mechanism just described also serves to lock the machine releasing mechanism when the platen frame is rocked away from printing position into front feeding position.

Referring to Figs. 16 and 18 when the arms 181 and 182 and the rod 183 are held in position to render the machine release locking means ineffective, either by means of a record sheet or by the lever 203, as previously described, the rocking of the platen frame away from printing position causes the arms 181 and 182 and the rod 183 to move in unison therewith to free the arm 184 and its associated train of mechanism (Fig. 16) to lock the starting bars 199 and 360 (Figs. 14 and 19) against depression in the same manner hereinbefore described.

It will be understood that while the machine release locking mechanism is shown embodied in the preferred form of mechanism, in which the platen 64 is automatically rocked away from printing position, still this locking mechanism can be used with equal results in the modified form of mechanism wherein the platen rocking mechanism is manually operated.

*Front feed guide chute*

A chute has been provided for guiding paper around the platen when inserted at the front thereof. This mechanism also serves as a line finding device for properly locating the ledger sheet or other material inserted therein in relation to the printing line. When the platen and its carrying frame are in normal printing position, the guiding mechanism is retained in a position where it will not obstruct the view of the printing line. The rocking of said platen and its carrying frame away from printing position moves the guiding mechanism to a position where it will properly direct material around the platen. A detailed description will now be given of this mechanism.

Referring to Figs. 2, 4 and 5, pivoted on the platen shaft 63, just inside the platen frame end plates 52 and 53, are arms 212 and 213, carrying at their upper ends rollers 214 and 215 projecting into slots 216 and 217 in brackets 220 and 221 secured on the traveling carriage frame 51. The arms 212 and 213 are connected by a guiding bar 222 which is secured to right angled surfaces formed on said arms 212 and 213. Adjustably attached to each end of the bar 222 are lateral guides 223 and 224, the lateral location of which may be changed in relation to the platen 64 to accommodate different widths of paper or ledger sheets. The rocking of the platen and its carrying frame away from printing position (Figs. 3 and 5) and the cooperation of the rollers 214 and 215 with the inclined slots 216 and 217 changes the positions of the arms 212 and 213 so that the bar 222 and lateral guides 223 and 224 are tilted into alinement with a front feed guide table 225 which extends the width of the platen 64 and is secured to the platen frame end plates 52 and 53. Adjustably mounted on the table 225 are rear lateral guides 226 (Figs. 4 and 5), the lateral locations of which may be shifted to conform to the locations of the front guides 223 and 224.

When the platen is away from printing position, as shown in Fig. 5, the top edge of the bar 222 is so positioned in relation to the printing line that it serves as a means for properly locating material inserted at the front of the platen in proper relation to the printing line. It will be recalled that when the platen is out of printing position the pressure rolls 96 (Fig. 5) are disengaged therefrom thereby permitting paper to be inserted within the lateral guides 223 and 224 and simply pushed around the platen 64, guided by the front feed table 225 until the top edge of the bar 222 is in alinement with the bottom of the last row of printing upon said ledger sheet. This locates the ledger sheet in relation to the printing mechanism so that when the platen is returned to printing position the space just below the printing on said ledger sheet will be in alinement with the impression mechanism.

*Line spacing operating mechanism*

The present machine is provided with an automatic line spacing or vertical feeding mechanism operated by the printer drive shaft.

Fast in the starting bar stem 361 is a stud 370 (Fig. 19) arranged to cooperate with a projection 371 on an arm 372 pivoted on the stud 342. A spring 373 holds the projection 371 in contact with the stud 370. The arm 372 has a shoulder 374 adapted to cooperate with a pin 375 carried by a lever 376 pivoted on a stud 377 fast in the frame 131. The pin 375 is held by a spring 378, in the bottom of a slot in an arm 379 pivoted on the pin 340.

An arm 380 of the lever 376 carries a pin 381 against which is held a shoulder of an arm 382 flanged at the top to cooperate with a stud 383 in a key release bar 384 slidably mounted on the right printer plate (not shown). A spring 401 normally maintains the contact between the arm 382 and the pin 381. The rear end of the bar 384 has a foot 385 arranged to cooperate with a stud 386 in a latch 387 pivoted to an arm 388 secured to one end of a sleeve 389 turnably mounted in the machine cross frame 133. Secured to the other end of the sleeve 389 is an arm 390 connected to an arm 391. This arm 391 carries the usual paper feed hook 392 which cooperates with the curved edge of a paper feed rail 393. Secured to the printer shaft 143 is a paper feed operating arm 394 carrying a stud 395 adapted to cooperate with a shoulder 396 of the latch 387.

Depression of the starting bar 360, through its stem 361, rocks the lever 341 clockwise to release the machine in the manner previously described, and at the same time the stud 370 rocks the arm 372 clockwise to bring the shoulder 374 beneath the pin 375 thus preventing the spring 378 from rocking the lever 376. Therefore, the arm 382 cannot move and the bar 384 remains in the position shown in Fig. 19.

Now, as the printer shaft 143 is oscillated by the means previously described, the stud 395 wipes past the latch 387 against the tension of a spring 397, as the arm 394 moves clockwise, which places the stud 395 in the path of the shoulder 396. Upon return movement of the arm 394 the stud 395 contacts the shoulder 396 and raises the latch 387, thus rocking the arms 388 and 390 and the sleeve 389 clockwise thus lowering the arm 391 and hook 392 whereupon the latter rocks the paper feed or line spacing bail 393 to actuate the line spacing mechanism to be presently described.

As the hook 392 nears the end of its downward movement, a tail 398 of the latch 387 contacts a bushing 399 carried by the right printer frame (not shown) whereupon said latch is disengaged from the stud 395 and a spring 400 returns the parts 387, 388, 389, 390, 391 and 392 to their home positions.

*Automatic line spacing mechanism*

The mechanism operated by the above described operating mechanism and which is directly associated with the platen to turn the same for line spacing purposes will now be described with particular reference to Figs. 6 to 9.

The above mentioned rail 393 is connected by a plurality of supporting members (not shown) and an arm 230 to a sleeve 231 rotatably supported by the shaft 57. The arm 230 has an upper extension carrying a stud 232 adapted to cooperate with a curved slot 233 in a link 234 pivoted on a stud 235 carried by an arm 236 loosely mounted on the platen shaft 63. Pivotally supported by the arm 236 is a feed pawl 237 adapted to cooperate with the teeth of a ratchet 240 secured to the platen shaft 63. Tensioned between an extension of the arm 236 and a stud 241 carried by the feed pawl 237 is a spring 242 which urges said feed pawl into engagement with the teeth of the ratchet 240.

Turnably mounted on the shaft 63 just outside the platen frame end plate 53 (Figs. 7 and 9) is a platen feed control arm 243 having an arcuate surface 244 adapted to cooperate with the stud 241 carried by the feed pawl 237 for a purpose to be later described. The arm 243 has a series of equally spaced notches 245 adapted to cooperate with a retaining pawl 246 pivotally mounted on the platen frame end plate 53. Rotatably mounted on the plate 53 is a ratchet retaining arm 247 carrying a roller 248 adapted to cooperate with the teeth of the ratchet 240. Tensioned between the arm 247 and the pawl 246 is a spring 249 which retains the roller 248 in engagement with the teeth of the ratchet 240 and the pawl 246 in engagement with the notches 245 in the arm 243.

Downward movement of the feed arm 391 and hook 392 in the manner previously described, rocks the arm 230 (Fig. 7) counter-clockwise, which through the link 234 rocks the arm 236 counter-clockwise, causing the feed pawl 237 to rotate the ratchet 240 and the platen 64 counter-clockwise to line-space the paper wound therearound. A lug 250 (Fig. 9) carried by the plate 53 is adapted to cooperate with the stud 241 carried by the feed pawl 237 to limit the movement of said feed pawl, thereby preventing overthrow on fast machine operations. The platen feeding mechanism is returned to normal position by a spring 238 (Fig. 7) tensioned between the arms 60 and 236. The feed of the platen 64 may be varied by adjusting the lever 243 (Figs. 7 and 9) to one of its three positions, which through the arcuate surface 244 controls the pickup of the feed pawl 237 in the well known manner.

*Auxiliary line spacing mechanism*

Due to the fact that the automatic line spacing mechanism and the mechanism which automatically rocks the platen away from printing position operate at approximately the same time, the automatic line spacing mechanism is rendered ineffective at such times. Since it is essential that the record sheet and its carbon be line spaced each time the platen is rocked away from printing position there is provided an auxiliary feeding means to accomplish such result.

When the paper feed hook 392 (Fig. 7) is being lowered to ordinarily operate the paper feeding mechanism and the platen 63 is being rocked away from printing position for "front feeding" purposes, the pivoting of the platen frame causes the feeding rail 393 to travel downwardly with the feeding hook 392, thus preventing any feeding at such times.

Figure 7:
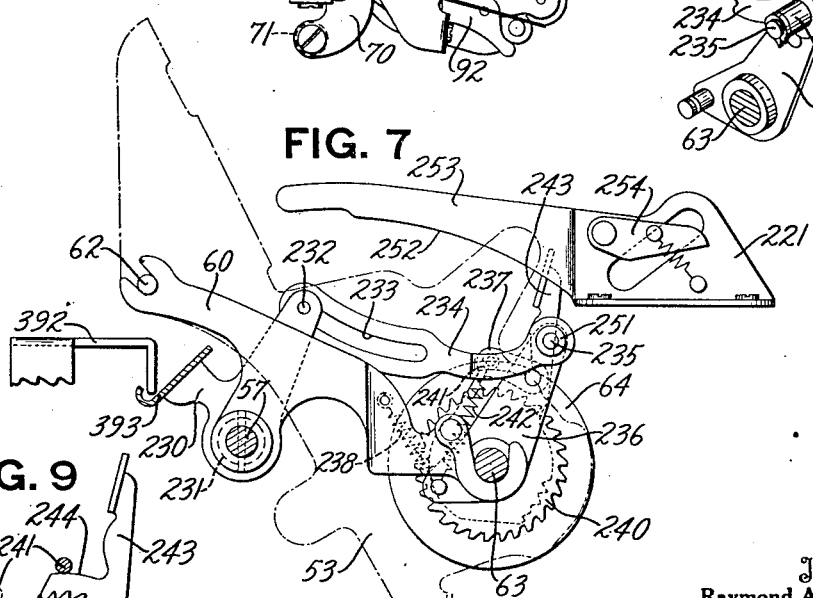
Fig. 7 is a left side view illustrating in detail the platen rotating or line spacing mechanism.
Figure 9:
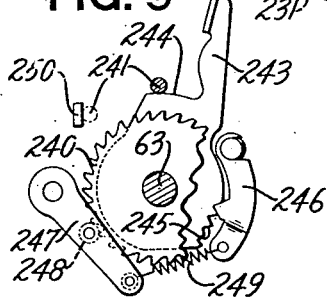
Fig. 9 is a detail view showing the platen feed ratchet, its retaining pawl and the adjusting mechanism for the platen feed.
Figure 20:
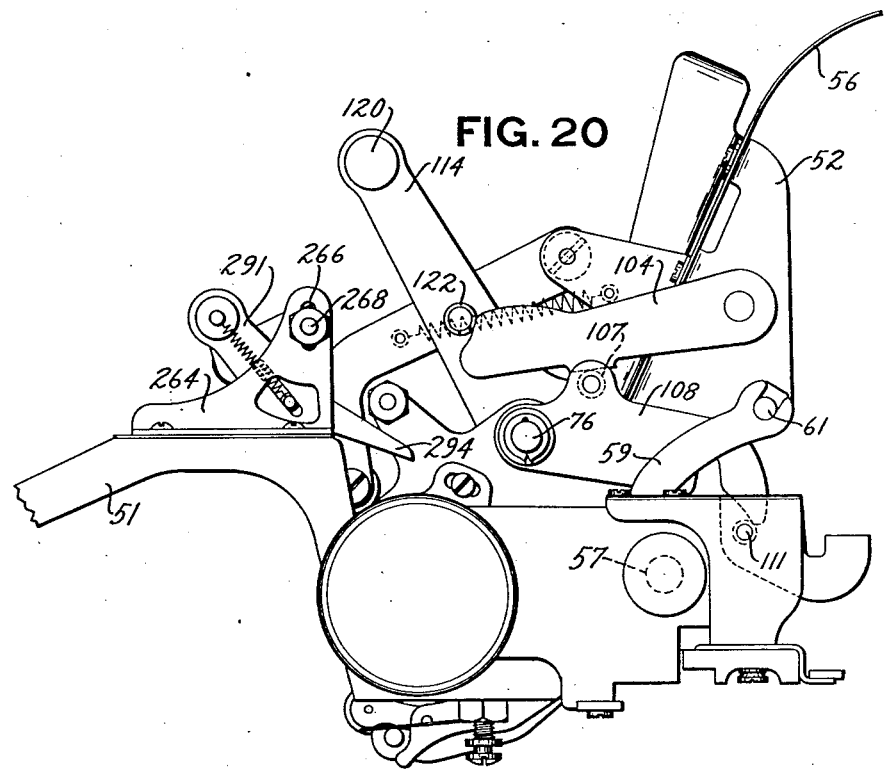
Fig. 20 is an elevation of the righthand side of a traveling carriage illustrating a modified form of platen rocking mechanism.
Figure 21:
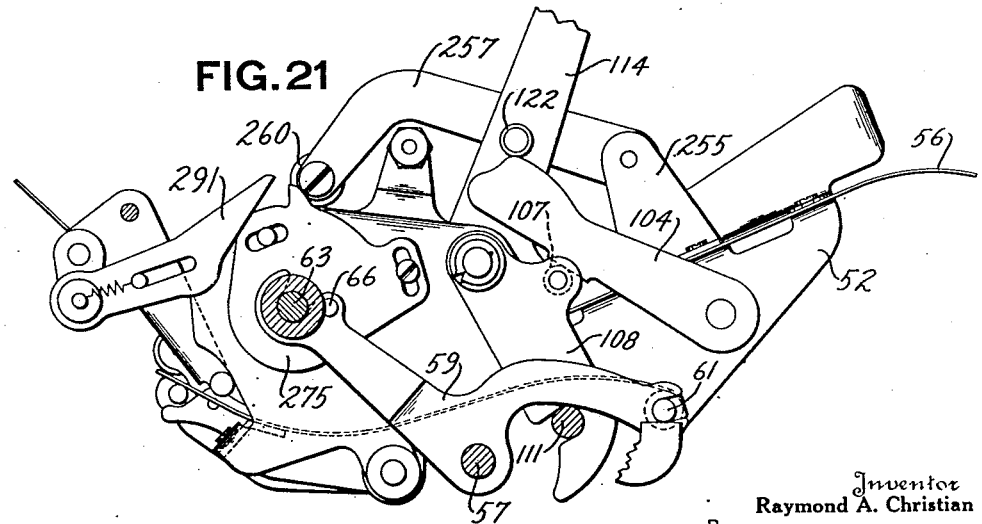
Fig. 21 is a right side elevation omitting the traveling carriage frame, and illustrates the positions of the parts associated with the modified form of the instant invention when the platen is rocked out of printing position.

In order that line-spacing may be effected at this time, the rocking of the platen away from printing position causes a roller 251 (Figs. 7 and 8) loosely mounted on the stud 235 to engage a camming surface 252 on the lower side of an extension 253 of the bracket 221, which is secured to a part of the carriage frame 51 which does not rock, thus causing the arm 236 to be rocked counter-clockwise, as viewed in Fig. 7 to rotate the platen 64 in exactly the same manner as hereinbefore described. The slot 233 in the link 234 allows the arm 236 to move independently of the feed bar 393.

The automatic feeding of the platen and the printing of higher numbers, such as 7's, 8's and 9's, have a tendency to rock the platen slightly out of printing position. To overcome this a spring-pulled retaining pawl 254 (Figs. 6 and 7) pivoted to the bracket 221 is adapted to cooperate with the roller 215 carried by the arm 213. The resistance offered by the arm 254 to the roller 215 is sufficient to overcome any tendency of the platen 64 and its carrying frame to move away from printing position.

Tabulating mechanism

The tabulating mechanism will be but very briefly described.

Referring to Fig. 19, the upper end of the arm 380 is arranged to cooperate with an extension 410 of a tabulating disabling lever 411 pivoted in a stud 412 in the frame 131 so as to rock horizontally. The forward end of the lever 411 is shaped to form a hook 413 to cooperate with a stud 414 in the usual tabulating release lever 415. A pawl 416 pivoted on the printer operating link 145 is adapted to engage the stud 414 for a purpose to be later described. A spring 417 holds an ear 418 of the pawl 416 in contact with the edge of the link 145.

Depression of the starting bar 199 as heretofore stated, rocks the levers 341 and 197 to release the machine for operation. Since there is no obstruction beneath the stud 375, the lever 376 under tension of its spring 378 moves counter-clockwise and the arm 380 rocks the lever 411 to remove its hook 413 away from the stud 414. Consequently, when the pawl 416 is raised by the link 145, said pawl engages the stud 414, and upon downward movement of the link 145 and pawl 416 the tabulating lever 415 is rocked to release the traveling carriage in the usual manner for column tabulation.

The rocking of the lever 376 also effects a movement of the arm 382 which moves the bar 384 forward whereupon its foot 385 rocks the latch 387 into an ineffective position relative to the arm 394 and stud 395 thereby preventing vertical feed or line spacing when the machine is released by the starting bar 199 which normally effects a tabulation of the carriage.

Tabulating control

As has been stated in the early part of this specification, when banks are using machines, embodying the present invention, to transfer balances to new monthly statements it is more convenient to use the starting bar 199 to release the machine than it is to use the smaller starting bar 360. It is, however, neither necessary nor desirable to tabulate the carriage from column to column at such times, therefore means have been provided to so control the tabulating mechanism that it will be rendered ineffective when the bar 199 is used to release the machine during monthly balance transferring operations. Moreover said means also controls the vertical feed or line space operating mechanism whereby it is not rendered ineffective upon operation of the starting bar 199 as is usually the case.

The above mentioned controlling means is manually operable and is a very simple device. It will now be described in detail referring particularly to Fig. 19.

Projecting through a lever-way 420 in the regular keyboard plate 421 is a lever 422 pivoted at 423 to a bracket 424 secured to the plate 421. The lever 422 has a foot 425 adapted, under certain conditions, to cooperate with the stud 375. The lever-way 420 has offsets 426 and 427 into either of which the top of the lever 422 may be set.

As shown in Fig. 19 the lever 422 is set in the offset 426 and when in this position it has no effect upon the starting bar 199. However when the lever 422 is shifted into the offset 427 the foot 425 is moved into contact with the lower side of the stud 375 so that when the machine is released by depression of the starting bar 199 and the lever 341 is rocked and arm 379 lowered, as is usual, the spring 378 cannot rock the lever 376 and consequently the lever 411 and its hook 413 remain in the positions shown. Therefore, when the pawl 416 is raised it moves idly over the hook 413 and does not engage the stud 414 and the tabulating release lever 415 is not rocked. Consequently there is no column tabulation.

Due to the fact that the lever 376 and arm 382 are not rocked, the bar 384 is not shifted and the line spacing operating mechanism can function in the usual way as previously described.

With the lever 422 in the offset 427 the operator may transfer balances on individual sheets without having to shift the carriage back to a certain column after the entry of each balance.

Thus the work may be speeded up as it is much more convenient and much faster to release the machine by the bar 199 than it is by the bar 360.

Interlock

To prevent release of the machine when the bar 360 is partially depressed only, the arm 372 has an integral arm 430 (Fig. 19) carrying a plate 431 with a lip 432 adapted to cooperate with a lip 433 of a plate 434 secured to the previously described pawl 345. The position of the starting bar 360 determines the position of the arm 430 and lip 432 and should the bar 360 be in a partially depressed position the lip 432 would be in the path of the lip 433 and consequently prevent movement of the clutch release link 347 and its connected parts. When the bar 360 is fully depressed the lip 433 passes to the rear of the lip 432.

Auxiliary pressure rolls

As previously explained, the record sheet remains in the machine for the period of an entire run during which time the platen 64 will be rocked out of and into printing position numerous times for the withdrawal and insertion of ledger sheets. As the regular pressure roll assembly is disengaged from the platen when the latter is away from printing position an auxiliary set of pressure rolls have been provided for retaining the record sheet and its carbon in contact with the platen 64 to hold them in proper relation to the printing line and to permit them to be fed by the platen while it is being rocked away from printing position. This auxiliary pressure roll mechanism which is exactly the same in both the preferred and modified forms, will now be described in detail.

Secured to the platen feed table 56 (Figs. 3, 4 and 23) are brackets 255 and 256 having pivoted thereon arms 257 and 258 connected by a rod 259 upon which is rotatably mounted a plurality of pressure rolls 260. Tensioned between the brackets 255 and 256 and their associated arms 257 and 258 are springs 261 and 262 so positioned in relation to said brackets and arms that they retain the pressure rolls 260 in contact with the platen 64, when it is in printing position as shown in Fig. 4, and also when it is moved away from printing position, as shown in Fig. 3. Moving the arms 257 and 258 upwardly or clockwise, as viewed in Figs. 3, 4 and 23, for the purpose of removing or inserting record sheets and their super-imposed carbons causes the springs 261 and 262 to pass from one side of the fulcrum point of the arms 257 and 258 to the other side to retain the pressure rolls 260 out of engagement with the platen 64 when desired.

MODIFIED FORM

The chief difference between the preferred and modified forms is that in the preferred form the mechanism that rocks the platen away from printing position operates automatically when the traveling carriage is in a predetermined columnar position and in the modified form the mechanism that rocks the platen out of printing position is operated manually. Certain parts of these mechanisms that are identical were treated at the same time in the description given hereinbefore for the preferred form. Therefore, only the mechanism that is peculiar to the modified form will be treated in the following detailed description.

Front feed guide chute and line finding mechanism

Secured on either end of the traveling carriage frame 51 (Figs. 20 and 24) are brackets 264 and 265 having respectively vertical slots 266 and 267. A pair of shouldered studs 268 are adjustably mounted on the brackets 264 and 265 by means of tenons extending through the vertical slots 266 and 267, said tenons being threaded to receive nuts which secure said shouldered studs in adjusted positions.

A front feed guide chute 269, which extends the full width of the platen 64 (Figs. 1, 26 and 31) has right angled arms 270 and 271 by means of which the guide chute is pivoted between the studs 268 upon a pair of screws 272 secured in said studs 268. The lower ends of the arms 270 and 271 carry rollers 273 and 274 arranged to cooperate with notches in the periphery of a pair of platen retaining plates 275 (Figs. 1 and 31). The plates 275 are loosely mounted on hubs 277 carried by the platen frame end plates 52 and 53. Said plates 275 are radially adjustable in relation to the platen shaft 63 and secured in adjusted position by screws 280 (one only shown) threaded in the plate 52 cooperating with a concentric slot 281 in said plate 275. The plates 275 have notches 282 adapted to cooperate with the rollers 273 and 274 (Figs. 1 and 31) to overcome the tendency of the platen to rock slightly out of printing position while being automatically line-spaced or while an impression is being made.

The end plates 52 and 53 (Figs. 22 and 31) have camming surfaces 284 and 285 adapted to cooperate with the rollers 273 and 274 to rock the front feed guide chute 269 into guiding position when the platen 64 is moved away from printing position and to rock said guide chute out of guiding position when the platen is moved into printing position. A pair of torsion springs 286 (Figs. 1 and 32) loosely mounted on the studs 268 have bent ends, one of which engages the brackets 264 and 265 and the other the arms 270 and 271 on the guide chute 269. These springs are tensioned to rock the guide chute counter-clockwise as viewed in Figs. 26 and 31, thereby retaining the rollers 273 and 274 in contact with the camming surfaces 284 and 285 of the plates 52 and 53.

Calling attention to Figs. 26, 27, 31 and 32, journaled in the arms 270 and 271 of the guide chute 269 is a shaft 287 having secured thereto a line-finding bar 288 which extends the full width of the platen 64. Secured on the right-hand end of the shaft 287 (Fig 31) is a crank 289 having herein a stud 290 upon which is loosely pivoted an arm 291 having a slot 292 adapted to cooperate with a stud 293 secured in the arm 270. The arm 291 has an extension 294 which cooperates with a stud 295 secured in the plate 52 and extending through a concentric slot in the plate 275. A spring 296 tensioned between the studs 290 and 293 is so positioned in relation to the shaft 287 that it retains the line finding bar 288 in either its effective or ineffective positions.

Referring to Fig. 24, secured on the shaft 287 is an adjusting arm 297 with a right angled projection 298 having therein a hole threaded to receive an adjusting screw 299 secured in adjusted position by a nut 300. The end of the screw 299 is arranged to engage the spring 286 carried by the stud 268 when the line finding bar 288 is in effective position thereby providing a means for adjusting said line finding bar in relation to the printing line.

Directing attention again to Figs. 28 and 31, the rocking of the platen 64 and its carrying frame away from printing position, as explained earlier in this specification causes the stud 295 to engage the extension 294 of the arm 291 to rock the line finding bar 288 to ineffective position. The stud 295 remains in the path of the extension 294 as long as the platen is out of printing position, thereby preventing the return of the line finding bar to effective position until the platen is returned to printing position after which said bar may be manually returned to effective or line finding position.

Figure 26:
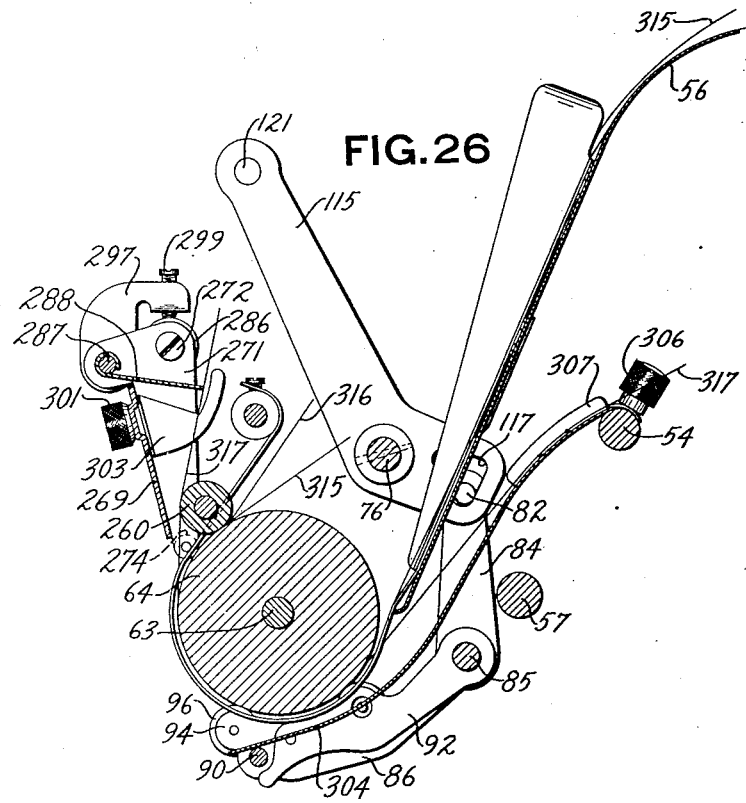
Fig. 26 is a sectional view as observed from the right of the machine depicting the front feed line finding device, the pressure roll releasing mechanism, and the rear table for the work sheet.
Figure 27:
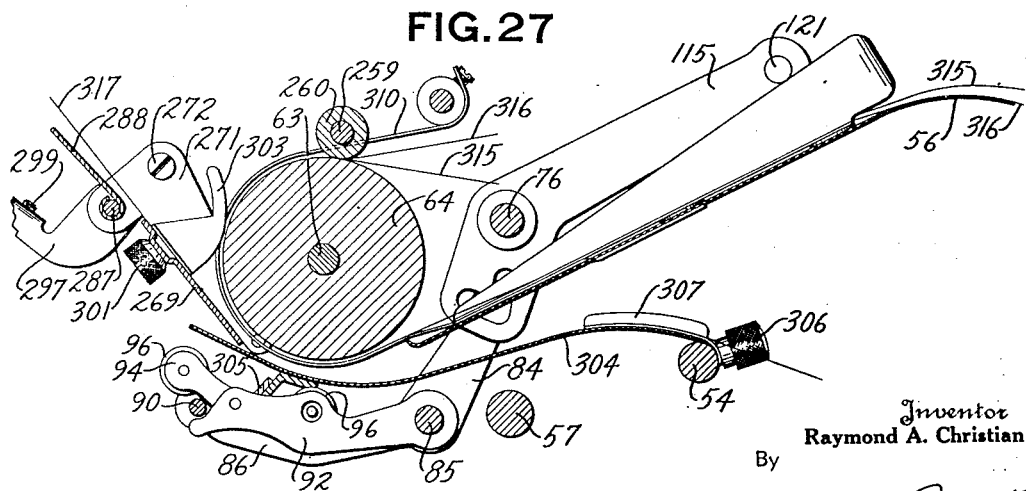
Fig. 27 is a sectional view illustrating the relative position of the front feed slip chute and the rear table when the platen roll is rocked out of printing position. This view also illustrates the manner in which the pressure rolls are disengaged from the platen when the latter is rocked away from printing position.

Referring to Figs. 1, 26 and 27, the chute 269 has a horizontal slot at each end through each of which extends a thumb screw 301 threaded into a pair of lateral guides 303. The lateral guides 303 may be adjusted in relation to the platen 64 to accommodate different width ledger sheets.

Referring to Figs. 22, 26 and 27, the rod 54, which serves as a brace for the platen frame end plates 52 and 53 also forms a support for one end on a front feed guiding table 304, the other end of which is connected to right angled projections 305 of said end plates 52 and 53. Various tapped holes are provided along the shaft 54 for the reception of a pair of thumb screws 306 which extend through lateral slots in a pair of rear guides 307, making it possible to adjust the rear guides in lateral alinement with the front guides 303 (Fig. 26).

The work sheet is guided and retained in place around the platen 64 (Fig. 22) by a pair of guiding straps 310, the forward ends of which are adjustably connected to the rod 55 by bushings 311 and screws 312. The rear ends of these guide straps extend through slots in the table 56 and have secured in said rear ends studs 313 influenced by spring tension to cooperate with holes 314 in the table 56. In adjusting the straps 310 for different width record sheets the screws 312 are loosened, permitting the bushings 311 to be slid along the bar 55 and the rear ends of said straps are then flexed downwardly until the studs 313 are disengaged from the holes 314. Then said straps may be shifted laterally, guided by the slots in the table 56 until in the proper location, in which they will be retained by allowing the studs 313 to engage the nearest hole 314 and by tightening the screws 312.

As previously explained, the auxiliary pressure roll assembly is exactly the same in both the preferred and modified forms. Therefore it is felt unnecessary to again treat this mechanism. It will also be remembered that the standard pressure roll mechanism (Fig. 25) and the manner of disengaging it from and engaging it with the platen is exactly the same in both forms. The lower ends of the levers 77 and 78 (Figs. 2 and 4) containing the cam slots 79 are exactly like the lower ends of the levers 114 and 115 of the modified form of mechanism. The manner of rocking the platen away from printing position and the mechanism employed in rocking and locking the platen out of printing position is similar in both forms, the difference being that in the preferred form the levers 77 and 78 are operated automatically when the traveling carriage is in a predetermined or selected columnar position while in the modified form the substitute levers 114 and 115 (Fig. 22) for the levers 77 and 78 extend upwardly and have fingerpieces for hand manipulation.

OPERATION

Irrespective of the fact that the system used in connection with the rockable or shiftable platen may have unfolded itself in the preceding explanation, a brief description of operation will be given. In this description both the preferred and modified forms will be treated simultaneously, the slight differences being pointed out from time to time as progression is made.

The system used by banks in the daily balancing of the accounts of individual depositors provides an excellent example of the use of the machine embodying the instant invention. In such a system there is a ledger sheet 317 (Figs. 1 and 32) for each individual depositor upon which takes place the balancing of his account. A record of the entire day's run is kept on a record sheet 315 (Figs. 1 and 26) which, together with its super-imposed carbon 316 remain in the machine during an entire run. With the platen rocked away from printing position (Figs. 3 and 27) the record sheet and its super-imposed carbon are first inserted around the platen in the usual manner guided, in both the preferred and modified forms, by the table 56 and the lateral guides thereon and in addition in the modified form by means of the straps 310. The record sheet and its carbon are retained in contact with the platen 64 by the auxiliary pressure rolls 260.

After the record sheet and its carbon have been properly threaded around the platen the operator takes a ledger sheet 317 from a handily arranged stack, inserts it around the platen from the front, guided, in the preferred form, by the bar 22, guides 223 and 224 (Fig. 5) and the front feed guide table 225 and, in the modified form, by the front feed guide chute 269 (Figs. 1 and 27) and the front feed guide table 304. In the preferred form, the ledger sheet 317 is located in proper relation to the printing line by alining the bottom of the last row of printing on said ledger sheet with the top edge of the bar 222 and, in the modified form, the line finding bar 288 (Fig. 26) is manually rocked to its effective position, as here shown, and the bottom of the last row of printing on the ledger sheet alined therewith.

After the ledger sheet is thus located around the platen, the platen is returned to printing position, which is accomplished in the preferred form by striking the lever 125 (Fig. 3) and in the modified form by rocking the levers 114 and 115 (Fig. 22) forwardly. As previously explained, the pressure rolls 96 (Figs. 4, 25 and 26) are re-engaged with the platen before it makes any movement toward printing position, thereby retaining the location of the ledger sheet. Likewise the pressure rolls 96 remain in contact with the platen 64 until it completes its movement away from printing position, thereby insuring the feeding of the record sheet and its super-imposed carbon.

The ledger sheets 317 (Fig. 1) are usually divided into a plurality of vertical columns, the extreme lefthand column being used for the entering of old balances. The next several columns to the right are generally used for the entering of checks issued against the account and following these columns is a column for the entering of deposits. The final column to the extreme right of the ledger sheet is used for striking a new balance or balancing the account.

Directing attention to Fig. 1, with the traveling carriage in its extreme righthand or old balance position, the operator ascertains the old balance, which is the last balance printed in the extreme righthand or new balance column, sets it up on the keyboard and releases the machine for operation to add the old balance into the add-subtract totalizer and simultaneously print it upon the ledger sheet. Next the traveling carriage is tabulated to the first of several check columns and the several checks issued against this account are subtracted from the old balance and simultaneously entered upon the ledger sheet. Following the deduction of the checks from the old balance, the traveling carriage is then tabulated to the deposit column and the deposits made between balancing periods are printed upon the ledger sheet and simultaneously added to the remainder of the old balance.

In the subtraction of checks the traveling carriage may be tabulated horizontally from one check column to the next until the several columns provided for the listing of checks have been used. The traveling carriage may then be automatically returned to the first check column during which time the platen is automatically rotated to line-space the ledger and record sheets, and several more checks may then be entered as before. Or if desired, the checks may be entered in vertical alinement in a single column by using the vertical feed attachment. In the instant system only one column is provided for the entering of deposits, making it necessary, when there is more than one deposit, to list them vertically. After all the checks and deposits have been entered the traveling carriage is tabulated until the extreme righthand or new balance column of the ledger sheet is in alinement with the printing type and a balancing operation performed during which the add-subtract totalizer is totalized and cleared and the amount of the total or new balance printed upon the ledger sheet.

In the modified form, after the balancing of a particular account is complete, the platen and its carrying frame are rocked away from printing position (Fig. 27) by manually forcing the levers 114 and 115 rearwardly. The ledger sheet may then be withdrawn from the platen, placed in its proper stack and another ledger sheet inserted and acted upon in the manner just described.

In the preferred form, tabulating the traveling carriage to the new balance printing position, or until the extreme righthand column of the ledger sheet is in alinement with the printing type, renders effective the mechanism that automatically rocks the platen away from printing position and immediately after the printing of the new balance takes place this mechanism functions in the manner described earlier in this specification. This allows the operator to remove the ledger sheet from around the platen while the traveling carriage is being automatically returned to its starting position, thereby speeding up to a marked degree the balancing of individual accounts. As has been previously explained, when the paper carriage is in position for printing the new balance, bell crank 156 is automatically withdrawn from engagement with stud 154 on link 137, so that the automatic throat-opening mechanism is rendered effective. It will not be actuated, however, until arm 142 is given an oscillatory movement from printer shaft 143. If the add-subtract totalizer contains an overdraft, or the complement of a negative total, when an attempt is made to print the new balance, total key 585 will be locked against depression and the operator then knows that it is necessary to depress the overdraft key 593, which will be unlocked. Depression of this overdraft, or negative total, key releases the machine for operation and causes it to go through three complete cycles. During the first two of these cycles, link 145 is disconnected from arm 148 and, therefore, printer shaft 143 and arm 142 will not be operated during said cycle, but, just prior to the beginning of the third cycle, link 145 is automatically connected again to arm 148, so that, during the third cycle, the printer shaft 143 will be operated to print the true negative total and arm 142 will be oscillated so that, after the printing of said total, the throat will be opened automatically. Thus, the automatic opening of the throat is under the joint control of the carriage and the negative total key and occurs with the carriage stationary in the position in which the new balance is to be printed.

While the forms of mechanisms herein shown and described are admirably adapted to fulfill the objects primarily stated, it is to be understood that it is not intended to confine the invention to the forms of embodiment herein disclosed, for it is susceptible of embodiment in various forms all coming within the scope of the claims which follow.

What is claimed is:

1. In a machine of the class described, the combination of a shiftable traveling carriage; front-feed means including a platen mounted on said carriage for receiving and holding a work sheet in front-fed position relative to said platen, said front-feed means being movable from closed to open-throat condition and vice versa; means controlling the columnar positioning of said carriage; and means rendered effective by the carriage and functioning after the carriage is moved to a predetermined columnar position and while it is stationary in said position for automatically moving said front-feed means to open-throat condition to facilitate the insertion and removal of a work sheet therein.

2. In a machine of the class described, having printing mechanism, the combination of a laterally shiftable traveling carriage; front-feed means including a platen mounted on said carriage for receiving and holding a work sheet in front-fed position, said front-feed means being movable from closed to open-throat condition and vice versa; means for controlling the columnar positioning of said traveling carriage; and means rendered effective by movement of the traveling carriage in either direction to predetermined columnar positions for causing said front-feed means to be moved automatically to open-throat condition to facilitate the insertion and removal of a work sheet therein.

3. In a machine of the class described, the combination of a laterally shiftable traveling carriage; means controlling the columnar positioning of said traveling carriage; front-feed means including a platen mounted on said carriage for receiving and holding a work sheet in front-fed position, said front-feed means being movable from closed to open-throat condition and vice versa; and means rendered effective by movement of the traveling carriage to a predetermined columnar position whereby subsequent operation of the machine causes the front-feed means to be moved to open-throat condition to facilitate the insertion and removal of a work sheet.

4. In a machine of the class described, the combination of a record supporting means laterally shiftable to various columnar positions and adjustable to and from a record receiving position; a power means; means for causing said record supporting means to assume its various columnar positions; means for rendering said causing means ineffective whereby said record supporting means may be caused to remain laterally stationary in a certain columnar position for a plurality of successive operations of the machine; and automatic means effective when said record supporting means is stationary in said certain columnar position to cause said power means to adjust said record supporting means to record receiving position as an accompaniment to each operation of the machine while the record supporting means remains stationary in said columnar position.

5. In a machine of the class described, the combination of main operating means; a laterally shiftable traveling carriage; front-feed means including a platen mounted on said carriage for receiving and holding a work sheet in front-fed position, said front-feed means being movable from closed to open-throat condition and vice versa; means for moving the front-feed means to open-throat condition; normally ineffective means for connecting the moving means to the main operating means; and means acting at certain columnar positions of the traveling carriage to render the connecting means effective whereupon subsequent operation of the machine causes the front-feed means to be moved to open-throat condition.

6. In a calculating machine having printing mechanism, the combination of a carriage including a portion movable to a position to permit ready removal and insertion of work sheets; a main operating mechanism; and means normally disconnected from said main operating mechanism but adapted to be connected thereto by movement of said carriage into a predetermined position whereby said means will be operated thereby during a regular cycle thereof for moving said movable portion of the carriage to the position for ready removal and insertion of work sheets.

7. In a machine of the class described, the combination of a reciprocable traveling carriage; front-feed means including a platen mounted on said carriage for receiving and holding a work sheet in front-fed position, said front-feed means being movable from closed to open-throat condition and vice versa; means controlling the columnar positions of said traveling carriage; normally ineffective means for automatically moving the front-feed means to open-throat condition; and means actuated by movement of the traveling carriage to a predetermined columnar position, irrespective of the direction of approach of said carriage to that position, for causing the automatic moving means to be rendered effective upon machine operation.

8. In a machine of the class described, the combination of a laterally shiftable traveling carriage; front-feed means including a platen mounted on said carriage for receiving and holding a work sheet in front-fed position, said front-feed means being movable from closed to open-throat condition and vice versa; means controlling the columnar positioning of the traveling carriage; means for moving the front-feed means to open-throat condition; operating means for moving means; means for retaining the moving means in a disabled position; and means controlled by the traveling carriage when moved in either direction to a predetermined columnar position for enabling the moving means to permit its operation by said operating means.

9. In a calculating machine having printing mechanism, the combination of a carriage including a portion movable to a position to permit ready removal and insertion of the work sheets; main operating mechanism; a member adapted to be given a definite movement by said main operating mechanism during each operation of the machine; a device intermediate said member and said carriage but normally out of the path of movement of said member; means for holding said device normally out of the path of movement of said member; and removable means carried by said carriage for disabling said holding means to permit said movable portion of the carriage to be moved upon operation of the machine.

10. In a calculating machine having printing mechanism, the combination of a carriage including a portion movable to a position to permit ready removal and insertion of work sheets; a main operating mechanism; a member adapted to be given a definite movement by said main operating mechanism during each operation of the machine; a device intermediate said member and said carriage but normally out of the path of movement of said member; means for holding said device normally out of the path of movement of said member; and means controlled by said carriage for rendering said holding means ineffective upon movement of said carriage to a predetermined position, thus permitting the device to move into the path of said member whereby said movable portion of the carriage is moved during the operation of the machine.

11. In a calculating machine having a printing mechanism, the combination of main operating mechanism for the calculating machine; a carriage; front-feed means including a platen mounted on the carriage for receiving and holding a work sheet in front-fed position, said front-feed means being movable from closed to open-throat condition and vice versa; a member adapted to be given a definite cycle of movement upon each operation of the main operating mechanism; means for moving said front-feed means to open-throat condition adapted to be operated by said member; means including a series of levers adapted to retain said moving means in a normally disabled position relative to said member; and means on said carriage adapted to render said retaining means ineffective upon movement of the carriage into a predetermined position to permit the moving means to be operated by said member to move said front-feed means into open-throat condition to facilitate ready removal and insertion of work sheets.

12. In a front-feed machine of the class described having an electric motor, means for causing said motor to give said machine cycles of operation, and printing mechanism, the combination of front-feed means for receiving and holding a work sheet in front-fed position, said front-feed means being movable from a closed to an open-throat condition and vice versa, a direct driving connection for enabling said motor to move said front-feed means to open-throat condition, and means for causing said driving connection to automatically move said front-feed means to open-throat condition.

13. In a front-feed machine of the class described having an electric motor with driving connections to said machine for giving it cycles of operation, the combination of front-feed means for receiving and holding a work sheet in front-fed position, said front-feed means being movable from closed to open-throat condition and vice versa, direct driving connections between said motor and said front-feed means, and means controlling said driving connections for causing said motor and connections to automatically move said front-feed means to open-throat condition.

14. A front-feed machine of the class described having a traveling paper carriage provided with a platen, a printing mechanism; means for holding a record sheet about said platen, front-feed means for enabling a work sheet to be front fed relative to said platen and for holding said sheet in front-fed position, said front-feed means being movable from closed to open-throat position and vice versa, motor-operated-throat-opening means operable to move said front-feed means to open-throat position independently of carriage travel, said motor-operated-throat-opening means being normally in ineffective condition, and automatic means causing said motor-operated-throat-opening means to move said front-feed means to open-throat position in a predetermined columnar position of said carriage.

15. A front-feed machine of the class described having a printing mechanism, front-feed means including a platen for receiving and holding a work sheet in front-fed position, said front-feed means being movable from closed to open-throat condition and vice versa, an electric motor, driving connections for said motor for effecting movement of said front-feed means to open-throat condition, and means for causing said motor to automatically move said front-feed means to open-throat condition.

16. In a front-feed machine of the class described adapted to be driven through cycles of operation, the combination of front-feed means for receiving and holding a work sheet in front-fed position, said front-feed means being movable from a closed to an open-throat condition and vice versa, an electric motor, direct driving connections between said motor and said front-feed means, and means controlling said driving connections operable to condition said driving connections to cause said front-feed means to be moved to open-throat condition by said motor.

17. In a front-feed machine of the class described adapted to be given cycles of operation, front-feed means including a platen for receiving and holding a work sheet in front-fed position relative to said platen, said front-feed means being movable from closed to open throat position and vice versa, an electric motor, driving connections between said motor and said front-feed means, and means operated automatically during the latter part of a cycle of machine operation to cause said motor to automatically move said front-feed means to open-throat position.

18. A front-feed machine of the class described having a printing mechanism, front-feed means including a platen for receiving and holding a work sheet in front-fed position relative to said platen, said front-feed means being movable from closed to open throat position and vice versa, column printing control means for controlling the column in which printing occurs, an electric motor, and driving connections between said motor and said front-feed means controlled automatically in accordance with the column in which printing occurs for automatically moving said front-feed means to open-throat position upon an operation of said motor.

19. In a front-feed machine of the class described adapted to be given cycles of operation, front-feed means including a platen for receiving and holding a work sheet in front-fed position relative to said platen, said front-feed means being movable from closed to open throat position and vice versa, an electric motor, driving connections between said motor and said front-feed means, column printing control means, and means conditioned automatically in accordance with the column in which printing occurs and operated during the latter part of a cycle of machine operation for causing said motor to automatically move said front-feed means to open-throat position.

20. A front-feed machine of the class described adapted to be given cycles of operation, a traveling paper carriage, front-feed means including a platen on said carriage for receiving and holding a work sheet in front-fed position relative to said platen, said front-feed means being movable from closed to open throat position and vice versa, an electric motor, driving connections between said motor and said front-feed means, and means conditioned by said carriage in a predetermined columnar position of said carriage and operated automatically during the latter part of a cycle of machine operation while said carriage is in said columnar position, for causing said motor to automatically move said front-feed means to open-throat position.

21. In a front-feed machine of the class described having a motor for giving the machine cycles of operation, a printing mechanism, a traveling carriage and tabulating mechanism, the combination of front-feed means including a platen mounted on said carriage for enabling a work sheet to be front-fed relative to said platen and for holding said sheet in printing position, said front-feed means being movable from a closed to an open-throat condition and vice versa, a manipulative member, connections actuated by said member for causing said motor to produce a cycle of operation of said machine, means actuated by said member for preventing operation of said tabulating mechanism whereby said carriage will remain stationary throughout the cycle initiated by said manipulative member, and a throat-opening device operable by said motor for moving said front-feed means to open-throat condition in the course of said cycle and while the carriage is stationary.

22. A front-feed machine of the class described having front-feed means for receiving and holding a work sheet in front-fed position, said front-feed means being movable from closed to open-throat condition and vice versa, columnar-printing control means for controlling the columnar printing on said work sheet, total-taking control means, and power means under the joint control of said total-taking control means and said columnar-printing control means acting automatically to move said front-feed means to open-throat condition during a total-taking cycle of operation and after the total has been taken and without requiring a change in the columnar setting of said columnar-printing control means.

23. A front-feed machine of the class described having a traveling paper carriage, front-feed means for receiving and holding a work sheet in front-fed position, said front-feed means being movable from closed to open-throat condition and vice versa, total-taking control means, and power means under the joint control of said total-taking control means and paper carriage acting automatically to move said front-feed means to open-throat condition during a total-taking cycle of operation and after the total has been taken and independently of movement of said paper carriage.

24. A front-feed machine of the class described having a printing mechanism, front-feed means including a platen for receiving and holding a work sheet in front-fed position relative to said platen, said front-feed means being movable from closed to open-throat position and vice versa, means for conditioning said machine to enable a true negative total to be taken by a plural number of cycles of machine operation, and automatic means operating to move said front-feed means to open-throat position during the cycle of machine operation in which said true negative total is printed and after it is printed.

25. A front-feed machine of the class described having front-feed means including a platen for receiving and holding a work sheet in front-fed position relative to said platen, said front-feed means being movable from closed to open-throat position and vice versa, negative total-taking control means for conditioning said machine to enable a true negative total to be taken by a plural number of cycles of machine operation, and means controlled by said negative total-taking control means operating to automatically move said front-feed means to open-throat position after the true negative total has been taken.

26. In a machine of the class described, the combination of a shiftable traveling carriage; front-feed means including a platen mounted on said carriage for receiving and holding a work sheet in front-fed position relative to said platen, said front-feed means being movable from closed to open-throat condition and vice versa; a front-feed paper chute mounted on said carriage and movable from printing to receiving position and vice versa; means controlling the columnar positioning of said carriage; and means rendered effective by the carriage and functioning after the carriage is moved to a predetermined columnar position and while it is stationary in said position for automatically moving the front-feed means to open-throat condition and said chute to receiving position.

27. In a machine of the class described, having printing mechanism, the combination of a laterally shiftable traveling carriage; front-feed means including a platen mounted on said carriage for receiving and holding a work sheet in front-fed position, said front-feed means being movable from closed to open-throat condition and vice versa; a front-feed paper chute mounted on said carriage and movable from printing to receiving position and vice versa; means for controlling the columnar positioning of said traveling carriage; and means rendered effective by movement of the traveling carriage in either direction to predetermined columnar positions for causing the front-feed means to be moved automatically to open-throat condition and said chute to be moved to receiving position.

28. In a machine of the class described, the combination of a laterally shiftable traveling carriage; means controlling the columnar positioning of said traveling carriage; front-feed means including a platen mounted on said carriage for receiving and holding a work sheet in front-fed position, said front-feed means being movable from closed to open-throat condition and vice versa; a front-feed paper chute mounted on said carriage and movable from a printing to a receiving position and vice versa; and means rendered effective by movement of the traveling carriage to a predetermined columnar position whereby subsequent operation of the machine causes the front-feed means to be moved to open-throat condition and the said chute to be moved to receiving position to facilitate the insertion and removal of a work sheet.

29. In a machine of the class described, the combination of main operating means; a laterally shiftable traveling carriage; front-feed means including a platen mounted on said carriage for receiving and holding a work sheet in front-fed position, said front-feed means being movable from closed to open-throat condition and vice versa; a front-feed paper chute mounted on said carriage and movable from a printing to a receiving position and vice versa; means for moving the front-feed means to open-throat condition and the chute to receiving position; normally ineffective means for connecting the moving means to the main operating means; and means acting at certain columnar position of the traveling carriage to render the connecting means effective whereupon subsequent operation of the machine causes the front-feed means to be moved to open-throat condition and the chute to be moved to receiving position.

30. In a machine of the class described, the combination of a reciprocable traveling carriage; front-feed means including a platen mounted on said carriage for receiving and holding a work sheet in front-fed position, said front-feed means being movable from closed to open-throat condition and vice versa; a front-feed paper chute mounted on said carriage and movable from a printing to a receiving position and vice versa; means controlling the columnar positions of said traveling carriage; normally ineffective means for automatically moving said front-feed means to open-throat condition and said chute to receiving position; and means actuated by movement of the traveling carriage to a predetermined columnar position, irrespective of the direction of approach of said carriage to that position, for causing the automatic moving means to be rendered effective upon machine operation.

31. In a machine of the class described, the combination of a laterally shiftable traveling carriage; front-feed means including a platen mounted on said carriage for receiving and holding a work sheet in front-fed position, said front-feed means being movable from closed to open-throat condition and vice versa; a front-feed paper chute mounted on said carriage and movable from a printing to a receiving position and vice versa; means controlling the columnar positioning of the traveling carriage; means for moving the front-feed means to open-throat condition and said chute to receiving position; operating means for the moving means; means for retaining the moving means in a disabled position; and means controlled by the traveling carriage when moved in either direction to a predetermined columnar position for enabling the moving means to permit its operation by said operating means.

32. In a calculating machine having a printing mechanism, the combination of main operating mechanism for the calculating machine; a carriage; front-feed means including a platen mounted on said carriage for receiving and holding a work sheet in front-fed position, said front-feed means being movable from closed to open-throat condition and vice versa; a front-feed paper chute mounted on said carriage and movable from printing to receiving position and vice versa; a member adapted to be given a definite cycle of movement upon each operation of the main operating mechanism; means for moving said front-feed means to open-throat condition and said chute to receiving position adapted to be operated by said member; means including a series of levers adapted to retain said moving means in a normally disabled position relative to said member; and means on said carriage adapted to render said retaining means ineffective upon movement of the carriage into a predetermined position to permit the moving means to be operated by said member to move the front-feed means into open-throat condition and the chute to receiving position to facilitate ready removal and insertion of work sheets.

33. In a front-feed machine of the class described having an electric motor, means for causing said motor to give said machine cycles of operation, and printing mechanism, the combination of front-feed means for receiving and holding a work sheet in front-fed position, said front-feed means being movable from a closed to an open-throat condition and vice versa, a front-feed paper chute movable from a printing to a receiving position and vice versa, a direct driving connection for enabling said motor to move said front-feed means to open-throat condition and said chute to receiving position, and means for causing said driving connection to automatically move said front-feed means to open-throat condition and said chute to receiving position.

34. A front-feed machine of the class described having a printing mechanism, front-feed means including a platen for receiving and holding a work sheet in front-fed position, said front-feed means being movable from closed to open-throat condition and vice versa; a front-feed paper chute movable from a printing to a receiving position; an electric motor, driving connections for said motor for effecting movement of said front-feed means to open-throat condition and said chute to receiving position; and means for causing said motor to automatically move said front-feed means to open-throat condition and said chute to receiving position.

35. In a machine of the class described, the combination of a shiftable traveling carriage; a rockable platen carrying frame supported thereby; means controlling the columnar positioning of said carriage; and means rendered effective by the carriage and functioning after the carriage is moved to a predetermined columnar position and while it is stationary in said position for rocking the platen carrying frame into a more accessible position to facilitate the insertion and removal of material therein.

36. In a machine of the class described, having printing mechanism, the combination of a laterally shiftable traveling carriage; a rockable platen carrying frame supported thereby; means for controlling the columnar positioning of said traveling carriage; and means rendered effective by movement of the traveling carriage in either direction to predetermined columnar positions for causing the platen carrying frame to be automatically rocked away from the printing mechanism upon operation of the machine to facilitate the insertion and removal of material therein.

37. In a machine of the class described, the combination of a laterally shiftable traveling carriage, a rockable platen frame carried thereby; means controlling the columnar positions of said traveling carriage; and means rendered effective by movement of the traveling carriage to a predetermined columnar position, and actuated by operation of the machine in said columnar position, for rocking the platen frame to a more accessible position to facilitate the insertion and removal of material therearound.

38. In a machine of the class described, the combination of a shiftable traveling carriage; a rockable platen carried thereby; means controlling the columnar positioning of said traveling carriage; means for automatically rocking the platen away from printing position; and means rendered effective by movement of the traveling carriage to a predetermined columnar position for causing the automatic rocking means to function upon operation of the machine.

39. In a machine of the class described, the combination of a laterally shiftable traveling carriage; means controlling the columnar positioning of said traveling carriage; a rockable platen supported by the traveling carriage; and means rendered effective by movement of the traveling carriage to a predetermined columnar position whereby subsequent operation of the machine causes the platen to be rocked to a more accessible position to facilitate the insertion and removal of paper therearound.

40. In a calculating machine having printing mechanism, the combination of a carriage; a rockable platen supported thereby; a main operating mechanism; and means operated by said main operating mechanism and rendered effective by the positioning of the carriage in a predetermined position for rocking said platen into a position to permit ready removal and insertion of work sheets.

41. In a machine of the class described, having printing mechanism, the combination of a laterally shiftable traveling carriage; a rockable platen carrying frame supported thereby; means controlling the columnar positioning of the traveling carriage; means for rocking the platen frame away from the printing mechanism; and means controlled by the traveling carriage in predetermined columnar positions thereof for rendering the platen frame rocking means effective upon subsequent operation of the machine.

42. In a machine of the class described, the combination of main operating means; a laterally shiftable traveling carriage; a rockable front feed platen carried thereby; means for rocking the platen to front feed position; normally ineffective means for connecting the rocking means to the main operating means; and means acting at certain columnar positions of the traveling carriage to render the connecting means effective whereupon subsequent operation of the machine causes the platen to be rocked to front feeding position.

43. In a machine of the class described, the combination of a laterally shiftable traveling carriage; a rockable platen carrying frame supported thereby; means controlling the columnar positioning of the traveling carriage; means for rocking the platen carrying frame to a more accessible position, to facilitate the feeding of material around the platen; operating means for the platen frame rocking means normally disconnected therefrom; and means controlled by the traveling carriage when tabulated to a predetermined columnar position for permitting the platen frame rocking means to be connected to the operating means upon operation of the machine.

44. In a machine of the class described, the combination of a laterally shiftable traveling carriage; a platen frame carried thereby adapted to be moved out of and into printing position; automatic means for rocking the platen frame out of printing position; operating means for the automatic rocking means but normally disconnected therefrom; and means intermediate the rocking means and the operating means, rendered effective by movement of the traveling carriage to a predetermined columnar position and machine operation in that position, for connecting said rocking and operating means.

45. In a machine of the class described, the combination of a reciprocable traveling carriage; a rockable platen carried thereby; means controlling the columnar positions of said traveling carriage; normally ineffective means for automatically rocking the platen away from printing position; and means actuated by movement of the traveling carriage to a predetermined columnar position, irrespective of the direction of approach of said carriage to that position, for causing the automatic rocking means to be rendered effective upon machine operation.

46. In a machine of the class described, having printing mechanism, the combination of a laterally shiftable traveling carriage; means controlling the columnar positioning thereof; a rockable platen carrying frame supported by the traveling carriage; normally ineffective means for rocking the platen carrying frame away from the printing mechanism, so that paper may be inserted and withdrawn from the front thereof; and means controlled by movement of the traveling carriage in either direction to a predetermined columnar position for determining the effectivity of the platen carrying frame rocking means upon operation of the machine.

47. In a machine of the class described, the combination of a laterally shiftable traveling carriage; means controlling the columnar positioning of said traveling carriage; a rockable platen supported by the traveling carriage; means for rocking the platen away from printing position to facilitate the insertion and removal of paper therearound; operating means for the rocking means; means normally retaining the rocking means disengaged from the operating means; and means whereby the retaining means is rendered ineffective when the traveling carriage is tabulated to a predetermined columnar position.

48. In a machine of the class described, the combination of a laterally shiftable traveling carriage; a rockable platen frame carried thereby; means controlling the columnar positioning of the traveling carriage; means for rocking the platen frame to a more accessible position; operating means for the platen frame rocking means; means for retaining the platen rocking means in a disabled position; and means controlled by the traveling carriage when moved in either direction to a predetermined columnar position for enabling the platen frame rocking means to permit its operation by said operating means.

49. In a calculating machine having a printing mechanism, the combination of main operating mechanism for the calculating machine; a carriage; a rockable platen supported thereby, a member adapted to be given a definite cycle of movement upon each operation of the main operating mechanism; platen rocking means adapted to be operated by said member; means including a series of levers adapted to retain said platen rocking means in a normally disabled position relative to said member; and means on said carriage adapted to render said retaining means ineffective upon movement of the carriage into a predetermined position to permit the platen rocking means to be operated by said member to rock the platen into a position to facilitate ready removal and insertion of work sheets into the carriage.

50. In a front-feed machine of the class described having an electric motor, means for causing said motor to give said machine cycles of operation, and printing mechanism, the combination of a platen movable from printing position relative to said printing mechanism to a front-feed position and vice versa, means for receiving and holding a work sheet in front-fed position relative to said platen, said means being movable from closed to open-throat condition and vice versa, a direct driving connection for enabling said motor to move said platen and operate said receiving and holding means, and means for causing said driving connection to automatically move said platen from printing to front-feed position and said receiving and holding means to open-throat condition.

51. A front-feed machine of the class described having a printing mechanism, front-feed means including a platen for receiving and holding a work sheet in front-fed position, said front-feed means being movable from closed to open throat position and vice versa, an electric motor, driving connections for said motor for effecting movement of said front-feed means to open-throat position, and means for causing said motor to automatically effect movement of said front-feed means to open-throat position.

52. A front-feed machine of the class described having a printing mechanism, a traveling paper carriage, front-feed means including a platen on said carriage for receiving and holding a work sheet in front-fed position relative to said platen, said front-feed means being movable from a closed to an open-throat position and vice versa, an electric motor, driving connections for said motor for moving said front-feed means, and means controlled by said carriage in a predetermined columnar position thereof and operated during the latter part of a cycle of machine operation while said carriage is in said columnar position for causing said motor to effect movement of said front-feed means to open-throat position.

53. A machine of the class described having a printing mechanism, a traveling paper carriage provided with a platen movable from a printing position relative to said printing mechanism to a front-feed position and vice versa, means on said carriage for receiving and holding a work sheet in front-fed position relative to said platen, said means being movable from closed to open-throat condition and vice versa, total-taking control means, and power means controlled jointly by said total-taking control means and said carriage acting automatically to move said platen from printing to front-feed position and said receiving and holding means to open-throat condition during a total-taking cycle of operation and after the total has been taken and independently of movement of said paper carriage.

54. In a front-feed machine of the class described having an electric motor with connections to said machine for giving said machine cycles of operation, the combination of a printing mechanism, a traveling paper carriage supporting a platen which is movable from a printing position relative to said printing mechanism to a front-feed position and vice versa, means on said carriage for receiving and holding a work sheet in front-fed position relative to said platen, said receiving and holding means being movable from closed to open-throat condition and vice versa, direct driving connections from said motor to said platen and said receiving and holding means, and means controlled by said carriage for conditioning said direct driving connections to cause said motor and driving connection to move said platen to front-feed position and to move said receiving and holding means to open-throat condition.

55. In a machine of the class described, the combination of a platen carrying frame adapted to be rocked to a front feeding position; and means on the platen frame adapted to move with the platen frame to rock it to front feeding position, said means also adapted to move relative to the platen frame to lock it in front feeding position.

56. In an accounting machine, the combination of a front feed platen adapted to be rocked out of and into printing position to facilitate the feeding of paper therearound; means for locking the platen out of printing position; and a member adapted to move as a unit with the platen to rock said platen out of printing position, said member then adapted to move relative to the platen to render the locking means effective.

57. In a calculating machine the combination of a front feed platen carrying frame rockable away from and toward printing position to facilitate the feeding of paper therein; a member carried by said platen carrying frame having a movement with and a movement relative to the platen carrying frame; and means for preventing relative movement of the member until the platen carrying frame reaches the terminus of its movement away from printing position, whereupon relative movement of the member locks the platen carrying frame in its position away from printing position.

58. In a machine of the class described, the combination of a traveling carriage; a platen frame carried thereby adapted to be rocked away from and toward printing position; means for rocking the platen frame away from printing position; a locking member on the platen frame; a device intermediate the rocking means and the locking member; and a projection on the traveling carriage arranged to cooperate with the locking member to enforce movement as a unit of the rocking means, the device, the locking means and the platen frame until said platen frame reaches the terminus of its movement away from printing position, whereupon a notch in the locking means cooperating with the projection permits movement of the rocking means, the device and the locking means relative to the platen frame to lock said platen frame away from printing position.

59. In a machine of the class described, the combination of a laterally shiftable traveling carriage; a platen carrying frame supported thereby and rockable to and from paper receiving position; a power means; means for causing said carriage to assume various columnar positions; means for rendering said causing means ineffective whereby said carriage may be caused to be held laterally stationary in a certain columnar position for a plurality of successive operations of the machine; and automatic means effective when said carriage is stationary in said certain columnar position to cause said power means to rock said platen carrying frame to paper receiving position as an accompaniment to each operation of the machine while the carriage is held stationary against lateral travel.

60. In a machine of the class described, the combination of a record supporting means laterally shiftable to various columnar positions and adjustable to and from a record receiving position; a power means; a normal motor bar for rendering said power means effective to operate the machine; means for causing said record supporting means to assume its various columnar positions; a special motor bar for simultaneously rendering said power means effective to operate the machine and rendering said causing means ineffective whereby said record supporting means will remain in the same columnar position it occupied when said special motor bar was depressed; a manipulative means for rendering said causing means ineffective for a series of operations of the machine whereby said record supporting means may be caused to remain laterally stationary in any desired columnar position; and means effective when said record supporting means is in certain of its columnar positions whereby said record supporting means will be moved to a record receiving position without a lateral movement of said record supporting means when said special motor bar is operated and whereby said record supporting means will be moved to record receiving position as an accompaniment to each of a series of successive operations of the machine when said manipulative means has been adjusted to a position to render said causing means ineffective.

61. In a calculating machine having a traveling carriage with a rotatable platen, a tabulating mechanism for the traveling carriage, a line spacing mechanism for the rotatable platen, and a controlling device for the tabulating mechanism and line spacing mechanism; the combination of a normally locked machine releasing mechanism; a starting bar adapted to unlock the machine releasing mechanism and simultaneously prevent movement of said controlling device whereby the tabulating mechanism is disabled and the spacing mechanism enabled; a second starting bar adapted to unlock the machine releasing mechanism and simultaneously control said device to enable the tabulating mechanism and disable the line spacing mechanism; and means adapted to control said controlling device upon operation of said second mentioned starting bar for disabling the tabulating mechanism and enabling the line spacing mechanism.

62. In a machine of the class described, the combination of machine releasing means; means for normally locking the releasing means in ineffective position; front-feed means including a platen for receiving and holding a work sheet in front-fed position, said front-feed means being movable from a closed to an open-throat condition and vice versa; means for guiding paper to the platen; means made effective by inserting paper within the guiding means for rendering the locking means ineffective; and manipulative means for latching the locking means in ineffective position when the front-feed means is in closed-throat condition.

63. In a machine of the class described having machine releasing means the combination of a frame; front-feed means including a platen mounted on said frame for receiving and holding a work sheet in front-fed position, said front-feed means being movable from closed to open-throat condition and vice versa; means for moving the front-feed means to open-throat condition; means carried by the frame and adapted to lock the releasing means when the front-feed means is moved to open-throat condition; and means for moving said locking means relative to the frame to lock the releasing means when the end of paper wound around the platen approaches the printing line.

64. In a machine of the class described having machine releasing means the combination of a frame; front-feed means including a platen carried by said frame for receiving and holding a work sheet in front-fed position, said front-feed means being movable from closed to open-throat condition and vice versa; means for moving the front-feed means to open-throat condition; means on the frame adapted to lock the releasing means when the front-feed means is in open-throat condition; means for moving said locking means relative to the frame to lock the releasing means when the end of paper wound around the platen approaches the printing line; and means for preventing such relative movement of the locking means.

65. In a machine of the class described the combination of machine releasing means; locking means therefor; a frame; front-feed means including a platen mounted on said frame for receiving and holding a work sheet in front-fed position, said front-feed means being movable from closed to open-throat condition and vice versa; means for moving the front-feed means to open-throat condition; a member on the frame adapted to cooperate with the locking means; means whereby the member is moved relatively to the frame to render the locking means effective when the end of the paper wound around the platen approaches or nears the printing line; means for preventing relative movement of the member; and means for restoring the preventing means to ineffective position when the front-feed means is moved to open-throat condition.

66. In a calculating machine, the combination of machine releasing means; front-feed means including a platen for receiving and holding a work sheet in front-fed position, said front-feed means being movable from a closed to an open-throat condition and vice versa; means for moving the front-feed means to open-throat condition; means for locking the releasing means when the end of paper being fed by the platen nears the printing line; means for restoring the locking means to ineffective position; and means effective when the front-feed means is moved to open-throat condition for returning the restoring means to ineffective position.

67. In a machine of the class described, having machine releasing means, the combination of a platen frame adapted to be rocked out of and into printing position; means for rocking the platen frame out of printing position; and means supported by the platen frame adapted to move in unison therewith to lock the releasing means when the platen frame is rocked out of printing position; said locking means also adapted to move relative to the platen frame to lock the machine releasing means when the platen frame is in printing position.

68. In a machine of the class described, the combination of machine releasing means; means for normally locking the releasing means in ineffective position; a paper feeding platen adapted to be rocked out of and into printing position; means for guiding the paper to the platen; means made effective by inserting paper within the guiding means for rendering the locking means ineffective; and manipulative means for latching the locking means in ineffective position when the platen is in printing position.

69. In a machine of the class described having machine releasing means the combination of a platen frame rockable out of and into printing position; a platen supported by said platen frame; means for rocking the platen frame out of printing position; means carried by the platen frame and adapted to move in unison therewith to lock the releasing means when the platen is rocked out of printing position; and means whereby said locking means moves relative to the platen frame to lock the releasing means when the end of paper wound around the platen approaches the printing line.

70. In a machine of the class described having machine releasing means the combination of a rockable platen frame; a platen carried thereby; means for rocking the platen frame out of printing position; means on the platen frame adapted to move therewith to lock the releasing means when the platen is out of printing position; means whereby said locking means is moved relative to the platen frame to lock the releasing means when the end of paper wound around the platen approaches the printing line; and means for preventing relative movement of the locking means.

71. In a machine of the class described the combination of machine releasing means; locking means therefor; a rockable platen frame; a front feed platen carried thereby; means for rocking the platen frame to front feeding position; a member on the frame adapted to cooperate with the locking means; means whereby the member is moved relatively to the platen frame to render the locking means effective when the end of the paper wound around the platen approaches or nears the printing line; means for preventing relative movement of the member; and means for restoring the preventing means to ineffective position when the platen frame is rocked to front feeding position.

72. In a calculating machine, the combination of machine releasing means; a front feed platen; means for rocking the platen to front feeding position; means for locking the releasing means when the end of paper being fed by the platen nears the printing line; means for restoring the locking means to ineffective position; and means effective when the platen is moved to front feeding position for returning the restoring means to ineffective position.

73. In an accounting machine, the combination of machine releasing means; a rockable platen frame; a front feed platen carried thereby; means for rocking the platen frame and the platen to front feeding position; means for locking the releasing means when the end of paper being fed by the platen nears the printing line; a manipulative member on the platen frame, which when moved to effective position renders the locking means ineffective; and means effective upon movement of the platen frame to front feeding position for restoring the manipulative member to ineffective position.

74. In a machine of the class described, the combination of a main operating means; a rockable platen; means for holding paper in contact with the platen; means operated by the main operating means for automatically rotating the platen to feed the paper; means for rocking the platen away from printing position whereby the platen rotating means is rendered ineffective; and auxiliary means for rotating the platen to feed the paper while it is being rocked away from printing position.

75. In a machine of the class described, the combination of a rockable platen; means for holding paper in contact with said platen, so that said paper may be fed thereby; automatic means for rocking the platen out of printing position; automatic means for rotating the platen to feed the paper wound therearound, said automatic rotating means normally effective but rendered ineffective when the platen is rocked out of printing position; and another rotating means effective upon rocking of the platen out of printing position for rotating said platen to feed the paper when the first mentioned rotating means is ineffective.

76. In a machine of the class described, the combination of a traveling carriage; a rockable platen frame carried thereby; means for rocking the platen frame out of printing position; a platen carried by the platen frame; means for holding paper in contact with the platen so that it may be fed when said platen is rotated; a cam member on the traveling carriage; and means on the platen frame adapted to cooperate with the cam member when said platen frame is rocked out of printing position to rotate the platen to feed the paper wound therearound.

77. In a machine of the class described, the combination of a traveling carriage; a rockable platen frame carried thereby and adapted to be rocked away from and into printing position; means for rocking the platen frame away from printing position; a platen carried by the platen frame; means for holding paper in contact with said platen so that rotating the platen will cause the paper to be fed; means for rotating the platen; means for operating the rotating means when the platen is in printing position; and an auxiliary means for operating the rotating means upon movement of the platen away from printing position.

RAYMOND A. CHRISTIAN.

REFERENCES CITED

The following references are of record in the file of this patent:

UNITED STATES PATENTS

| Number | Name | Date |
|---|---|---|
| 976,390 | Niemann | Nov. 22, 1910 |
| 1,487,168 | Kurowski | Mar. 18, 1924 |
| 1,152,517 | Kilpatrick | Sept. 7, 1915 |
| 1,723,668 | Trew | Aug. 6, 1929 |
| 1,787,489 | Muller | Jan. 6, 1931 |
| 1,817,451 | Gubelmann | Aug. 4, 1931 |